(12) United States Patent
Momo

(10) Patent No.: US 10,446,881 B2
(45) Date of Patent: Oct. 15, 2019

(54) POWER STORAGE DEVICE AND POWER STORAGE SYSTEM

(71) Applicant: SEMICONDUCTOR ENERGY LABORATORY CO., LTD., Atsugi-shi, Kanagawa-ken (JP)

(72) Inventor: Junpei Momo, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 15/432,337

(22) Filed: Feb. 14, 2017

(65) Prior Publication Data
US 2017/0244135 A1    Aug. 24, 2017

(30) Foreign Application Priority Data

Feb. 19, 2016  (JP) .................. 2016-030336

(51) Int. Cl.
| | |
|---|---|
| *H01M 10/00* | (2006.01) |
| *H01M 10/44* | (2006.01) |
| *H01M 2/16* | (2006.01) |
| *H01M 10/0525* | (2010.01) |
| *H01M 10/46* | (2006.01) |
| *H02J 7/00* | (2006.01) |

(Continued)

(52) U.S. Cl.
CPC .......... *H01M 10/44* (2013.01); *H01M 2/164* (2013.01); *H01M 2/40* (2013.01); *H01M 10/052* (2013.01); *H01M 10/058* (2013.01); *H01M 10/0525* (2013.01); *H01M 10/425* (2013.01); *H01M 10/4242* (2013.01); *H01M 10/46* (2013.01); *H02J 7/0042* (2013.01); *H01M 2/12* (2013.01); *H01M 10/0583* (2013.01); *H01M 10/0585* (2013.01); *H01M 2220/20* (2013.01); *H01M 2220/30* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 6,335,115 B1 * | 1/2002 | Meissner | H01M 4/13 429/117 |
| 7,038,426 B2 * | 5/2006 | Hall | H01M 10/44 320/135 |

(Continued)

FOREIGN PATENT DOCUMENTS

JP      2002324585 A  * 11/2002  ............ H01M 10/05

*Primary Examiner* — Leigh M Garbowski
(74) *Attorney, Agent, or Firm* — Nixon Peabody LLP; Jeffrey L. Costellia

(57) ABSTRACT

A power storage system or a power storage device that can restore reduced capacity is provided. The power storage device includes a first exterior body, a first electrode, a second electrode, a first electrolyte solution, and a carrier ion permeable film. The first electrode, the second electrode, and the first electrolyte solution are covered with the first exterior body. The first electrode and the second electrode are in contact with the first electrolyte solution. The first electrolyte solution includes carrier ions. A first opening is provided in the first exterior body. The carrier ion permeable film is provided to be in contact with the first electrolyte solution and so as to block the first opening without any space. The carrier ion permeable film is configured to be impermeable to water and air but permeable to the carrier ions.

12 Claims, 31 Drawing Sheets

(51) Int. Cl.
*H01M 2/40* (2006.01)
*H01M 10/052* (2010.01)
*H01M 10/058* (2010.01)
*H01M 10/42* (2006.01)
*H01M 2/12* (2006.01)
*H01M 10/0583* (2010.01)
*H01M 10/0585* (2010.01)

(56) References Cited

U.S. PATENT DOCUMENTS

| | | | | |
|---|---|---|---|---|
| 7,846,571 B2 * | 12/2010 | Christensen | ........ | H01M 6/5005 |
| | | | | 429/61 |
| 8,257,865 B2 * | 9/2012 | Suzuki | ............... | C01G 45/1221 |
| | | | | 320/137 |
| 8,501,334 B2 * | 8/2013 | Yi | ....................... | H01M 2/0212 |
| | | | | 429/185 |
| 9,166,222 B2 * | 10/2015 | Amiruddin | ............ | H01M 4/386 |
| 9,379,368 B2 * | 6/2016 | Roumi | .................. | H01M 2/166 |
| 9,461,341 B2 * | 10/2016 | Momo | ................. | H01M 10/46 |
| 9,722,284 B2 * | 8/2017 | Takahashi | ............. | H01M 4/136 |
| 2011/0106280 A1 * | 5/2011 | Zeier | ..................... | H01M 10/42 |
| | | | | 700/90 |
| 2012/0148924 A1 | 6/2012 | Ogino et al. | | |
| 2012/0242292 A1 | 9/2012 | Ogino | | |
| 2013/0115486 A1 * | 5/2013 | Saito | ................... | H01M 2/0212 |
| | | | | 429/50 |
| 2013/0224632 A1 * | 8/2013 | Roumi | .................. | H01M 2/166 |
| | | | | 429/516 |
| 2013/0249054 A1 | 9/2013 | Kuriki et al. | | |
| 2013/0252064 A1 | 9/2013 | Kuriki et al. | | |
| 2013/0252088 A1 | 9/2013 | Kuriki et al. | | |
| 2013/0252089 A1 | 9/2013 | Kuriki | | |
| 2013/0273405 A1 | 10/2013 | Takahashi et al. | | |
| 2014/0028264 A1 | 1/2014 | Taniyama et al. | | |
| 2014/0342219 A1 * | 11/2014 | Takahashi | ........... | H01M 10/058 |
| | | | | 429/178 |
| 2014/0377642 A1 * | 12/2014 | Hambitzer | ............. | H01M 2/14 |
| | | | | 429/188 |
| 2016/0043070 A1 | 2/2016 | Momo et al. | | |
| 2016/0064779 A1 * | 3/2016 | Takahashi | ......... | H01M 10/4242 |
| | | | | 429/61 |

* cited by examiner

FIG. 1A1
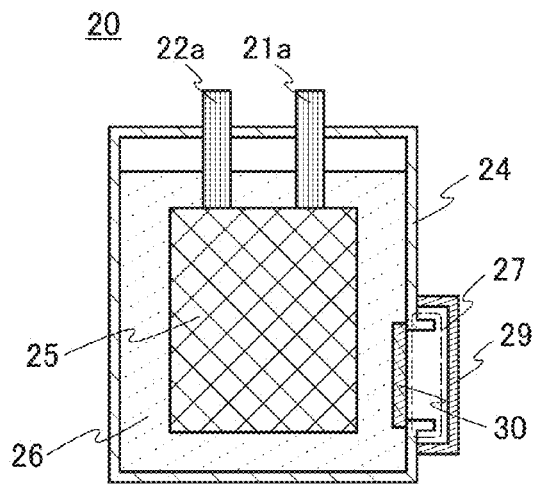
FIG. 1A2
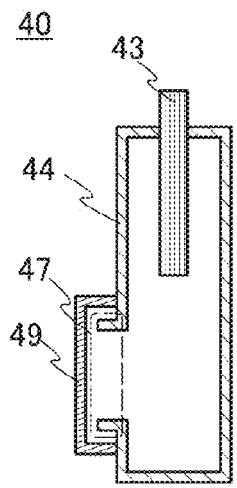
FIG. 1B
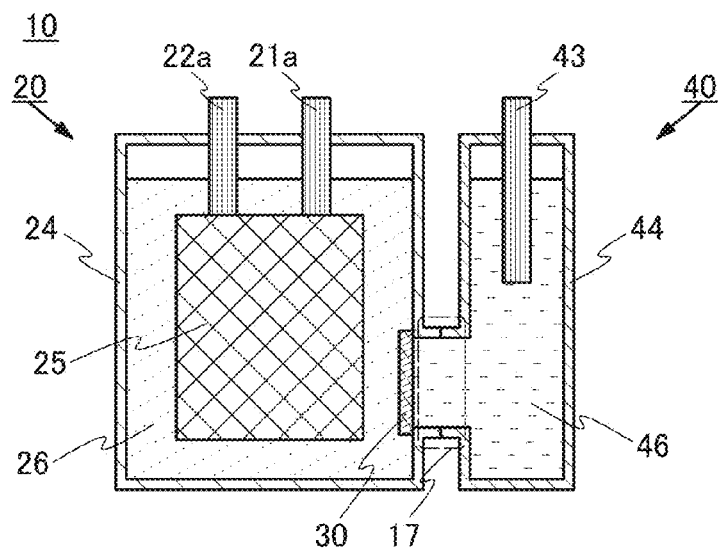
FIG. 1C
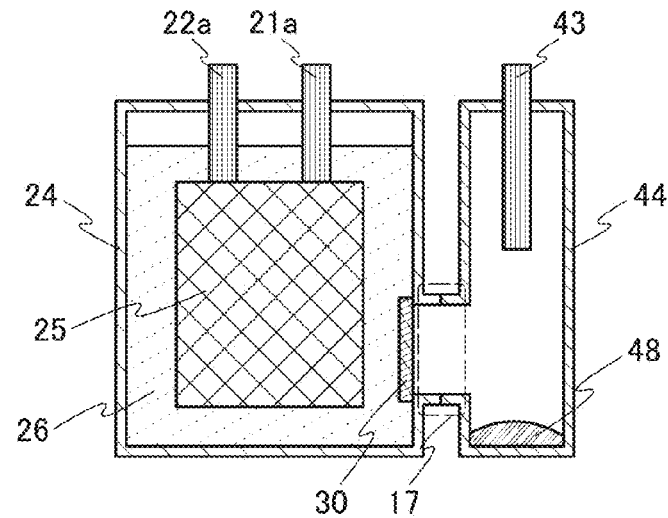

$6C + Li^+ + e^-$
$\rightarrow LiC_6$ $LiFePO_4$
$\rightarrow FePO_4 + Li^+ + e^-$ $LiC_6$
$\rightarrow 6C + Li^+ + e^-$ $FePO_4 + Li^+ + e^-$
$\rightarrow LiFePO_4$ FIG. 4A
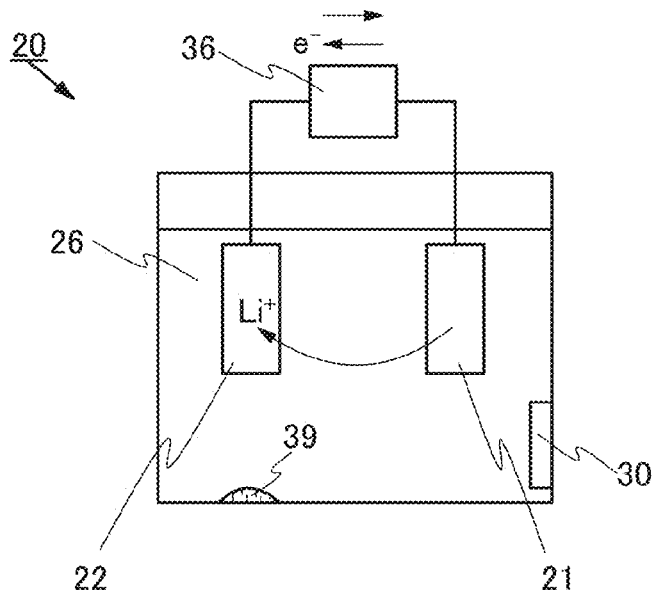
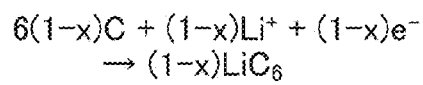
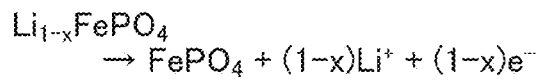
FIG. 4B
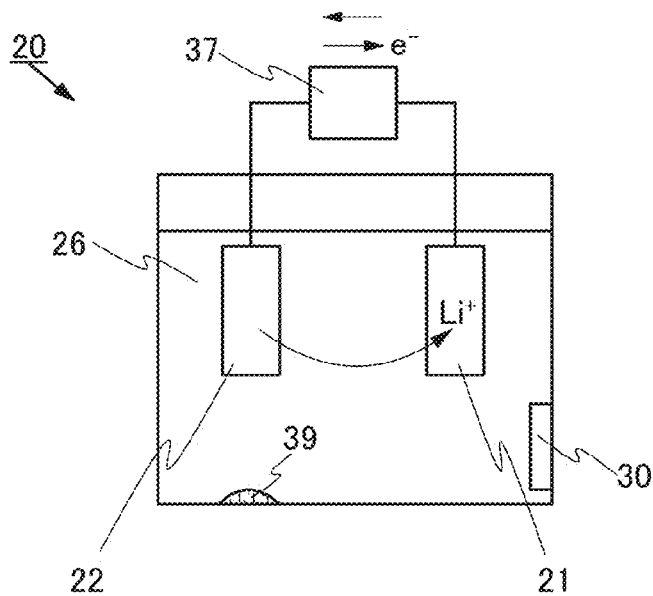
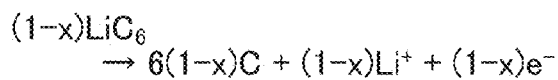
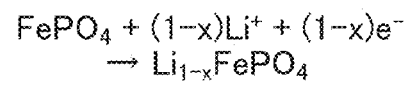

FIG. 9A
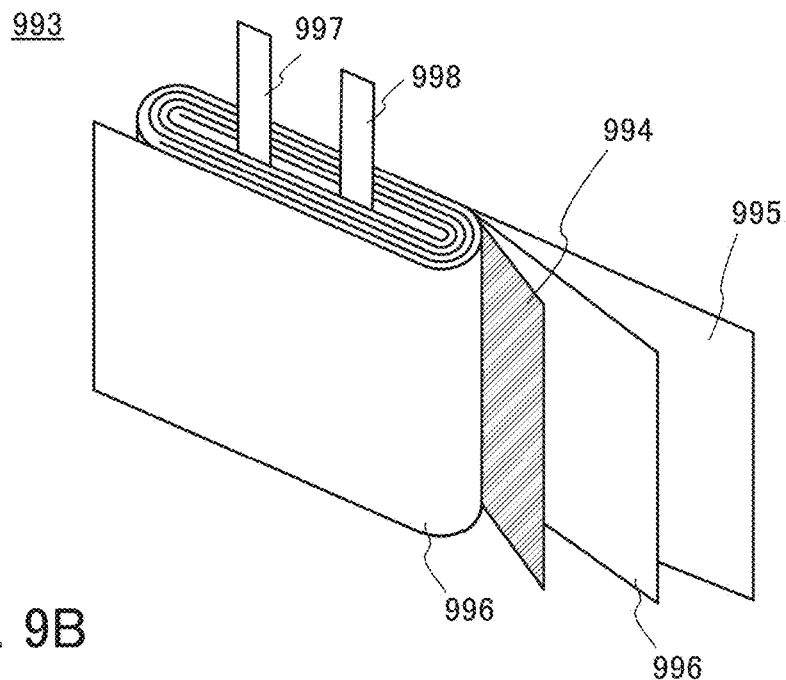
FIG. 9B
FIG. 9C
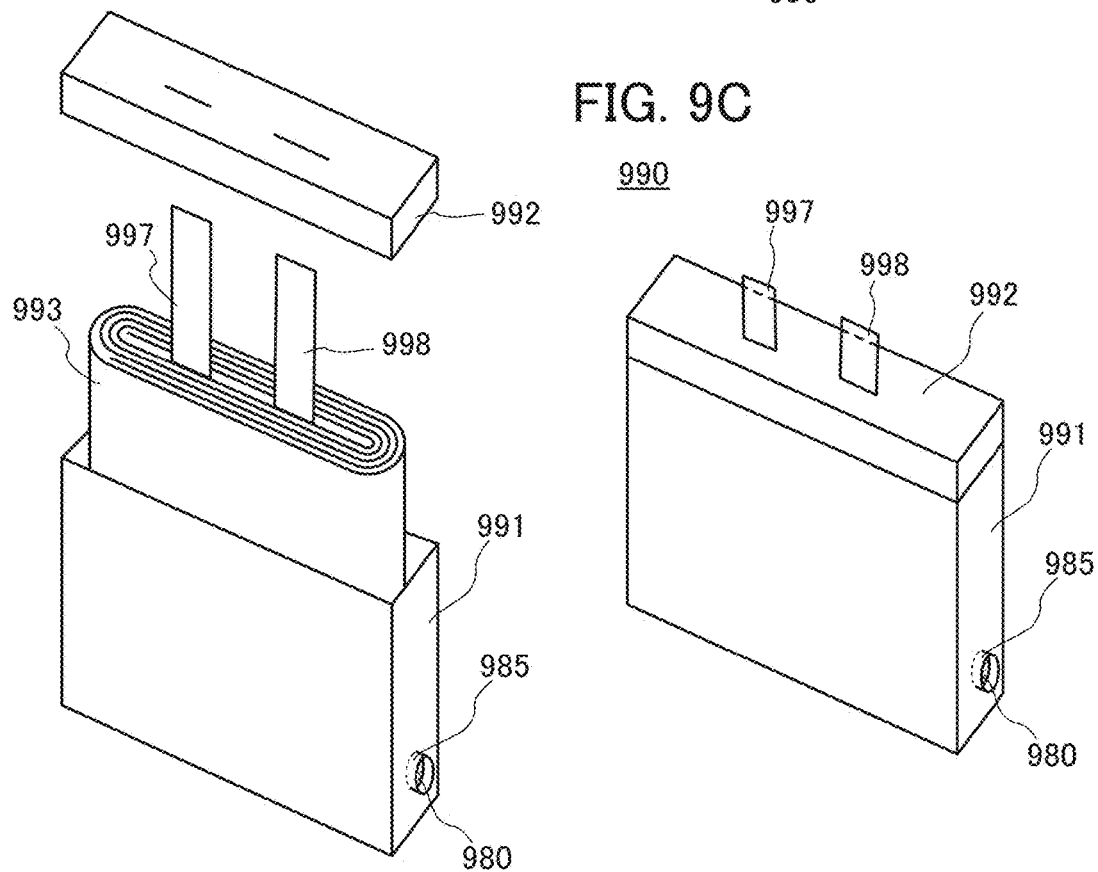

FIG. 13A1 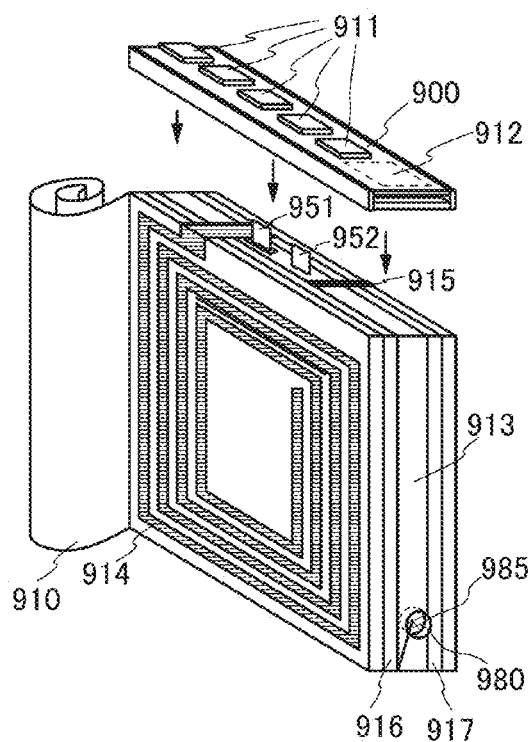 FIG. 13A2 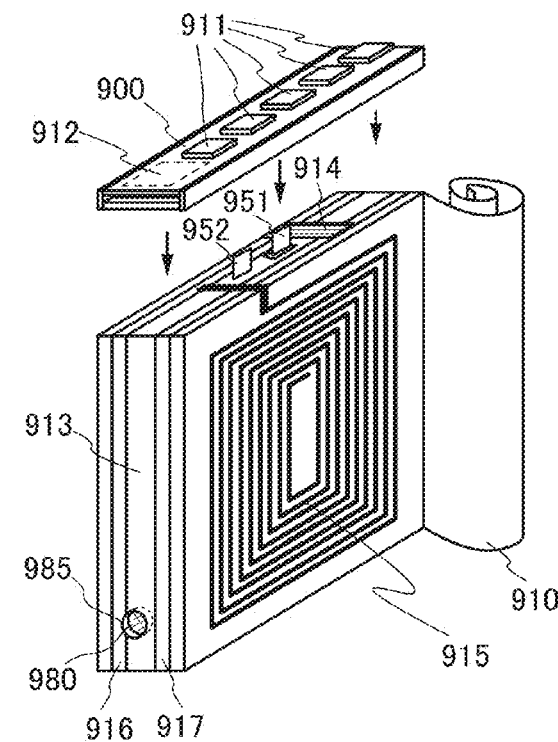
FIG. 13B1 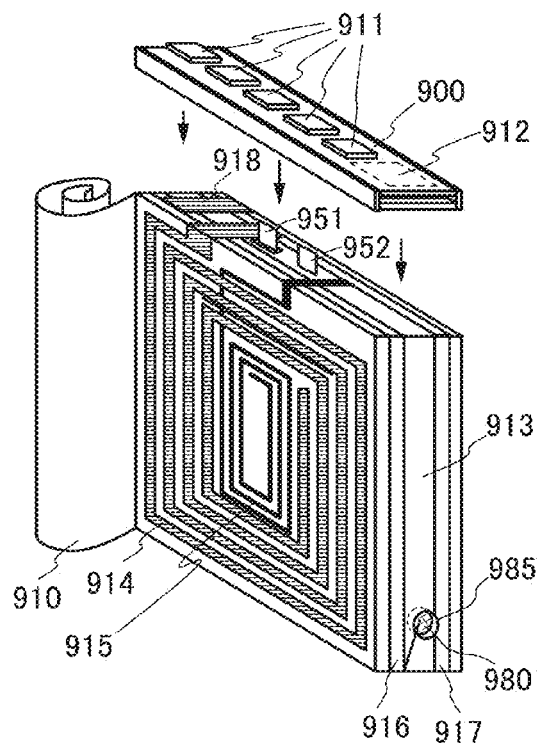 FIG. 13B2 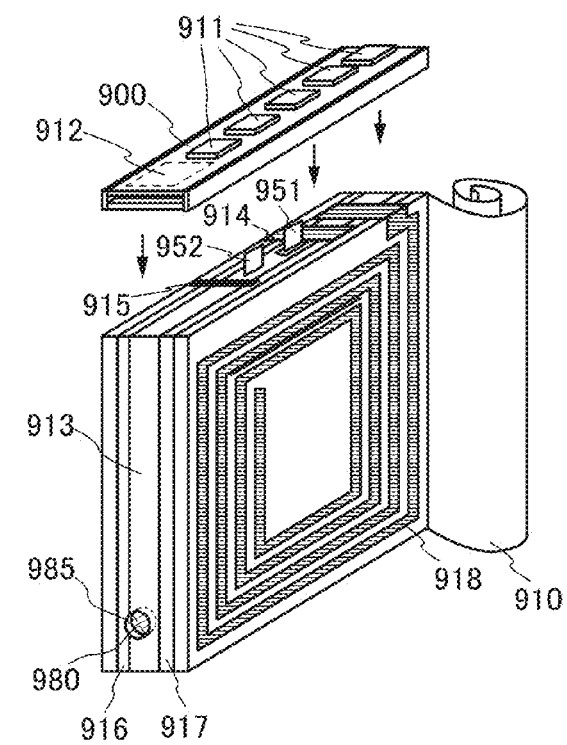

710

*the 6th cycle test was performed after the capacity restoration treatment

POWER STORAGE DEVICE AND POWER STORAGE SYSTEM

BACKGROUND OF THE INVENTION

1. Field of the Invention

One embodiment of the present invention relates to a power storage device. Another embodiment of the present invention relates to a power storage system. Another embodiment of the present invention relates to a method for restoring capacity of a power storage device of one embodiment of the present invention.

Note that one embodiment of the present invention is not limited to the above technical field. The technical field of one embodiment of the invention disclosed in this specification and the like relates to an object, a method, or a manufacturing method. Furthermore, one embodiment of the present invention relates to a process, a machine, manufacture, or a composition of matter. Specific examples of the technical field of one embodiment of the present invention disclosed in this specification include a semiconductor device, a display device, a power storage device, a memory device, a method for driving any of them, and a method for manufacturing any of them.

In this specification and the like, the power storage system refers to one or more devices including a power storage device. The term "semiconductor device" means all devices which can operate by utilizing semiconductor characteristics. A semiconductor element such as a transistor, a semiconductor circuit, an arithmetic device, and a memory device are each an embodiment of a semiconductor device.

2. Description of the Related Art

In recent years, portable electronic devices such as mobile phones, smartphones, electronic book (e-book) readers, and portable game machines have been widely used. Being used as power sources for driving these devices, power storage devices typified by lithium-ion secondary batteries have been researched and developed actively. Power storage devices are of growing importance in a variety of uses; for example, hybrid vehicles and electric vehicles receive attention because of an increased interest in global environmental problems and an oil resources problem.

A lithium-ion secondary battery, which is a power storage device and widely used because of its high energy density, includes a positive electrode including an active material such as lithium cobalt oxide ($LiCoO_2$) or lithium iron phosphate ($LiFePO_4$), a negative electrode formed of a carbon material such as graphite capable of occluding and releasing lithium ions, and an electrolyte solution in which an electrolyte formed of a lithium salt such as $LiBF_4$ or $LiPF_6$ is dissolved in an organic solvent such as ethylene carbonate (EC) or diethyl carbonate (DEC), for example. The lithium-ion secondary battery is charged and discharged in such a manner that lithium ions in the lithium-ion secondary battery move between the positive electrode and the negative electrode through the electrolyte solution and intercalated into or deintercalated from the positive electrode active material and the negative electrode active material.

Such repeated charging and discharging of the lithium-ion secondary battery causes reductive decomposition of the electrolyte solution (organic solvent) in the negative electrode. An electron generated by deintercalation of a lithium ion in the positive electrode is wasted by the reductive decomposition, so that the positive electrode active material is deficient in lithium. That is, the repeated charging and discharging reduces the capacity of the lithium-ion secondary battery. It is necessary to make up for the lithium ion deficiency in the positive electrode active material to restore the reduced capacity.

In order to solve the aforementioned problem, a method for restoring capacity of a lithium-ion secondary battery in which a third electrode including an active material capable of releasing lithium ions is provided in the battery and lithium ion deficiency is made up for by feeding current to a positive electrode and the third electrode is known (Patent Document 1).

REFERENCE

Patent Document

[Patent Document 1] United States Patent Application Publication No. 2014/0028264

SUMMARY OF THE INVENTION

However, the maximum capacity with respect to the battery capacity is reduced in the lithium-ion secondary battery including the third electrode which is disclosed in Patent Document 1 because the third electrode does not contribute to formation of charge and discharge capacity during normal operation of the battery.

An object of one embodiment of the present invention is to provide a power storage system or a power storage device that can restore reduced capacity. Another object of one embodiment of the present invention is to provide a power storage system in which a capacity restoration device is provided outside a battery. Another object of one embodiment of the present invention is to provide a power storage device or a power storage system which can be used for a long time. An object of one embodiment of the present invention is to provide a novel power storage system or a novel power storage device.

Note that the descriptions of these objects do not disturb the existence of other objects. In one embodiment of the present invention, there is no need to achieve all the objects. Other objects will be apparent from and can be derived from the descriptions of the specification, the drawings, the claims, and the like.

One embodiment of the present invention is a power storage device including a first exterior body, a first electrode, a second electrode, a first electrolyte solution, and a carrier ion permeable film. The first electrode, the second electrode, and the first electrolyte solution are covered with the first exterior body. The first electrode and the second electrode are in contact with the first electrolyte solution. The first electrolyte solution includes carrier ions. A first opening is provided in the first exterior body. The carrier ion permeable film is in contact with the first electrolyte solution and provided so as to block the first opening without any space. The carrier ion permeable film is configured to be impermeable to water and air but permeable to the carrier ions.

Another embodiment of the present invention is the above power storage device in which the carrier ions contain a lithium ion.

Another embodiment of the present invention is a power storage system including the above power storage device and a capacity restoration device. The capacity restoration device includes a second exterior body and a third electrode. Part of the third electrode is covered with the second exterior body. Another part of the third electrode is exposed from the second exterior body. A second opening is provided in the second exterior body. The second opening is connected to the first opening without any space.

Another embodiment of the present invention is the above power storage system in which the capacity restoration device includes an electrolyte inside the second exterior body.

Another embodiment of the present invention is the above power storage system further including an ion conducting portion, a charger, and a cable. The ion conducting portion is connected to the first opening and the second opening without any space at joints. The ion conducting portion has flexibility. The charger is electrically connected to the first electrode and the third electrode through the cable.

Another embodiment of the present invention is the above power storage system further including a pump. The pump is connected to the ion conducting portion.

Another embodiment of the present invention is the above power storage system further including an air vent. The air vent is provided in the ion conducting portion.

Another embodiment of the present invention is a power storage system including a first power storage device, a second power storage device, a capacity restoration device, an ion conducting portion, a charger, and a cable. The first power storage device and the second power storage device are each the above power storage device. The ion conducting portion includes a branching portion. The ion conducting portion is connected to a first opening of the first power storage device, a first opening of the second power storage device, and the second opening without any space at joints. The ion conducting portion has flexibility. The ion conducting portion includes a pump and an air vent. The pump is connected to the ion conducting portion. The air vent is provided in the ion conducting portion. The charger is electrically connected to a first electrode of the first power storage device and a first electrode and the third electrode of the second power storage device.

Another embodiment of the present invention is a method for restoring capacity of a power storage device using the above power storage system. The method includes a first step of connecting the capacity restoration device to the power storage device, a second step of injecting a second electrolyte solution into the capacity restoration device, and a third step of applying voltage between the first electrode and the third electrode. The first opening and the second opening are connected to each other without any space at a joint in the first step. The second electrolyte solution includes the carrier ions in the second step. The second electrolyte solution is in contact with the carrier ion permeable film and the third electrode in the second step. Current flows from the first electrode to the third electrode in the third step.

Another embodiment of the present invention is a method for restoring capacity of a power storage device using the above power storage system. The method includes a first step of connecting the capacity restoration device to the power storage device, a second step of injecting a solvent into the capacity restoration device to form a second electrolyte solution, and a third step of applying voltage between the first electrode and the third electrode. The first opening and the second opening are connected to each other without any space at a joint in the first step. The electrolyte includes the carrier ions in the second step. The second electrolyte solution is in contact with the carrier ion permeable film and the third electrode in the second step. Current flows from the first electrode to the third electrode in the third step.

According to one embodiment of the present invention, a power storage system or a power storage device that can restore reduced capacity can be provided. According to one embodiment of the present invention, a power storage system in which a capacity restoration device is provided outside a battery can be provided. According to one embodiment of the present invention, a power storage device or a power storage system which can be used for a long time can be provided. According to one embodiment of the present invention, a novel power storage system or a novel power storage device can be provided.

Note that the descriptions of these effects do not disturb the existence of other effects. One embodiment of the present invention does not necessarily achieve all the effects. Other effects will be apparent from and can be derived from the descriptions of the specification, the drawings, the claims, and the like.

BRIEF DESCRIPTION OF THE DRAWINGS

FIGS. 1A1, 1A2, 1B, and 1C illustrate structures of a power storage device and a power storage system.

FIG. 2 is a flow chart illustrating a method for restoring capacity.

FIGS. 4A and 4B illustrate reaction of an electrode in charging and discharging a power storage device.

FIGS. 9A to 9C illustrate an example of a power storage device.

FIGS. 13A1, 13A2, 13B1, and 13B2 each illustrate an example of a power storage device.

DETAILED DESCRIPTION OF THE INVENTION

Figure 2:
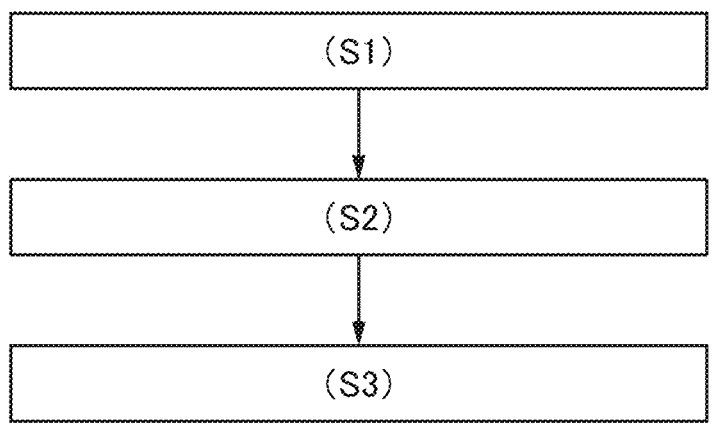

Embodiments will be described in detail with reference to the drawings. Note that the present invention is not limited to the description below, and it is easily understood by those skilled in the art that various changes and modifications can be made without departing from the spirit and scope of the present invention. Thus, the present invention should not be construed as being limited to the description in the following embodiments. Note that in structures of the present invention described below, the same portions or portions having similar functions are denoted by the same reference numerals in different drawings, and a description thereof is not repeated.

In the drawings, the size, the thickness of layers, or regions may be exaggerated for clarity. Therefore, the size, the layer thickness, or the region is not limited to the illustrated scale. Note that the drawings are schematic views showing ideal examples, and embodiments of the present invention are not limited to shapes or values shown in the drawings. In the drawings, the same portions or portions having similar functions are denoted by the same reference numerals in different drawings, and explanation thereof will not be repeated. Furthermore, the same hatching pattern is applied to portions having similar functions, and the portions are not especially denoted by reference numerals in some cases.

Note that the ordinal numbers such as "first", "second", and the like in this specification and the like are used for convenience and do not denote the order of steps or the stacking order of layers. Therefore, for example, description can be made even when "first" is replaced with "second" or "third", as appropriate. In addition, the ordinal numbers in this specification and the like are not necessarily the same as those which specify one embodiment of the present invention.

In this specification and the like, the terms for explaining arrangement, such as "over" and "under", are used for convenience to describe the positional relation between components with reference to drawings. Furthermore, the positional relationship between components is changed as appropriate in accordance with a direction in which each component is described. Thus, there is no limitation on terms used in this specification, and description can be made appropriately depending on the situation.

Embodiment 1

In this embodiment, a structure of a power storage system of one embodiment of the present invention will be described with reference to FIGS. 1A1, 1A2, 1B, and 1C, FIG. 2, FIGS. 3A and 3B, FIGS. 4A and 4B, and FIG. 5.

<Structure of Power Storage System>

FIG. 1A1 and FIG. 1A2 are schematic views of a power storage device 20 and a capacity restoration device 40, respectively. A power storage system 10 of one embodiment of the present invention includes the power storage device 20 and the capacity restoration device 40.

[Structure of Power Storage Device]

The power storage device 20 includes an exterior body 24, a component group 25, an electrolyte solution 26, and a carrier ion permeable film 30 (see FIG. 1A1). The component group 25 includes a first electrode 21 (not illustrated), a second electrode 22 (not illustrated), and a plurality of members, such as a separator, for charging and discharging the power storage device. Note that specific structure examples of the first electrode 21, the second electrode 22, the separator, the electrolyte solution 26, and the like will be described in Embodiment 4.

An electrode terminal 21a is electrically connected to the first electrode 21 (not illustrated) and is exposed at the outside of the exterior body 24. An electrode terminal 22a is electrically connected to the second electrode 22 (not illustrated) and is exposed at the outside of the exterior body 24. The power storage device 20 can be connected to an external power source, a load, or the like using the electrode terminal 21a and the electrode terminal 22a.

An opening 27 is provided in the exterior body 24. The carrier ion permeable film 30 is provided so as to block the opening 27 without any space. The first electrode 21, the second electrode 22, and the electrolyte solution 26 are covered with the exterior body 24. Specifically, the first electrode 21, the second electrode 22, and the electrolyte solution 26 are covered with a region surrounded by the exterior body 24 and the carrier ion permeable film 30.

The carrier ion permeable film 30 has a function of being impermeable to water and air but permeable to a carrier ion. Thus, with the exterior body 24 and the carrier ion permeable film 30, entry of water and air from the outside of the power storage device 20 can be suppressed. No water and no air are preferably contained in the power storage device 20 as much as possible. A portion of the power storage device 20 which is not filled with the electrolyte solution 26 is preferably filled with an inert gas such as argon.

Here, a carrier ion refers to an ion that achieves charging and discharging of the power storage device 20 by moving between the first electrode 21 and the second electrode 22. In a lithium-ion secondary battery, a carrier ion is a lithium ion.

The electrolyte solution 26 includes carrier ions. Carrier ions made up for from the outside of the power storage device 20 pass through the carrier ion permeable film 30 and are intercalated into the first electrode 21 or the second electrode 22 through the electrolyte solution 26. Thus, the opening 27 is provided in the exterior body 24 so that the carrier ion permeable film 30 is in contact with the electrolyte solution 26.

For example, the opening 27 is provided under the solution surface of the electrolyte solution 26 when the power storage device 20 is a floor-mounted (stationary) type. Note that when the power storage device 20 can be provided with a change in a contact surface, the position of the opening 27 is not limited thereto. For example, a structure in which the carrier ion permeable film 30 is not in contact with the electrolyte solution 26 when the power storage device 20 is used as a battery, whereas the carrier ion permeable film 30 is in contact with the electrolyte solution 26 with a change in a contact surface when the power storage device 20 performs capacity restoration treatment may be employed.

It is preferable that the opening 27 be sealed hermetically with a cap 29 when the power storage device 20 is used as a battery. The cap 29 of the power storage device 20 can suppress unintentional damage of the carrier ion permeable film 30. Furthermore, entry of air or the like into the power storage device 20 through the carrier ion permeable film 30 can be suppressed in such a manner that the pressure of air in a space surrounded by the opening 27, the carrier ion permeable film 30, and the cap 29 is reduced or the air is replaced with an inert gas such as argon.

[Structure of Capacity Restoration Device]

The capacity restoration device 40 includes an exterior body 44, a third electrode 43, and a cap 49 (see FIG. 1A2). An opening 47 is provided in the exterior body 44.

The inside of the capacity restoration device 40 is sealed hermetically by the exterior body 44 and the cap 49. The cap 49 has a function of closing the opening 47. Note that the cap 49 is attachable and detachable.

The opening 47 is connected to the opening 27 without any space, whereby leak of an electrolyte solution 46 flown from the capacity restoration device 40 at the time of performing the capacity restoration treatment can be suppressed.

For example, the opening 47 may be provided with a fluid joint (also referred to as a connector or a joint) such as CUPLA (registered trademark). Alternatively, the fluid joint may be connected to one or both end portions of a hose so that the fluid joint is connected to the opening 27 and/or the opening 47. Further alternatively, the opening 27 and the opening 47 may be connected by a hose so that the hose may be fixed to the opening 27 and the opening 47 by a clasp. In such cases, a material which has low reactivity with respect to the electrolyte solution 46 and the electrolyte solution 46 from which the third electrode 43 is eluted is preferably used for the hose.

Part of the third electrode 43 is covered with the exterior body 44. Another part of the third electrode 43 is exposed from the exterior body 44. The third electrode 43 may be fixed to the exterior body 44.

The exterior body 44 preferably has an opening for injecting a liquid to hold the electrolyte solution inside the capacity restoration device 40 when used.

The capacity restoration device 40 may have a stick-like, plate-like, or propeller-like mechanism capable of stirring the inside of the exterior body 44. With the mechanism, carrier ions can be made up for from the capacity restoration device 40 more efficiently.

Note that instead of the power storage device 20, the capacity restoration device 40 may include the carrier ion permeable film 30. Alternatively, in the power storage system 10, the carrier ion permeable film 30 may be located between the opening 27 and the opening 47 when the power storage device 20 and the capacity restoration device 40 are connected to each other.

It is preferable to use a conductive material having a high ionization tendency for the third electrode 43. For example, it is possible to use a conductive material having a high standard electrode potential, such as copper or silver. Alternatively, a conductive material having a low standard electrode potential, such as nickel, zinc, or lead, may be used. Note that when the conductive material having a low standard electrode potential is used for the third electrode 43, a discharge reaction in which the first electrode 21 serves as a positive electrode and the third electrode 43 serves as a negative electrode occurs in the following capacity restoration treatment of the power storage device.

As the electrolyte solution 46, an aqueous solution in which carrier ions are dissolved can be used. It is particularly preferable to use an electrolyte solution in which the solubility of a solute contained in the electrolyte solution 46 and the solubility of a substance contained in the third electrode 43 are high. As the electrolyte solution 46, for example, a lithium chloride aqueous solution, a lithium sulfate aqueous solution, a lithium nitrite aqueous solution, or the like can be used. Note that in the case where carrier ions other than lithium ions are used for charging and discharging the power storage device 20, the carrier ions contained in the electrolyte solution 46 are selected as appropriate in accordance with the power storage device 20.

As the carrier ion permeable film 30, a material that is impermeable to water and air but permeable to a carrier ion is used. For example, glass ceramics or a crystalline glass can be used. Alternatively, an oxide-based solid electrolyte and a sulfide-based solid electrolyte can be used. As a specific example of glass ceramics, lithium ion conductive glass ceramics (LICGC) produced by Ohara Inc. can be given.

<Method for Restoring Capacity of Power Storage Device>

Next, a method for restoring capacity of the power storage device 20 will be described. FIG. 1B is a schematic diagram of the power storage system 10 at the time of the capacity restoration treatment. In the power storage system 10, the method for restoring the capacity of the power storage device 20 includes the following three steps.

[Step S1]

The capacity restoration device 40 is connected to the power storage device 20 (see a step S1 in FIG. 2). Specifically, the cap 29 and the cap 49 are detached from the power storage device 20 and the capacity restoration device 40, respectively. Then, the opening 27 of the power storage device 20 and the opening 47 of the capacity restoration device 40 are connected to each other so that no space is generated at the joint. The opening 27 and the opening 47 after being connected serve together as an ion inlet 17.

[Step S2]

An electrolyte solution is injected into the capacity restoration device 40 (see FIG. 1B and a step S2 in FIG. 2). Specifically, the electrolyte solution 46 containing at least the same carrier ions as the electrolyte solution 26 is injected into the capacity restoration device 40 in the amount in which the electrolyte solution 46 is in contact with the opening 27 and the third electrode 43. At this time, the solution surface of the electrolyte solution 46 is preferably above the opening 27.

Alternatively, in the case where an electrolyte 48 is put into the capacity restoration device 40 in advance (see FIG. 1C), in the step S2, the electrolyte solution 46 may be formed in the capacity restoration device 40 by injecting a solvent such as water instead of an electrolyte solution. When the capacity restoration device 40 has the above-described mechanism capable of stirring, the electrolyte solution 46 can be formed easily. Note that the electrolyte 48 may be put after the capacity restoration device 40 is connected to the power storage device 20. In the power storage system of one embodiment of the present invention, water can serve as a solvent of the electrolyte solution 46.

[Step S3]

Voltage is applied between the first electrode 21 and the third electrode 43 such that current flows in the direction from the first electrode 21 to the third electrode 43 (see a step S3 in FIG. 2). At this time, the carrier ions contained in the electrolyte solution 46 pass through the carrier ion permeable film 30 and are intercalated into the first electrode 21 through the electrolyte solution 26. Through these three steps, the capacity of the power storage device 20 can be restored.

In the method for restoring the capacity of one embodiment of the present invention, the capacity restoration device 40 can be carried without putting a liquid inside and therefore has high portability. In addition, since the third electrode 43 used at the time of restoring the capacity is provided outside the power storage device 20, the maximum capacity with respect to the battery capacity of the power storage device 20 can be increased.

<Charge and Discharge Reaction of Power Storage Device>

Next, the charging and discharging of the power storage device 20 will be described. In this embodiment, an example in which lithium iron phosphate (LiFePO$_4$) is used as an active material contained in the first electrode 21, graphite is used as an active material contained in the second electrode 22, and an electrolyte solution in which lithium hexafluorophosphate (LiPF$_6$) is dissolved in ethylene carbonate is used as the electrolyte solution 26 is shown. Here, a carrier ion is a lithium ion, and the first electrode 21 and the second electrode 22 function as a positive electrode and a negative electrode, respectively, in charging and discharging the power storage device 20.

Figure 3A:
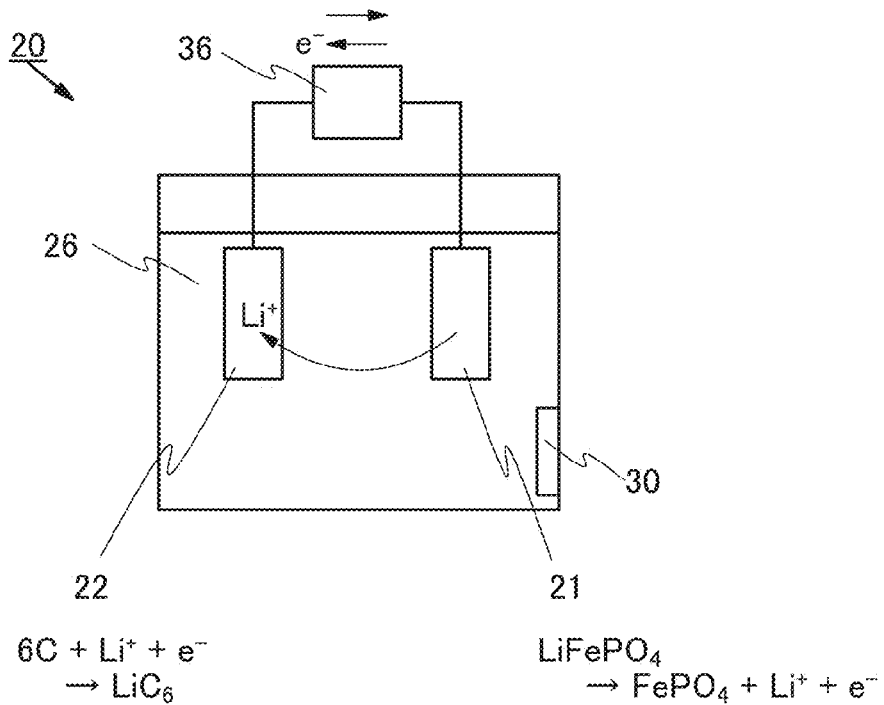
FIGS. 3A and 3B illustrate reaction of an electrode in charging and discharging a power storage device.

FIG. 3A illustrates a connection structure between the power storage device 20 and a charger 36. The charger 36 is connected to the first electrode 21 and the second electrode 22. When the power storage device 20 is charged, a reaction represented by Formula (1) occurs in the first electrode 21.

$$LiFePO_4 \rightarrow FePO_4 + Li^+ + e^- \qquad (1)$$

In addition, a reaction represented by Formula (2) occurs in the second electrode 22.

$$6C + Li^+ + e^- \rightarrow LiC_6 \qquad (2)$$

Figure 3B:
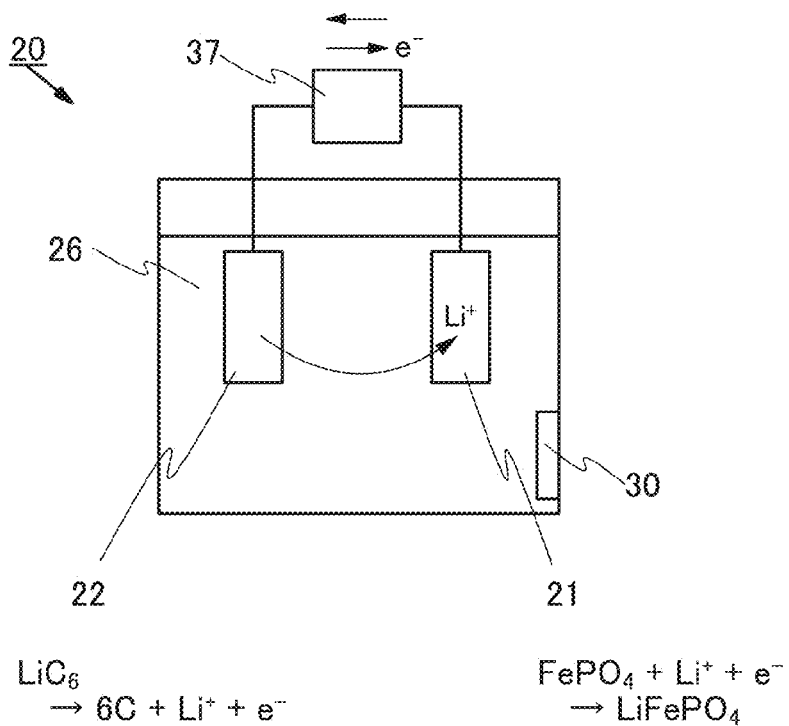

FIG. 3B illustrates a connection structure between the power storage device 20 and a load 37. The load 37 is connected to the first electrode 21 and the second electrode 22. When the power storage device 20 is discharged, a reaction represented by Formula (3) occurs in the first electrode 21.

$$FePO_4 + Li^+ + e^- \rightarrow LiFePO_4 \qquad (3)$$

In addition, a reaction represented by Formula (4) occurs in the second electrode 22.

$$LiC_6 \rightarrow 6C + Li^+ + e^- \qquad (4)$$

Here, a decomposition reaction of the electrolyte solution 26 occurs in the second electrode 22 in charging and in a charged state (a state where charging is completed and held). Specifically, some electrons generated in Formula (1) are wasted and a decomposition product 39 is generated. In some cases, the decomposition product 39 is attached to the surface of the second electrode 22 or precipitated inside the power storage device 20.

In accordance with the amount of electrons used for generating the decomposition product 39, the amount of lithium ions intercalated into the second electrode 22 in charging is also reduced. Thus, in consideration of generation of the decomposition product 39, the reaction in the first electrode 21 can be represented by Formula (5) in the case where charging is performed by connecting the charger 36 to the power storage device 20. Here, x is a positive real number smaller than 1.

$$Li_{1-x}FePO_4 \rightarrow FePO_4 + (1-x)Li^+ + (1-x)e^- \qquad (5)$$

In addition, the reaction in the second electrode 22 can be represented by Formula (6).

$$6(1-x)C + (1-x)Li^+ + (1-x)e^- \rightarrow (1-x)LiC_6 \qquad (6)$$

In a similar manner, the reaction in the first electrode 21 can be represented by Formula (7) in the case where the load 37 is connected to the power storage device 20 to perform discharging.

$$FePO_4 + (1-x)Li^+ + (1-x)e^- \rightarrow Li_{1-x}FePO_4 \qquad (7)$$

In addition, the reaction in the second electrode 22 can be represented by Formula (8).

$$(1-x)LiC_6 \rightarrow 6(1-x)C + (1-x)Li^+ + (1-x)e^- \qquad (8)$$

Note that FIG. 4A illustrates a connection structure between the power storage device 20 and the charger 36 and FIG. 4B illustrates a connection structure between the power storage device 20 and the load 37, in consideration of generation of the decomposition product 39. FIGS. 4A and 4B each illustrate an example in which the decomposition product 39 is precipitated inside the power storage device 20.

<Charge Reaction in Capacity Restoration Treatment of Power Storage Device>

Figure 5:
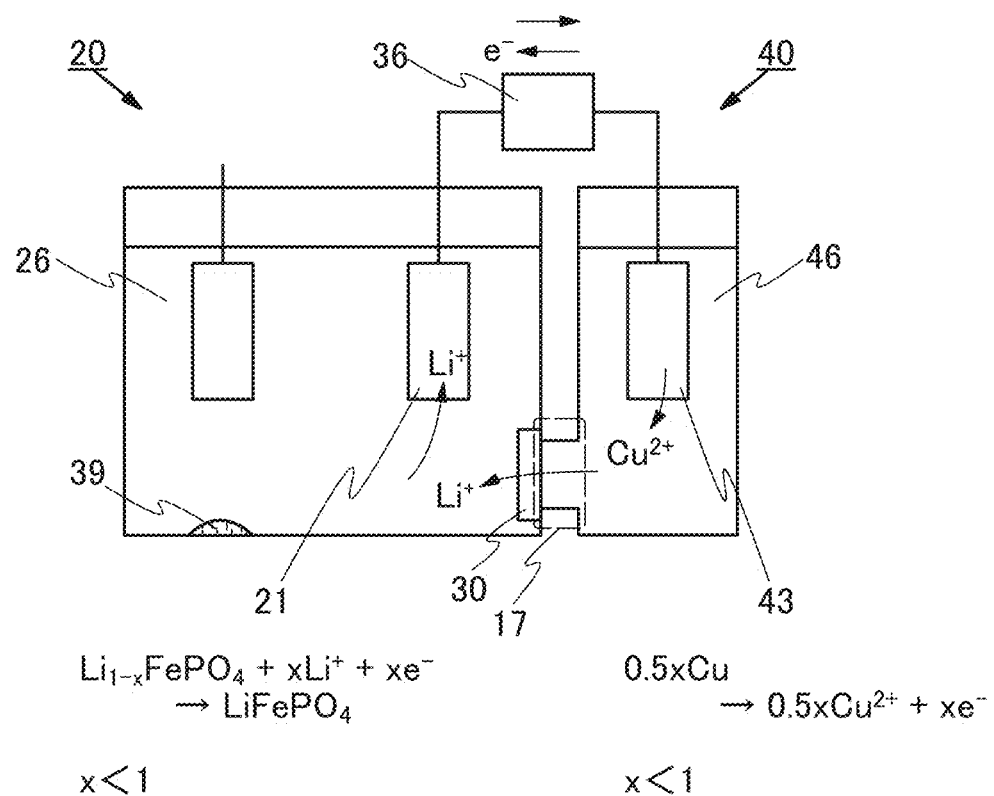
FIG. 5 illustrates reaction of an electrode in capacity restoration treatment of a power storage device.

Next, the capacity restoration treatment of the power storage device 20 will be described. FIG. 5 illustrates a connection structure between the power storage device 20 and the capacity restoration device 40, and the charger 36. The power storage device 20 and the capacity restoration device 40 are connected to each other through the ion inlet 17 and an inlet of the ion inlet 17 on the power storage device 20 side is blocked without any space by the carrier ion permeable film 30. Note that an example in which copper is used as the third electrode 43 and a lithium chloride aqueous solution is used as the electrolyte solution 46 is shown below.

The charger 36 is connected to the first electrode 21 and the third electrode 43, and voltage is applied in the current flow direction from the first electrode 21 to the third electrode 43. At this time, electrons are extracted from copper in the third electrode 43, copper is dissolved in the electrolyte solution 46 as copper ions (Cu$^{2+}$), and the extracted electrons move toward the first electrode 21 through the charger 36. Here, although the ion balance in the electrolyte solution 46 is maintained, lithium ions in the electrolyte solution 46 are released to the electrolyte solution 26 by passing through the carrier ion permeable film 30 in accordance with the amount of dissolved copper ions because the carrier ion permeable film 30 is not permeated by a copper ion. At this time, although the ion balance in the electrolyte solution 26 is maintained, the lithium ions in the electrolyte solution 26 are intercalated into the first electrode 21 because voltage is applied to the first electrode 21 and the third electrode 43.

In the capacity restoration treatment in FIG. 5, the third electrode 43 functions as a positive electrode and the first electrode 21 functions as a negative electrode. The reaction in the first electrode 21 can be represented by Formula (9).

$$Li_{1-x}FePO_4 + xLi^+ + xe^- \rightarrow LiFePO_4 \qquad (9)$$

In addition, the reaction in the third electrode 43 can be represented by Formula (10).

$$0.5xCu \rightarrow 0.5xCu^{2+} + xe^- \qquad (10)$$

In the above manner, the capacity restoration device 40 can make up for lithium ions intercalated into the first electrode 21, which are reduced by repeated charging and discharging of the power storage device 20. Thus, the power storage system of one embodiment of the present invention can restore the reduced capacity of the power storage device 20. Moreover, the power storage device or the power storage system of one embodiment of the present invention can be used for a long time regardless of the initial capacity of the power storage device, so that the cost of the maintenance of the power storage device or the power storage system can be reduced drastically. In general, in a lithium-ion secondary battery, heat is generated owing to contact to air, in particular, water in the air, which might catch fire. The power storage system of one embodiment of the present invention has high safety because the maintenance can be performed without opening the power storage device and the structure of the power storage device can be simplified because no structure is needed to secure high safety of the lithium-ion secondary battery.

At least part of this embodiment can be implemented in combination with any of the other embodiments and an example described in this specification as appropriate.

Embodiment 2

In this embodiment, a structure of a power storage system of one embodiment of the present invention will be described with reference to FIGS. 6A to 6C and FIGS. 7A and 7B.

Figure 6A:
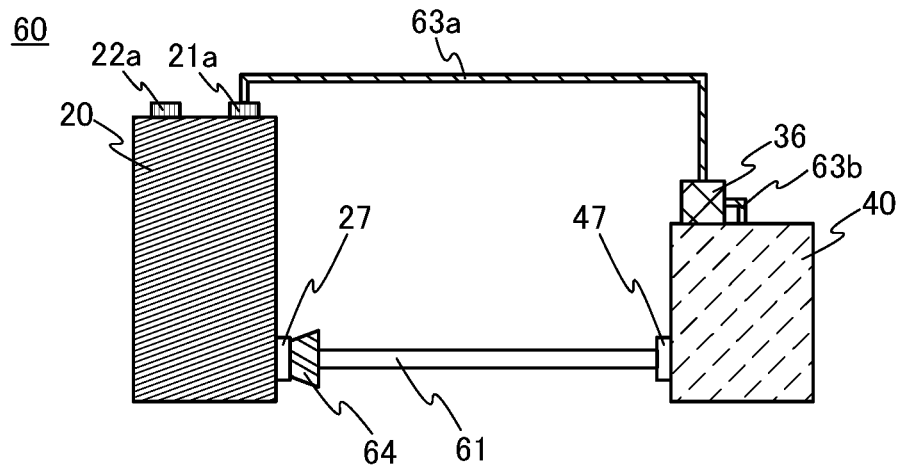
FIGS. 6A to 6C each illustrate a structure of a power storage system.

FIG. 6A is a schematic diagram of a power storage system 60 at the time of capacity restoration treatment. The power storage system 60 includes the power storage device 20 and the capacity restoration device 40. The description of Embodiment 1 can be referred to for the structures of the power storage device 20 and the capacity restoration device 40.

The power storage system 60 includes an ion conducting portion 61, the charger 36, a cable 63a, and a cable 63b. The ion conducting portion 61 has a function of carrying carrier ions while being filled with the electrolyte solution 46.

The ion conducting portion 61 is connected to the opening 27 provided in the exterior body of the power storage device 20 and the opening 47 provided in the exterior body of the capacity restoration device 40 without any space at joints. The ion conducting portion 61 can be connected to at least the opening 27 in an attachable and detachable manner. Although the ion conducting portion 61 is connected to the opening 27 in an attachable and detachable manner by a joint 64 provided at one end portion of the ion conducting portion 61 in this embodiment, the ion conducting portion 61 may have a joint also at the other end portion.

The ion conducting portion 61 preferably has flexibility. The capacity restoration device 40 can be provided in any place of the power storage device 20 as long as the ion conducting portion 61 has flexibility.

A material which has low reactivity with respect to the electrolyte solution of the capacity restoration device 40 and the electrolyte solution from which the electrode of the capacity restoration device 40 is eluted is preferably used for the ion conducting portion 61.

The charger 36 is electrically connected to the first electrode 21 of the power storage device 20 through the cable 63a. In addition, the charger 36 is electrically connected to the third electrode 43 of the capacity restoration device 40 through the cable 63b.

The capacity of the power storage device 20 can be restored by applying current to the first electrode 21 and the third electrode 43 by the charger 36 in the state where the carrier ion permeable film 30 and the electrolyte solution 46 are in contact with each other while the ion conducting portion 61 is filled with the electrolyte solution 46 (see FIG. 5 in Embodiment 1).

The electrolyte solution 46 may be injected into the capacity restoration device 40 after the joint 64 is connected to the opening 27. Alternatively, the electrolyte solution 46 may be formed in the capacity restoration device 40 in such a manner that the electrolyte 48 is put into the capacity restoration device 40 in advance and a solvent such as water is injected after the joint 64 is connected to the opening 27. In the power storage system of one embodiment of the present invention, water can serve as a solvent of the electrolyte solution 46.

Figure 6B:
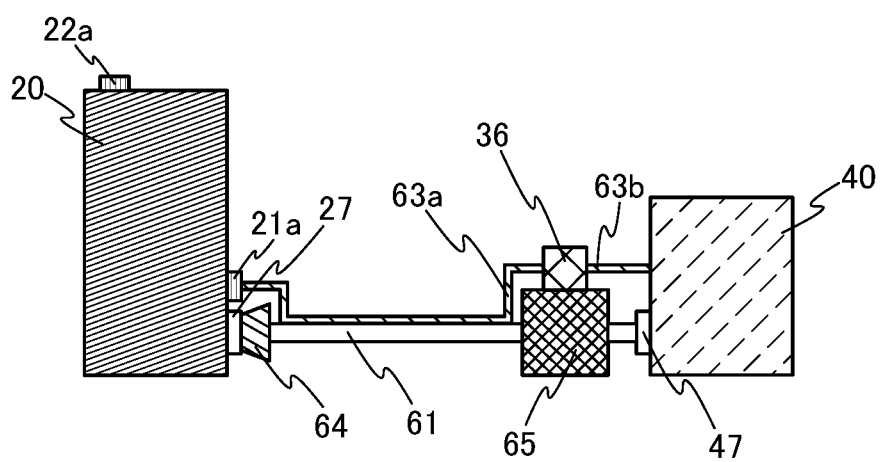

The power storage system 60 preferably includes a pump 65 (see FIG. 6B). The pump 65 is connected to the ion conducting portion 61. The pump 65 has a function of supplying the electrolyte solution 46 to the ion conducting portion 61 and a function of expelling the electrolyte solution 46 from the ion conducting portion 61. With the pump 65 of the power storage system 60, the electrolyte solution 46 can be efficiently transmitted to the ion conducting portion 61. Moreover, the pump 65 can suppress leakage of the electrolyte solution 46 left in the ion conducting portion 61 to the outside when the joint 64 is detached. As the pump 65, a tubing pump can be used, for example. Note that the pump 65 may be provided inside the capacity restoration device 40.

In FIG. 6B, the cable 63a is provided along the ion conducting portion 61. The charger 36 is provided over the pump 65 but may be provided over the capacity restoration device 40 or inside the capacity restoration device 40.

Figure 6C:
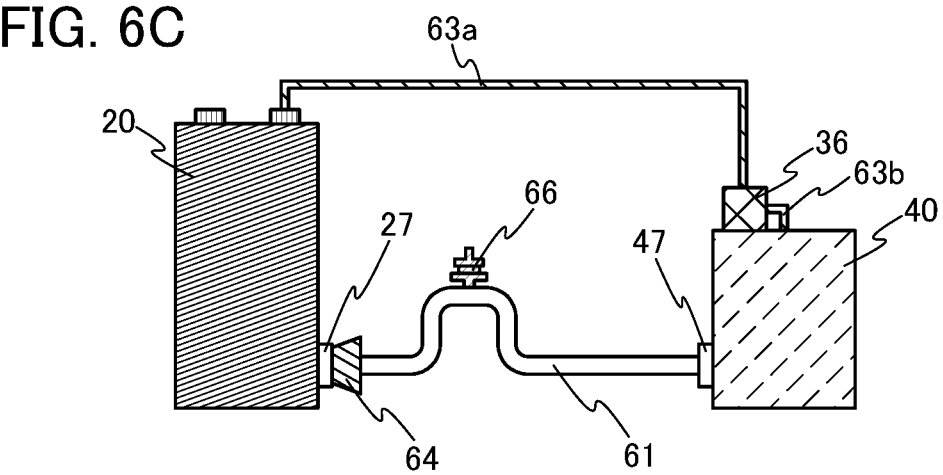

The power storage system 60 preferably includes an air vent 66 (see FIG. 6C). The air vent 66 is connected to the ion conducting portion 61. The air vent 66 has a function of expelling air accumulated inside the ion conducting portion 61.

When the air remains without being expelled at the time of pouring the electrolyte solution 46 from the capacity restoration device 40 to the ion conducting portion 61, the electrolyte solution 46 does not reach the carrier ion permeable film 30 or a contact area of the electrolyte solution 46 with the carrier ion permeable film 30 decreases in some cases. With the air vent 66 of the power storage system 60, the ion conducting portion 61 can be filled with the electrolyte solution 46 without any space. Note that the air vent 66 is preferably provided on the ion conducting portion 61 which is at the highest level from the ground.

Figure 7A:
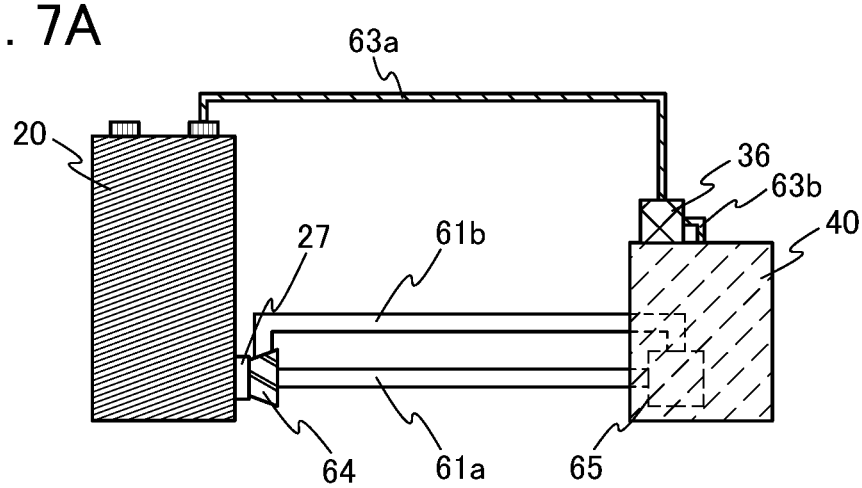
FIGS. 7A and 7B each illustrate a structure of a power storage system.
Figure 7B:
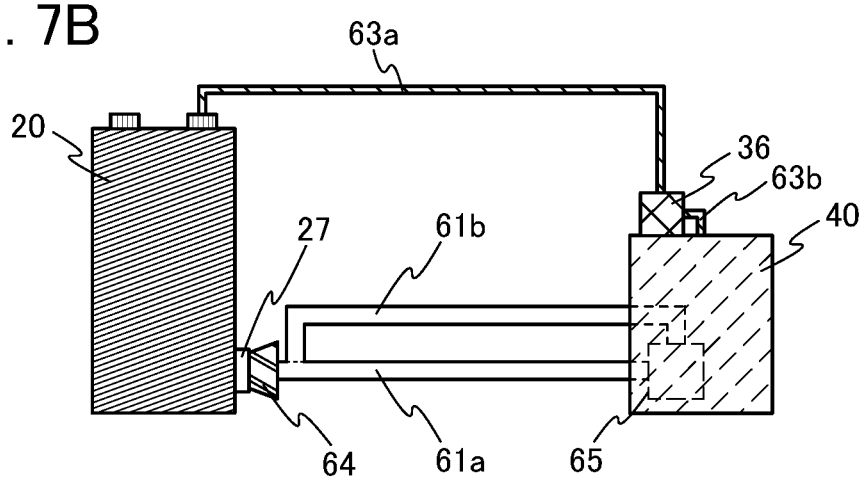

As illustrated in FIG. 7A, the power storage system 60 may have an ion conducting portion 61a and an ion conducting portion 61b. The ion conducting portion 61a and the ion conducting portion 61b are connected to the pump 65 and the joint 64 through different paths. For example, the electrolyte solution 46 transmitted to the ion conducting portion 61a by the pump 65 flows through the ion conducting portion 61b through the joint 64 and flows into the pump 65. With such a structure, the remain of the electrolyte solution 46 near the carrier ion permeable film 30 in the ion conducting portions 61a and 61b can be suppressed. Carrier ions contained in the electrolyte solution 46 near the carrier ion permeable film 30 are consumed when the capacity of the power storage device 20 is restored; therefore, the capacity restoration treatment of the power storage device 20 can be performed at a stable rate by circulating the electrolyte solution 46.

Note that FIG. 7A illustrates an example in which the pump 65 is provided inside the capacity restoration device 40. Instead of the joint 64, the ion conducting portion 61b may be connected to the vicinity of the connection portion of the ion conducting portion 61a and the joint 64 (see FIG. 7B).

At least part of this embodiment can be implemented in combination with any of the other embodiments and an example described in this specification as appropriate.

Embodiment 3

In this embodiment, a structure of a power storage system of one embodiment of the present invention will be described with reference to FIG. 8.

The power storage system of one embodiment of the present invention can perform capacity restoration treatment on two or more power storage devices at the same time in the following manner. Thus, the capacity restoration treatment can be performed efficiently.

Figure 8:
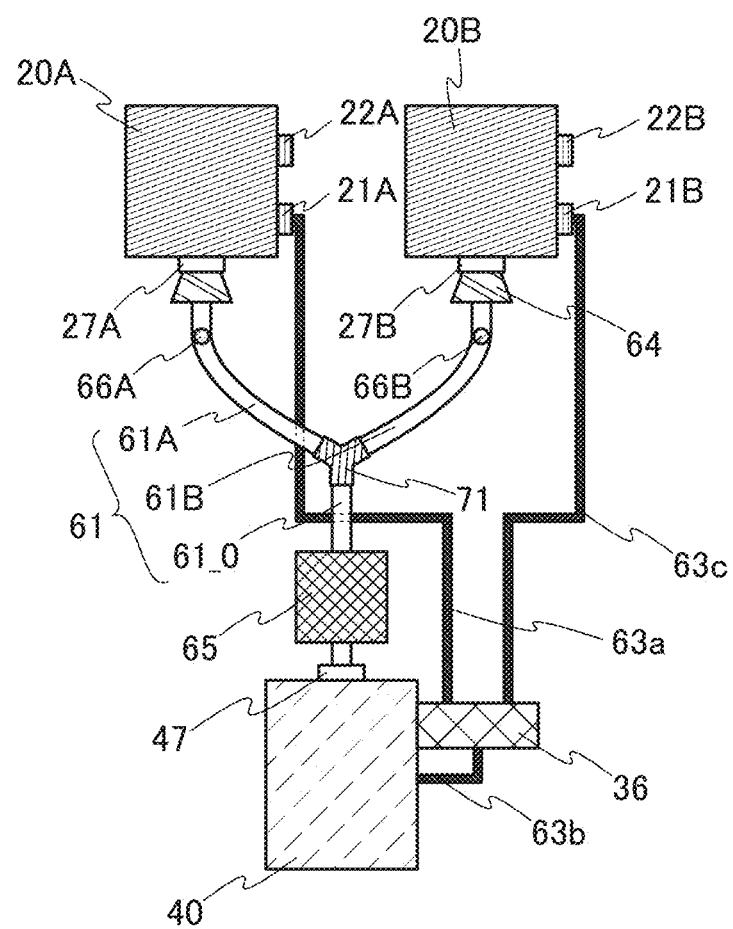
FIG. 8 illustrates a structure of a power storage system.

FIG. 8 is a schematic top view of a power storage system 70. The power storage system 70 includes a power storage device 20A, a power storage device 20B, and the capacity restoration device 40. The description of the power storage device 20 and the description of the capacity restoration device 40 in Embodiment 1 can be referred to for the structures of the power storage device 20A and the power storage device 20B and the structure of the capacity restoration device 40, respectively. In addition, the description of Embodiment 2 can be referred to for the components of the power storage system 70 whose reference numerals are the same as those of the power storage system 60.

The power storage system 70 includes the ion conducting portion 61, the charger 36, the cable 63a, the cable 63b, a cable 63c, and the pump 65.

The ion conducting portion 61 includes a branching portion in addition to the components described in Embodiment 2. The branching portion is provided with a branching connector 71. A conducting portion 61A and a conducting portion 61B which branch from the branching connector 71 are connected to an opening 27A provided in an exterior body of the power storage device 20A and an opening 27B provided in an exterior body of the power storage device 20B, respectively, through the joint 64. The electrolyte solution 46 flowing through a conducting portion 61_0 from the capacity restoration device 40 through the pump 65 flows into both the conducting portion 61A and the conducting portion 61B through the branching connector 71. At this time, the ion conducting portion 61 is filled with the electrolyte solution 46 without any space owing to the functions of an air vent 66A and an air vent 66B.

The charger 36 is electrically connected to the first electrode 21 of the power storage device 20A (hereinafter also referred to as an electrode 21A) through the cable 63a. In addition, the charger 36 is electrically connected to the first electrode 21 of the power storage device 20B (hereinafter also referred to as an electrode 21B) through the cable 63c. Furthermore, the charger 36 is electrically connected to the third electrode 43 of the capacity restoration device 40 through the cable 63b.

It is preferable that the charger 36 electrically connect the electrode 21a and the electrode 21b to the third electrode 43 separately. In addition, it is preferable that the charger 36 determine current applied to the electrode 21a and current applied to the electrode 21b separately. With such structures, the capacity restoration treatment of the power storage device 20A and the power storage device 20B can be performed at the same time. Even when the reduced capacity of the power storage device 20A and the reduced capacity of the power storage device 20B are different, they can be restored to capacity needed for the power storage device 20A and capacity needed for the power storage device 20B.

Note that although the two power storage devices are connected to the capacity restoration device in this embodiment, the description of this embodiment can be referred to for the case where three or more power storage devices are connected.

At least part of this embodiment can be implemented in combination with any of the other embodiments and an example described in this specification as appropriate.

Embodiment 4

In this embodiment, a specific structure example of a power storage device of one embodiment of the present invention will be described with reference to FIGS. 9A to 9C, FIGS. 10A and 10B, FIG. 11, FIGS. 12A and 12B, FIGS. 13A1, 13A2, 13B1, and 13B2, and FIGS. 14A and 14B. Examples of electrical devices will be described with reference to FIGS. 15A and 15B.

A rectangular power storage device is described below. A wound body 993 illustrated in FIG. 9A includes a negative electrode 994, a positive electrode 995, and a separator 996. The negative electrode 994 includes a negative electrode current collector (not illustrated) and a negative electrode active material layer (not illustrated) provided on one or both surfaces of the negative electrode current collector. The positive electrode 995 includes a positive electrode current collector (not illustrated) and a positive electrode active material layer (not illustrated) provided on one or both surfaces of the positive electrode current collector. The wound body 993 is an example of the component group 25 described in Embodiment 1.

The wound body 993 is obtained by winding a sheet of a stack in which the negative electrode 994 overlaps with the positive electrode 995 with the separator 996 located therebetween. The wound body 993 is covered with a rectangular sealed container or the like; thus, a rectangular power storage device is fabricated.

Note that the number of stacks each including the negative electrode 994, the positive electrode 995, and the separator 996 may be determined as appropriate depending on capacity and an element volume which are required. The negative electrode 994 is connected to one of a lead electrode 997 and a lead electrode 998 through the negative electrode current collector. The positive electrode 995 is connected to the other of the lead electrode 997 and the lead electrode 998 through the positive electrode current collector.

In a power storage device 990 illustrated in FIGS. 9B and 9C, the wound body 993 is packed in an exterior body 991. The wound body 993 includes the lead electrode 997 and the lead electrode 998, and is soaked in an electrolyte solution inside a space surrounded by the exterior body 991 and an exterior body 992. For example, a metal material such as stainless steel or aluminum or a resin material can be used for the exterior bodies 991 and 992. With the use of a resin material for the exterior bodies 991 and 992, the exterior bodies 991 and 992 can be changed in their forms when external force is applied; thus, a flexible rectangular power storage device can be fabricated.

In the power storage device 990, an opening 985 is provided in the exterior body 991. A carrier ion permeable film 980 covers the opening 985 without any space. The wound body 993 and the electrolyte solution are covered with a region surrounded by the exterior bodies 991 and 992 and the carrier ion permeable film 980. The capacity of the power storage device 990 can be restored by connecting the capacity restoration device to the opening 985 and implementing the method for restoring the capacity described in Embodiment 1.

<Components of Power Storage Device>

Components of the power storage device 990 will be described below.

[Carrier Ion Permeable Film]

A material similar to that used for the carrier ion permeable film 30 described in Embodiment 1 can be used for the carrier ion permeable film 980.

[Positive Electrode]

The positive electrode includes the positive electrode current collector, the positive electrode active material layer formed over the positive electrode current collector, and the like.

The positive electrode current collector can be formed using a material that has high conductivity and is not eluted with the potential of the positive electrode, such as a metal like stainless steel, gold, platinum, aluminum, or titanium, or an alloy thereof. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon are zirconium, titanium, hafnium, vanadium, niobium, tantalum, chromium, molybdenum, tungsten, cobalt, and nickel. The positive electrode current collector can have a foil-like shape, a plate-like shape (sheet-like shape), a net-like shape, a punching-metal shape, an expanded-metal shape, or the like as appropriate. The positive electrode current collector preferably has a thickness greater than or equal to 5 μm and less than or equal to 30 μm. The surface of the positive electrode current collector may be provided with an undercoat layer using graphite or the like.

The positive electrode active material layer may further include a binder for increasing adhesion of positive electrode active materials, a conductive additive for increasing the conductivity of the positive electrode active material layer, and the like in addition to the positive electrode active materials.

Examples of positive electrode active materials that can be used for the positive electrode active material layer are a composite oxide with an olivine structure, a composite oxide with a layered rock-salt structure, and a composite oxide with a spinel structure. It is particularly preferable to use a composite oxide with an olivine structure including highly stable crystals.

Examples of positive electrode active materials are a composite oxide with a layered rock-salt crystal structure and a composite oxide with a spinel crystal structure. Alternatively, an example of a positive electrode active material is a polyanionic positive electrode material. Examples of polyanionic positive electrode materials are a material with an olivine crystal structure and a material with a NASICON structure.

As the positive electrode active material, various composite oxides can be used. For example, a compound such as $LiFeO_2$, $LiCoO_2$, $LiNiO_2$, $LiMn_2O_4$, $V_2O_5$, $Cr_2O_5$, or $MnO_2$ can be used.

An example of a material with a layered rock-salt crystal structure includes a composite oxide represented by $LiMO_2$. The element M is preferably one or more elements selected from Co and Ni. $LiCoO_2$ is preferable because it has high capacity, stability in the air, and thermal stability, for example. As the element M, one or more elements selected from Al and Mn may be included in addition to one or more elements selected from Co and Ni. For example, it is possible to use $LiCo_xMn_yNi_zO_w$ (x, y, and z are each ⅓ or a neighborhood thereof and w is 2 or a neighborhood thereof, for example).

A neighborhood is a value greater than 0.9 times and smaller than 1.1 times the predetermined value.

For example, as the positive electrode active material, a solid solution containing any of the composite oxides can be used. For example, a solid solution of $LiCo_{1/3}Mn_{1/3}Ni_{1/3}O_2$ and $Li_2MnO_3$ can be used as the positive electrode active material.

An example of a material with a spinel crystal structure includes a composite oxide represented by $LiM_2O_4$. It is preferable to contain Mn as the element M. For example, $LiMn_2O_4$ can be used. It is preferable to contain Ni in addition to Mn as the element M because the discharge voltage and the energy density of the power storage device are improved in some cases. It is preferable to add a small amount of lithium nickel oxide ($LiNiO_2$ or $LiNi_{1-x}M_xO_2$ (M=Co, Al, or the like)) to a lithium-containing material with a spinel crystal structure which contains manganese, such as $LiMn_2O_4$, because characteristics of the power storage device can be improved.

The average diameter of primary particles of the positive electrode active material is preferably greater than or equal to 5 nm and less than or equal to 100 μm, further preferably greater than or equal to 50 nm and less than or equal to 50 μm, and still further preferably greater than or equal to 100 nm and less than or equal to 500 nm, for example. Furthermore, the specific surface area is preferably greater than or equal to 5 m$^2$/g and less than or equal to 15 m$^2$/g. Furthermore, the average diameter of secondary particles is preferably greater than or equal to 5 μm and less than or equal to 50 μm. Note that the average particle diameters can be measured with a particle diameter distribution analyzer or the like using a laser diffraction and scattering method or by observation with a scanning electron microscope (SEM) or a TEM. The specific surface area can be measured by a gas adsorption method.

A conductive material such as a carbon layer may be provided on the surface of the positive electrode active material. Providing a conductive material such as a carbon layer leads to an increase in the conductivity of an electrode. For example, the positive electrode active material can be coated with a carbon layer by mixing a carbohydrate such as glucose at the time of baking the positive electrode active material.

The polyanionic positive electrode material can contain oxygen, an element X, a metal A, and a metal M. The metal M is one or more elements selected from Fe, Mn, Co, Ni, Ti, V, and Nb, the metal A is one or more elements selected from Li, Na, and Mg, and the element X is one or more elements selected from S, P, Mo, W, As, and Si.

Alternatively, a complex material ($LiMPO_4$ (general formula) (M is one or more of Fe(II), Mn(II), Co(II), and Ni(II))) can be used as the positive electrode active material. Typical examples of the general formula $LiMPO_4$ are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFeNi_gCo_hMn_iPO_4$ (f+g+h+i≤1, 0<f<1, 0<g<1, 0<h<1, and 0<i<1).

$LiFePO_4$ is particularly preferable because it properly has properties necessary for the positive electrode active material, such as safety, stability, a high capacity density, and the existence of lithium ions which can be extracted in initial oxidation (in charging).

Alternatively, a complex material such as $Li_{(2-j)}MSiO_4$ (general formula) (M is one or more of Fe(II), Mn(II), Co(II), and Ni(II); $0 \leq j \leq 2$) may be used as the positive electrode active material. Typical examples of the general formula $Li_{(2-j)}MSiO_4$ are lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ ($k+l \leq 1$, $0<k<1$, and $0<l<1$), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ ($m+n+q \leq 1$, $0<m<1$, $0<n<1$, and $0<q<1$), and $Li_{(2-j)}Fe_rNi_sCo_tMn_uSiO_4$ ($r+s+t+u \leq 1$, $0<r<1$, $0<s<1$, $0<t<1$, and $0<u<1$).

Still alternatively, a nasicon compound represented by $A_xM_2(XO_4)_3$ (general formula) (A=Li, Na, or Mg, M=Fe, Mn, Ti, V, or Nb, X=S, P, Mo, W, As, or Si) can be used for the positive electrode active material. Examples of the nasicon compound are $Fe_2(MnO_4)_3$, $Fe_2(SO_4)_3$, and $Li_3Fe_2(PO_4)_3$. Further alternatively, a compound represented by $Li_2MPO_4F$, $Li_2MP_2O_7$, or $Li_5MO_4$ (general formula) (M=Fe or Mn) can be used as the positive electrode active material.

Further alternatively, a polyanionic positive electrode material containing V can be used. Typical examples are α-LiVOPO$_4$, β-LiVOPO$_4$, α1-LiVOPO$_4$, LiVPO$_4$F, LiVPO$_4$O, LiVP$_2$O$_7$, LiVOSO$_4$, Li$_2$VOSiO$_4$, and LiVMoO$_6$.

Further alternatively, a perovskite fluoride such as NaFeF$_3$ and FeF$_3$, a metal chalcogenide (a sulfide, a selenide, or a telluride) such as TiS$_2$ and MoS$_2$, an oxide with an inverse spinel structure such as LiMVO$_4$, a vanadium oxide (V$_2$O$_5$, V$_6$O$_{13}$, LiV$_3$O$_8$, or the like), a manganese oxide, an organic sulfur compound, or the like can be used as the positive electrode active material.

Alternatively, a borate-based positive electrode material represented by LiMBO$_3$ (general formula) (M is one or more of Fe(II), Mn(II), and Co(II)) can be used as the positive electrode active material.

Another example of the positive electrode active material is a lithium-manganese composite oxide represented by a composition formula $Li_aMn_bM_cO_d$. Here, the element M is preferably a metal element other than lithium and manganese, or silicon or phosphorus, further preferably nickel. Furthermore, in the case where the whole particle of a lithium-manganese composite oxide is measured, it is preferable to satisfy the following at the time of discharging: $0<a/(b+c)<2$; $c>0$; and $0.26 \leq (b+c)/d<0.5$. To achieve a high capacity, the lithium-manganese composite oxide preferably includes a region where the surface portion and the middle portion are different in the crystal structure, the crystal orientation, or the oxygen content. In order that such a lithium-manganese composite oxide can be obtained, the composition formula is preferably $1.6 \leq a \leq 1.848$; $0.19 \leq c/b \leq 0.935$; and $2.5 \leq d \leq 3$. Furthermore, it is particularly preferable to use a lithium-manganese composite oxide represented by a composition formula $Li_{1.68}Mn_{0.8062}Ni_{0.318}O_3$. In this specification and the like, a lithium-manganese composite oxide represented by a composition formula $Li_{1.68}Mn_{0.8062}Ni_{0.318}O_3$ refers to that formed at a ratio (molar ratio) of the amounts of raw materials of $Li_2CO_3$:$MnCO_3$:NiO=0.84:0.8062:0.318. Although this lithium-manganese composite oxide is represented by a composition formula $Li_{1.68}Mn_{0.8062}Ni_{0.318}O_3$, the composition might deviate from this.

Note that the ratios of metal, silicon, phosphorus, and other elements to the total composition in the whole particle of a lithium-manganese composite oxide can be measured with, for example, an inductively coupled plasma mass spectrometer (ICP-MS). The ratio of oxygen to the total composition in the whole particle of a lithium-manganese composite oxide can be measured by, for example, energy dispersive X-ray spectroscopy (EDX). Alternatively, the ratio of oxygen to the total composition in the whole particle of a lithium-manganese composite oxide can be measured by ICP-MS combined with fusion gas analysis and valence evaluation of X-ray absorption fine structure (XAFS) analysis. Note that the lithium-manganese composite oxide is an oxide containing at least lithium and manganese, and may contain at least one selected from chromium, cobalt, aluminum, nickel, iron, magnesium, molybdenum, zinc, indium, gallium, copper, titanium, niobium, silicon, phosphorus, and the like.

Figure 10A:
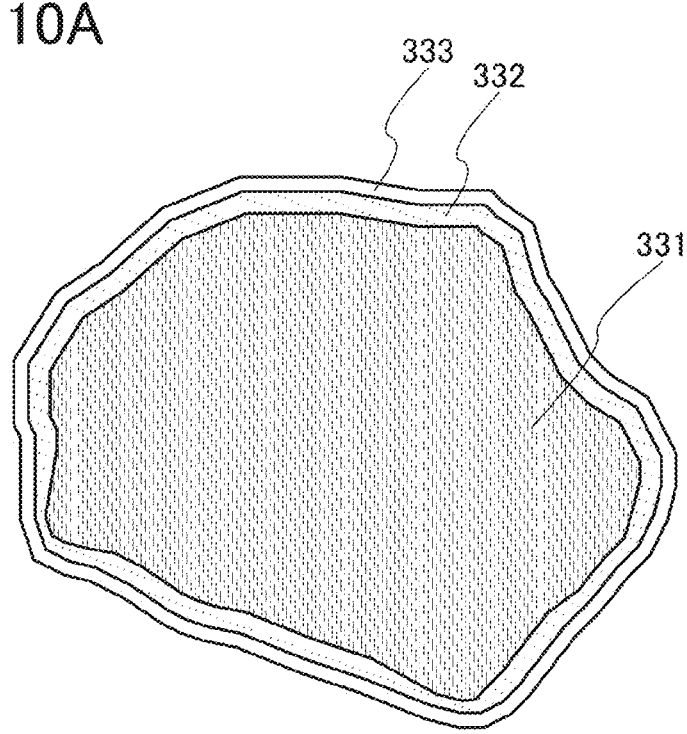
FIGS. 10A and 10B are each a cross-sectional view of a particle.
Figure 10B:
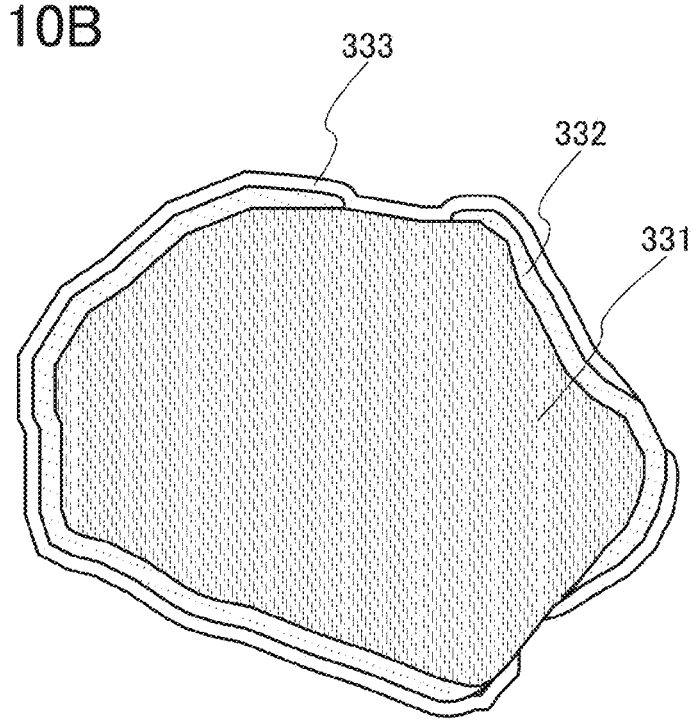

FIGS. 10A and 10B each illustrate an example of a cross-sectional view of a particle of a lithium-manganese composite oxide having a region with different crystal structures, crystal orientations, or oxygen contents.

As illustrated in FIG. 10A, the lithium-manganese composite oxide having a region with different crystal structures, crystal orientations, or oxygen contents preferably include a region 331, a region 332, and a region 333. The region 332 is in contact with at least part of the outer side of the region 331. Here, the term "outer side" refers to the side closer to a surface of a particle. The region 333 preferably includes a region corresponding to a surface of a particle containing the lithium-manganese composite oxide.

As shown in FIG. 10B, the region 331 may include a region not covered with the region 332. The region 332 may include a region not covered with the region 333. Furthermore, the region 331 may include a region in contact with the region 333, for example. Furthermore, the region 331 may include a region covered with neither the region 332 nor the region 333.

The region 332 preferably has a composition different from that of the region 331.

For example, the case will be described where the composition of the region 331 and that of the region 332 are separately measured and the region 331 and the region 332 each contain lithium, manganese, the element M, and oxygen; the atomic ratio of lithium to manganese, the element M, and oxygen in the region 331 is represented by a1:b1:c1:d1; and the atomic ratio of lithium to manganese, the element M, and oxygen in the region 332 is represented by a2:b2:c2:d2. Note that the composition of each of the region 331 and the region 332 can be measured by, for example, EDX using a TEM. In measurement by EDX, the proportion of lithium is sometimes difficult to measure. Thus, a difference between the region 331 and the region 332 in composition except for lithium will be described below. Here, d1/(b1+c1) is preferably greater than or equal to 2.2, further preferably greater than or equal to 2.3, and still further preferably greater than or equal to 2.35 and less than or equal to 3. Furthermore, d2/(b2+c2) is preferably less than 2.2, further preferably less than 2.1, and still further preferably greater than or equal to 1.1 and less than or equal to 1.9. In this case, the composition of the whole particle of lithium-manganese composite oxide including the region 331 and the region 332 also preferably satisfies the above inequality: $0.26 \leq (b+c)/d<0.5$.

The valence of manganese in the region 332 may be different from that of manganese in the region 331. The valence of the element M in the region 332 may be different from that of the element M in the region 331.

Specifically, the region 331 is preferably a lithium-manganese composite oxide having a layered rock-salt crystal structure. The region 332 is preferably a lithium-manganese composite oxide having a spinel crystal structure.

Here, in the case where the compositions of the regions or valences of elements in the regions are spatially distributed, the compositions or valences in a plurality of portions are obtained, the average values thereof are calculated, and the average values are regarded as the compositions or valences of the regions, for example.

A transition layer may be provided between the region 332 and the region 331. The transition layer is a region where the composition, crystal structure, or crystal lattice constant changes continuously or gradually. A mixed layer may be provided between the region 332 and the region 331. The mixed layer is a layer in which, for example, two or more crystals having different crystal orientations are mixed, two or more crystals having different crystal structures are mixed, or two or more crystals having different compositions are mixed.

The region 333 preferably contains carbon or a metal compound. Examples of the metal are cobalt, aluminum, nickel, iron, manganese, titanium, zinc, and lithium. Examples of the metal compound are an oxide and a fluoride of the metal.

It is particularly preferable that the region 333 contain carbon. Since carbon has high conductivity, the particle covered with carbon in the electrode of the power storage device can reduce the resistance of the electrode, for example. The region 333 preferably includes a graphene compound. The use of the graphene compound in the region 333 allows a particle of the lithium-manganese composite oxide to be efficiently coated with the region 333. The graphene compound will be described later. The region 333 may include, specifically, graphene or graphene oxide, for example. Furthermore, graphene formed by reducing graphene oxide is preferably used as graphene. Graphene has excellent electrical characteristics of high conductivity and excellent physical properties of high flexibility and high mechanical strength. When graphene oxide is used for the region 333 and is reduced, the region 332 in contact with the region 333 is oxidized in some cases.

When the region 333 includes a graphene compound, the power storage device using the lithium-manganese composite oxide as a positive electrode material can have improved cycle performance.

The thickness of a layer containing carbon is preferably greater than or equal to 0.4 nm and less than or equal to 40 nm.

In the case where carrier ions are alkali metal ions other than lithium ions, or alkaline-earth metal ions, a material containing an alkali metal (e.g., sodium and potassium) or an alkaline-earth metal (e.g., calcium, strontium, barium, beryllium, and magnesium) instead of lithium may be used as the positive electrode active material. For example, the positive electrode active material may be a layered oxide containing sodium.

As a material containing sodium, an oxide containing sodium, such as $NaFeO_2$, $Na_{2/3}[Fe_{1/2}Mn_{1/2}]O_2$, $Na_{2/3}[Ni_{1/3}Mn_{2/3}]O_2$, $Na_2Fe_2(SO_4)_3$, $Na_3V_2(PO_4)_3$, $Na_2FePO_4F$, $NaVPO_4F$, $NaMPO_4$ (M is one or more of Fe(II), Mn(II), Co(II), and Ni(II)), $Na_2FePO_4F$, and $Na_4Co_3(PO_4)_2P_2O_7$ can be used as the positive electrode active material.

In addition, as the positive electrode active material, a lithium-containing metal sulfide can be used. Examples of the lithium-containing metal sulfide are $Li_2TiS_3$ and $Li_3NbS_4$.

Note that although not illustrated, a conductive material such as a carbon layer may be provided on the surface of the positive electrode active material. Providing a conductive material such as a carbon layer leads to an increase in the conductivity of an electrode. For example, the positive electrode active material can be coated with a carbon layer by mixing a carbohydrate such as glucose at the time of baking the positive electrode active material.

The average diameter of primary particles of the positive electrode active material is preferably greater than or equal to 50 nm and less than or equal to 100 μm.

Examples of the conductive additive include a carbon material, a metal material, and a conductive ceramic material. Alternatively, a fiber material may be used as the conductive additive. The content of the conductive additive in the positive electrode active material layer is preferably greater than or equal to 1 wt % and less than or equal to 10 wt %, further preferably greater than or equal to 1 wt % and less than or equal to 5 wt %.

A network for electric conduction can be formed in the electrode by the conductive additive. The conductive additive also allows maintaining of a path for electric conduction between the positive electrode active material particles. The addition of the conductive additive to the active material layer increases the electric conductivity of the active material layer.

Examples of the conductive additive include natural graphite, artificial graphite such as mesocarbon microbeads, and carbon fiber. Examples of carbon fiber include mesophase pitch-based carbon fiber, isotropic pitch-based carbon fiber, carbon nanofiber, and carbon nanotube. Carbon nanotube can be formed by, for example, a vapor deposition method. Other examples of the conductive additive include carbon materials such as carbon black (e.g., acetylene black (AB)), graphite (black lead) particles, graphene, and fullerene. Alternatively, metal powder or metal fibers of copper, nickel, aluminum, silver, gold, or the like, a conductive ceramic material, or the like can be used.

Flaky graphene has the excellent electrical characteristic of high conductivity and the excellent physical properties of high flexibility and high mechanical strength. Thus, the use of graphene as the conductive additive can increase contact points and the contact area of particles of an active material.

Note that graphene in this specification refers to single-layer graphene or multilayer graphene including two or more and a hundred or less layers. Single-layer graphene refers to a sheet of one atomic layer of carbon molecules having π bonds. Graphene oxide refers to a compound formed by oxidation of such graphene. When graphene oxide is reduced to form graphene, oxygen contained in the graphene oxide is not entirely released and part of the oxygen remains in the graphene. In the case where graphene contains oxygen, the proportion of oxygen in the graphene measured by XPS is higher than or equal to 2 atomic % and lower than or equal to 11 atomic %, preferably higher than or equal to 3 atomic % and lower than or equal to 10 atomic %.

Graphene is capable of making low-resistance surface contact and has extremely high conductivity even with a small thickness. Therefore, even a small amount of graphene can efficiently form a conductive path in an active material layer.

In the case where an active material with a small average particle diameter (e.g., 1 μm or less) is used, the specific surface area of the active material is large and thus more conductive paths for the active material particles are needed. In such a case, it is particularly preferable to use graphene, which has extremely high conductivity and can efficiently form a conductive path even in a small amount.

A cross-sectional structure example of a positive electrode active material layer containing graphene as a conductive additive is described below. Note that a negative electrode active material layer may contain graphene as a conductive additive.

Figure 11:
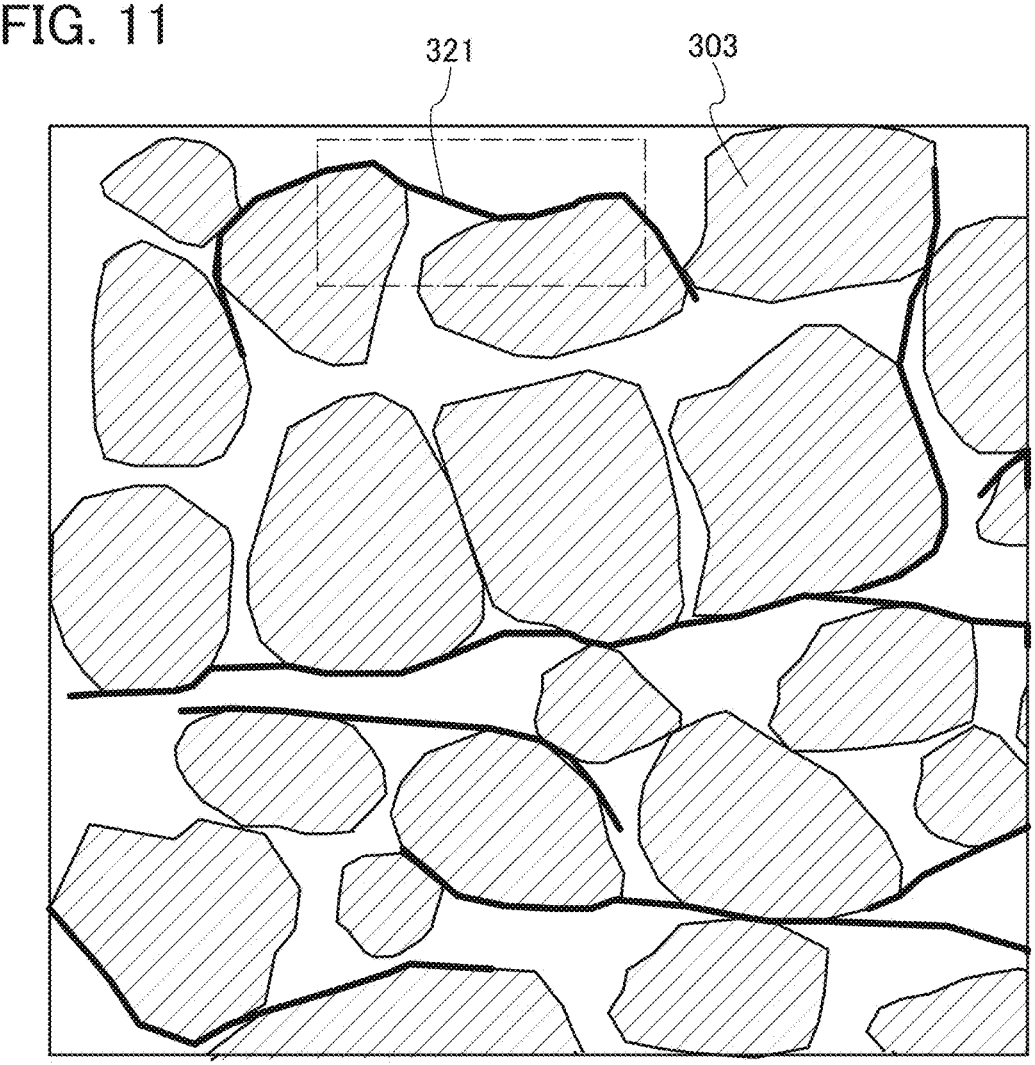
FIG. 11 is a cross-sectional view of an active material.

FIG. 11 is a longitudinal sectional view of the positive electrode active material layer. Here, the longitudinal section refers to a section substantially perpendicular to a surface. The positive electrode active material layer includes active material particles 303, graphene 321 as a conductive additive, and a binder (not illustrated).

The longitudinal section of the positive electrode active material layer in FIG. 11 shows substantially uniform dispersion of the sheet-like graphene 321 in the positive electrode active material layer. The graphene 321 is schematically shown by thick lines in FIG. 11 but are actually thin films each having a thickness corresponding to the thickness of a single layer or a multi-layer of carbon molecules. The plurality of graphene 321 are formed in such a way as to wrap, coat, or adhere to the surfaces of the plurality of active material particles 303, so that the graphene 321 make surface contact with the active material particles 303. Furthermore, the graphene 321 are also in surface contact with each other; consequently, the plurality of graphene 321 form a three-dimensional network for electric conduction.

This is because graphene oxide flakes with extremely high dispersibility in a polar solvent is used for the formation of the graphene 321. The solvent is removed by volatilization from a dispersion medium in which graphene oxide flakes are uniformly dispersed, and the graphene oxide flakes are reduced to graphene flakes; hence, the graphene 321 remaining in the positive electrode active material layer partly overlap with each other and are dispersed such that surface contact is made, thereby forming an electrical conduction path. Note that graphene oxide flakes can be reduced either by heat treatment or with the use of a reducing agent, for example.

Unlike a conductive additive in the form of particles, such as acetylene black, which makes point contact with an active material, the graphene 321 is capable of making low-resistance surface contact; accordingly, the electrical conduction between the active material particles 303 and the graphene 321 can be improved without an increase in the amount of a conductive additive. Thus, the proportion of the active material particles 303 in the positive electrode active material layer can be increased. This can increase the discharge capacity of a power storage device.

Graphene flakes can be bonded to each other to form net-like graphene (hereinafter referred to as a graphene net). The graphene net covering the active material can function as a binder for binding particles. The amount of a binder can thus be reduced, or the binder does not have to be used. This can increase the proportion of the active material in the electrode volume or weight. That is to say, the capacity of the power storage device can be increased.

Various methods can be used for forming an electrode which is used for the power storage device of one embodiment of the present invention. For example, in the case where an active material layer is formed over a current collector by a coating method, the active material, the binder, the conductive additive, and the dispersion medium (also referred to as a solvent) are mixed to form a paste, the paste is applied to the current collector, and the dispersion medium is vaporized. Here, the conductive additive is not necessarily used for forming the electrode. After that, the active material layer may be pressed by a compression method such as a roll press method or a flat plate press method so as to be consolidated if necessary.

As the dispersion medium, water, a polar organic solvent such as N-methylpyrrolidone (NMP) or dimethylformamide can be used, for example. Water is preferably used in terms of the safety and cost.

It is preferable for the binder to include, for example, water-soluble polymers. As the water-soluble polymers, a polysaccharide or the like can be used, for example. As the polysaccharide, a cellulose derivative such as carboxymethyl cellulose (CMC), methyl cellulose, ethyl cellulose, hydroxypropyl cellulose, diacetyl cellulose, or regenerated cellulose, starch, or the like can be used.

As the binder, a rubber material such as styrene-butadiene rubber (SBR), styrene-isoprene-styrene rubber, acrylonitrile-butadiene rubber, butadiene rubber, fluorine rubber, or ethylene-propylene-diene copolymer is preferably used. Any of these rubber materials is further preferably used in combination with the aforementioned water-soluble polymers.

Alternatively, as the binder, a material such as polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, polyisobutylene, polyethylene terephthalate, nylon, polyvinylidene fluoride (PVdF), polyacrylonitrile (PAN), ethylene-propylene-diene polymer, polyvinyl acetate, or nitrocellulose is preferably used.

Two or more of the above materials may be used in combination for the binder.

The content of the binder in the positive electrode active material layer is preferably greater than or equal to 1 wt % and less than or equal to 10 wt %, further preferably greater than or equal to 2 wt % and less than or equal to 8 wt %, and still further preferably greater than or equal to 3 wt % and less than or equal to 5 wt %. The content of the conductive additive in the positive electrode active material layer is preferably greater than or equal to 1 wt % and less than or equal to 10 wt % and further preferably greater than or equal to 1 wt % and less than or equal to 5 wt %.

In the case where the positive electrode active material layer is formed by a coating method, the positive electrode active material, the binder, and the conductive additive are mixed to form a positive electrode paste (slurry), and the positive electrode paste is applied to the positive electrode current collector and dried.

The negative electrode includes the negative electrode current collector, the negative electrode active material layer formed over the negative electrode current collector, and the like.

The negative electrode current collector can be formed using a material that has high conductivity and is not alloyed with a carrier ion of lithium or the like, such as a metal like stainless steel, gold, platinum, iron, copper, titanium, or an alloy thereof. Alternatively, an aluminum alloy to which an element which improves heat resistance, such as silicon, titanium, neodymium, scandium, or molybdenum, is added can be used. The negative electrode current collector can have a foil-like shape, a plate-like shape (sheet-like shape), a net-like shape, a punching-metal shape, an expanded-metal shape, or the like as appropriate. The negative electrode current collector may have a thickness greater than or equal to 5 μm and less than or equal to 30 μm. The surface of the negative electrode current collector may be provided with an undercoat layer using graphite or the like.

The negative electrode active material layer may further include, in addition to the negative electrode active material, a binder for increasing adhesion of the negative electrode active material, a conductive additive for increasing the conductivity of the negative electrode active material layer, and the like. For the materials of the binder and the conductive additive which are used for the negative electrode active material layer, the materials of the binder and the conductive additive which are used for the positive electrode active material layer are referred to.

A material with which lithium can be dissolved and precipitated or a material which can reversibly react with lithium ions can be used for a negative electrode active material; for example, a lithium metal, a carbon-based material, an alloy-based material, or the like can be used.

The lithium metal is preferable because of its low redox potential (3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, and pitch-based artificial graphite, and natural graphite such as spherical natural graphite.

Graphite has a low potential substantially equal to that of a lithium metal (0.1 V to 0.3 V vs. Li/Li$^+$) when lithium ions are intercalated into the graphite (while a lithium-graphite intercalation compound is formed). For this reason, a power storage device can have a high operating voltage. In addition, graphite is preferable because of its advantages such as relatively high capacity per unit volume, small volume expansion, low cost, and safety greater than that of a lithium metal.

As the negative electrode active material, other than the above carbon materials, an alloy-based material which enables charge-discharge reaction by alloying and dealloying reaction with carrier ions can be used. In the case where carrier ions are lithium ions, for example, a material containing at least one element of Mg, Ca, Al, Si, Ge, Sn, Pb, As, Sb, Bi, Ag, Au, Zn, Cd, Hg, In, and the like can be used as the alloy-based material. Such elements have higher capacity than carbon. In particular, silicon has a significantly high theoretical capacity of 4200 mAh/g. For this reason, silicon is preferably used as the negative electrode active material. Examples of the alloy-based material including such elements are $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn.

Alternatively, for the negative electrode active material, an oxide such as SiO, SnO, $SnO_2$, titanium dioxide ($TiO_2$), lithium titanium oxide ($Li_4Ti_5O_{12}$), niobium pentoxide ($Nb_2O_5$), tungsten oxide ($WO_2$), or molybdenum oxide ($MoO_2$) can be used. Further alternatively, as the negative electrode active material, lithium-graphite intercalation compound ($Li_xC_6$) can be used.

Note that SiO refers to the powder of a silicon oxide including a silicon-rich portion and can also be referred to as $SiO_y$ (2>y>0). Examples of SiO include a material containing one or more of $Si_2O_3$, $Si_3O_4$, and $Si_2O$ and a mixture of Si powder and silicon dioxide ($SiO_2$). Furthermore, SiO may contain another element (e.g., carbon, nitrogen, iron, aluminum, copper, titanium, calcium, and manganese). In other words, SiO refers to a colored material containing two or more of single crystal silicon, amorphous silicon, polycrystal silicon, $Si_2O_3$, $Si_3O_4$, $Si_2O$, and $SiO_2$. Thus, SiO can be distinguished from $SiO_x$ (x is 2 or more), which is clear and colorless or white. Note that in the case where a power storage device is fabricated using SiO as a material of the negative electrode active material and the SiO is oxidized because of repeated charge and discharge cycles, SiO is changed into $SiO_2$ in some cases.

Still alternatively, as the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of a high charge capacity and a discharge capacity (900 mAh/g and 1890 mAh/cm$^3$).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used as the negative electrode active material. For example, a transition metal oxide with which an alloying reaction with lithium is not caused, such as cobalt oxide (CoO), nickel oxide (NiO), or iron oxide (FeO), may be used for the negative electrode active material. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, or CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides may be used as a positive electrode active material because of its high potential.

In the case where the negative electrode active material layer is formed by a coating method, the negative electrode active material and the binder are mixed to form a negative electrode paste (slurry), and the negative electrode paste is applied to the negative electrode current collector and dried.

Graphene may be formed on a surface of the negative electrode active material layer. In the case of using silicon as the negative electrode active material, the volume of silicon is greatly changed due to occlusion and release of carrier ions in charge-discharge cycles. Therefore, adhesion between the negative electrode current collector and the negative electrode active material layer is decreased, resulting in degradation of battery characteristics caused by charging and discharging. Thus, graphene is preferably formed on a surface of the negative electrode active material layer containing silicon because even when the volume of silicon is changed in charge-discharge cycles, decrease in the adhesion between the negative electrode current collector and the negative electrode active material layer can be inhibited, which makes it possible to reduce degradation of battery characteristics.

Alternatively, a film of an oxide or the like may be formed on the surface of the negative electrode active material layer. A film formed by decomposition or the like of an electrolyte solution or the like in charging cannot release electric charges used at the formation, and therefore forms irreversible capacity. In contrast, the film of an oxide or the like provided on the surface of the negative electrode active material layer in advance can reduce or prevent generation of irreversible capacity.

As the film covering the negative electrode active material layer, an oxide film of any one of niobium, titanium, vanadium, tantalum, tungsten, zirconium, molybdenum, hafnium, chromium, aluminum, and silicon or an oxide film containing any one of these elements and lithium can be used. Such a film is much denser than a conventional film formed on a surface of a negative electrode due to a decomposition product of an electrolyte solution.

For example, niobium oxide ($Nb_2O_5$) has a low electric conductivity of $10^{-9}$ S/cm and a high insulating property. For this reason, a niobium oxide film inhibits electrochemical decomposition reaction between the negative electrode active material and the electrolyte solution. On the other hand, niobium oxide has a lithium diffusion coefficient of $10^{-9}$ cm$^2$/sec and high lithium ion conductivity. Therefore, niobium oxide can transmit lithium ions. Alternatively, silicon oxide or aluminum oxide may be used.

A sol-gel method can be used to form a film that covers the negative electrode active material layer, for example. The sol-gel method is a method for forming a thin film in such a manner that a solution of metal alkoxide, a metal salt, or the like is changed into a gel, which has lost its fluidity, by hydrolysis reaction and polycondensation reaction and the gel is baked. Since a thin film is formed from a liquid phase in the sol-gel method, raw materials can be mixed uniformly on the molecular scale. For this reason, by adding a negative electrode active material such as graphite to a raw material of the metal oxide film which is a solvent, the active material can be easily dispersed into the gel. In such a manner, the film can be formed on the surface of the negative electrode active material layer. A decrease in the capacity of the power storage device can be prevented by using the film.

[Separator]

As a material of the separator, a porous insulator such as fiber containing cellulose typified by paper, polypropylene (PP), polyethylene (PE), polybutene, nylon, polyester, polysulfone, polyacrylonitrile, polyvinylidene fluoride, or tetrafluoroethylene can be used. Alternatively, nonwoven fabric of a glass fiber or the like, or a diaphragm in which a glass fiber and a polymer fiber are mixed may be used.

The separator may have a multilayer structure. For example, an organic material film such as polypropylene or polyethylene can be coated with a ceramic-based material, a fluorine-based material, a polyamide-based material, a mixture thereof, or the like. Examples of the ceramic-based material are aluminum oxide particles and silicon oxide particles. Examples of the fluorine-based material are PVDF and a polytetrafluoroethylene. Examples of the polyamide-based material are nylon and aramid (meta-based aramid and para-based aramid).

Deterioration of the separator in charging and discharging at high voltage can be suppressed and thus the reliability of the power storage device can be improved because oxidation resistance is improved when the separator is coated with the ceramic-based material. In addition, when the separator is coated with the fluorine-based material, the separator is easily brought into close contact with an electrode, resulting in high output characteristics. When the separator is coated with the polyamide-based material, in particular, aramid, the safety of the power storage device is improved because heat resistance is improved.

For example, both surfaces of a polypropylene film may be coated with a mixed material of aluminum oxide and aramid. Alternatively, a surface of the polypropylene film in contact with the positive electrode may be coated with the mixed material of aluminum oxide and aramid and a surface of the polypropylene film in contact with the negative electrode may be coated with the fluorine-based material.

With the use of a separator having a multilayer structure, the capacity of the power storage device per volume can be increased because the safety of the power storage device can be maintained even when the total thickness of the separator is small.

[Electrolyte Solution]

As a solvent for the electrolyte solution, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, ethyl acetate, methyl propionate, ethyl propionate, propyl propionate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a gelled high-molecular material is used as the solvent for the electrolyte solution, safety against liquid leakage is improved. Furthermore, the power storage device can be thinner and more lightweight. Typical examples of gelled high-molecular material include a silicone gel, an acrylic gel, an acrylonitrile-based gel, a polyethylene oxide-based gel, a polypropylene oxide-based gel, a fluorine-based polymer gel, and the like.

Alternatively, the use of one or more ionic liquids (room temperature molten salts) which are less likely to burn and volatilize as the solvent for the electrolyte solution can prevent the power storage device from exploding or catching fire even when the power storage device internally shorts out or the internal temperature increases due to overcharging or the like.

In the case of using lithium ions as carriers, as an electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2Bl_2Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)$ $(CF_3SO_2)$, and $LiN(C_2F_5SO_2)_2$ can be used, or two or more of these lithium salts can be used in an appropriate combination in an appropriate ratio.

The electrolyte solution used for the power storage device preferably contains a small amount of dust particles and elements other than the constituent elements of the electrolyte solution (hereinafter, also simply referred to as impurities) so as to be highly purified. Specifically, the weight ratio of impurities to the electrolyte solution is less than or equal to 1%, preferably less than or equal to 0.1% and further preferably less than or equal to 0.01%.

Furthermore, an additive agent such as vinylene carbonate, propane sultone (PS), tert-butylbenzene (TBB), fluoroethylene carbonate (FEC), lithium bis(oxalatoborate) (Li-BOB), or a dinitrile compound such as succinonitrile or adiponitrile may be added to the electrolyte solution. The concentration of such an additive agent in the whole solvent is, for example, higher than or equal to 0.1 wt % and lower than or equal to 5 wt %.

<Another Structure Example of Power Storage Device>

A structure example of a semiconductor device including the power storage device of one embodiment of the present invention will be described below.

Figure 12A:
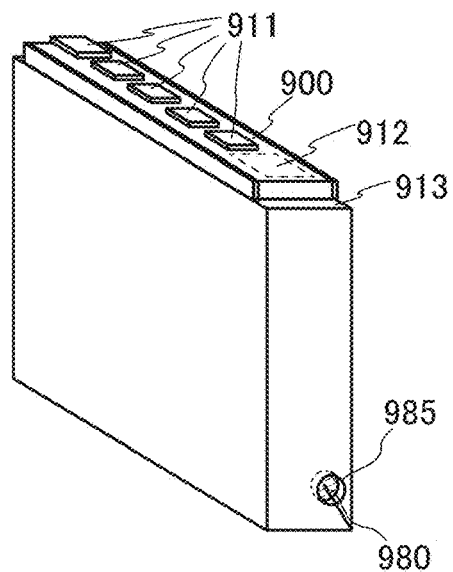
FIGS. 12A and 12B each illustrate an example of a power storage device.
Figure 12B:
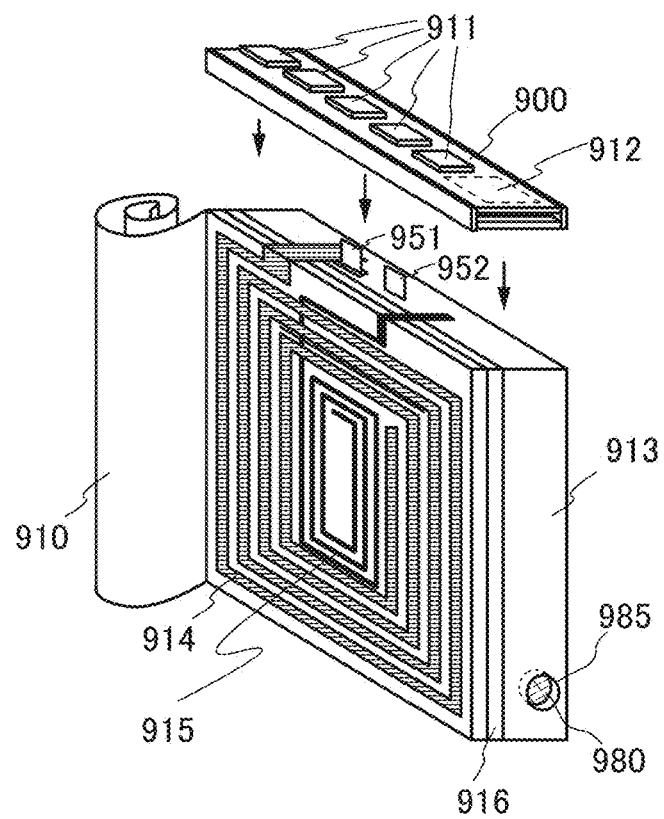

FIGS. 12A and 12B are external views of a semiconductor device. The semiconductor device includes a circuit board 900 and a power storage device 913. A label 910 is attached to the power storage device 913. As illustrated in FIG. 12B, the semiconductor device further includes a terminal 951, a terminal 952, an antenna 914, and an antenna 915. An opening 985 is provided in an exterior body of the semiconductor device, and the carrier ion permeable film 980 is provided so as to block the opening 985 without any space.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided. Note that the circuit 912 may include a transistor, a capacitor, or the like.

The circuit 912 may be provided on the rear surface of the circuit board 900 (a surface opposite to a surface where the terminal 911 is projected). The shape of each of the antennas 914 and 915 is not limited to a coil shape and may be a linear shape or a plate shape. Furthermore, a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The semiconductor device includes a layer 916 between the power storage device 913 and the antennas 914 and 915. The layer 916 may have a function of blocking an electromagnetic field by the power storage device 913. As the layer 916, for example, a magnetic body can be used.

Note that the structure of the semiconductor device is not limited to that illustrated in FIGS. 12A and 12B.

For example, as illustrated in FIGS. 13A1 and 13A2, two opposite surfaces of the power storage device 913 in FIGS. 12A and 12B may be provided with respective antennas. FIG. 13A1 is an external view illustrating one side of the opposite surfaces, and FIG. 13A2 is an external view illustrating the other side of the opposite surfaces. The description of the semiconductor device illustrated in FIGS. 12A and 12B can be referred to as appropriate for portions similar to those in FIGS. 12A and 12B.

As illustrated in FIG. 13A1, the antenna 914 is provided on one of the opposite surfaces of the power storage device 913 with the layer 916 interposed therebetween, and as illustrated in FIG. 13A2, the antenna 915 is provided on the other of the opposite surfaces of the power storage device 913 with a layer 917 interposed therebetween. The layer 917 may have a function of blocking an electromagnetic field by the power storage device 913. As the layer 917, for example, a magnetic body can be used.

With the above structure, both of the antennas 914 and 915 can be increased in size.

Alternatively, as illustrated in FIGS. 13B1 and 13B2, two opposite surfaces of the power storage device 913 in FIGS. 12A and 12B may be provided with different types of antennas. FIG. 13B1 is an external view illustrating one side of the opposite surfaces, and FIG. 13B2 is an external view illustrating the other side of the opposite surfaces. The description of the semiconductor device illustrated in FIGS. 12A and 12B can be referred to as appropriate for portions similar to those in FIGS. 12A and 12B.

As illustrated in FIG. 13B1, the antennas 914 and 915 are provided on one of the opposite surfaces of the power storage device 913 with the layer 916 interposed therebetween, and as illustrated in FIG. 13B2, an antenna 918 is provided on the other of the opposite surfaces of the power storage device 913 with the layer 917 interposed therebetween. The antenna 918 has a function of communicating data with an external device, for example. An antenna with a shape that can be applied to the antennas 914 and 915, for example, can be used as the antenna 918. As a system for communication using the antenna 918 between the semiconductor device and another device, a response method that can be used between the semiconductor device and another device, such as NFC, can be employed.

Figure 14A:
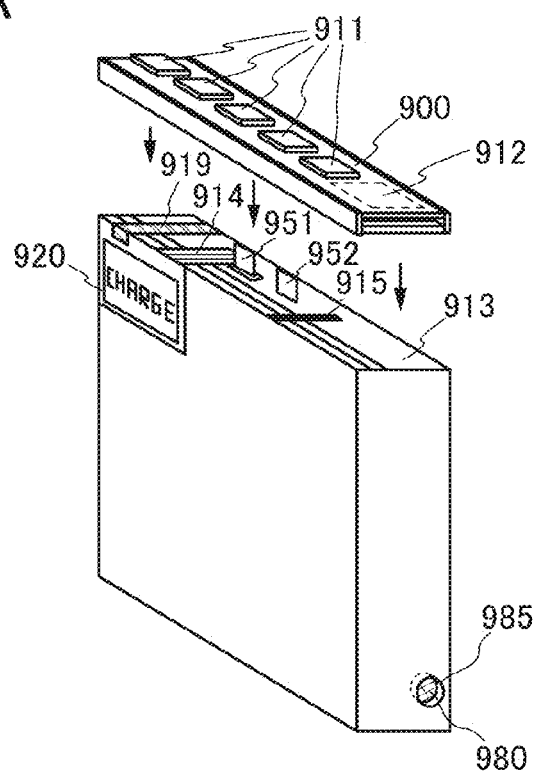
FIGS. 14A and 14B each illustrate an example of a power storage device.

Alternatively, as illustrated in FIG. 14A, the power storage device 913 in FIGS. 12A and 12B may be provided with a display device 920. The display device 920 is electrically connected to the terminal 911 via a terminal 919. The description of the semiconductor device illustrated in FIGS. 12A and 12B can be referred to as appropriate for portions similar to those in FIGS. 12A and 12B.

The display device 920 can display, for example, an image showing whether charging is being carried out, an image showing the amount of stored power, or the like. As the display device 920, electronic paper, a liquid crystal display device, or an electroluminescent (EL) display device can be used, for example. For example, the use of electronic paper can reduce power consumption of the display device 920.

Figure 14B:
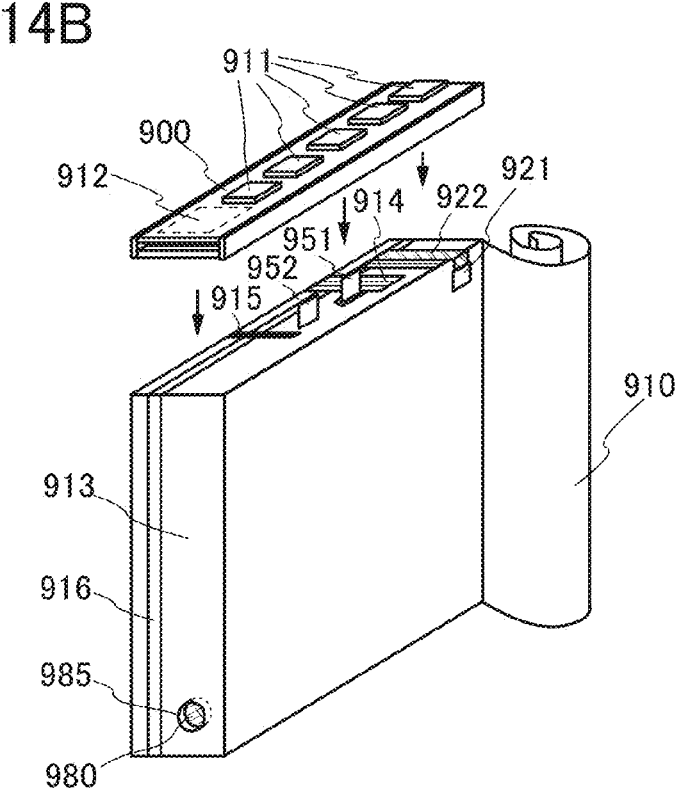

Alternatively, as illustrated in FIG. 14B, the power storage device 913 illustrated in FIGS. 12A and 12B may be provided with a sensor 921. The sensor 921 is electrically connected to the terminal 911 via a terminal 922. The description of the semiconductor device illustrated in FIGS. 12A and 12B can be referred to as appropriate for portions similar to those in FIGS. 12A and 12B.

As the sensor 921, a sensor that has a function of measuring, for example, force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used. With the sensor 921, for example, data on an environment (e.g., temperature) where the semiconductor device is placed can be detected and stored in a memory inside the circuit 912.

[Examples of Electrical Devices: Vehicles]

Next, examples of vehicles including the power storage device of one embodiment of the present invention will be described. The use of power storage devices in vehicles enables production of next-generation clean energy vehicles such as hybrid electric vehicles (HEVs), electric vehicles (EVs), and plug-in hybrid electric vehicles (PHEVs).

Figure 15A:
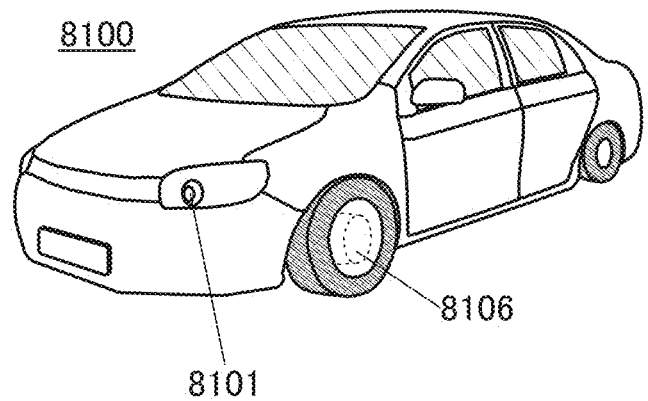
FIGS. 15A and 15B illustrate application modes of a power storage device.
Figure 15B:
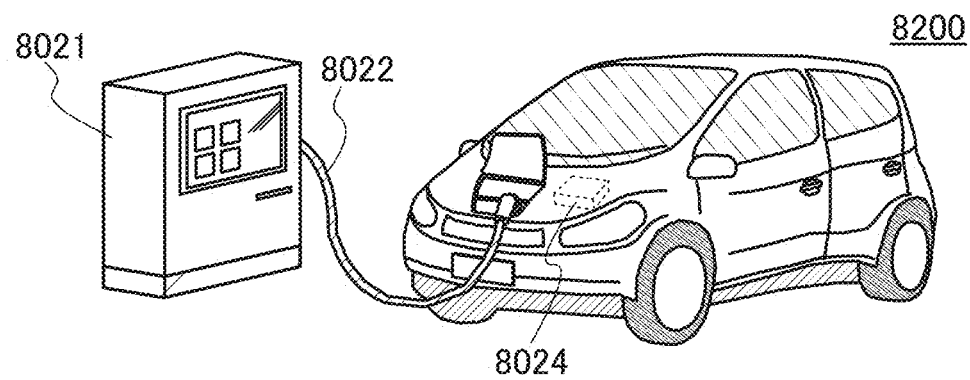

FIGS. 15A and 15B each illustrate an example of a vehicle including the power storage device of one embodiment of the present invention. An automobile 8500 illustrated in FIG. 15A is an electric vehicle that runs on the power of an electric motor. Alternatively, the automobile 8500 is a hybrid electric vehicle capable of driving using either an electric motor or an engine as appropriate. One embodiment of the present invention can provide a high-mileage vehicle. The power storage device included in the vehicle is used not only for driving the electric motor 8506, but also for supplying electric power to a light-emitting device such as a headlight 8501 or a room light (not illustrated).

The power storage device can also supply electric power to a display device of a speedometer, a tachometer, or the like included in the automobile 8500. Furthermore, the power storage device can supply electric power to a semiconductor device included in the automobile 8500, such as a navigation system.

FIG. 15B illustrates an automobile 8550 including a power storage device 8524. The automobile 8550 can be charged when the power storage device 8524 is supplied with electric power through external charging equipment by a plug-in system, a contactless power feeding system, or the like. In FIG. 15B, the power storage device 8524 is charged with the use of a ground-based charging apparatus 8521 through a cable 8522. In charging, a given method such as CHAdeMO (registered trademark) or Combined Charging System may be employed as a charging method, the standard of a connector, or the like as appropriate. The ground-based charging apparatus 8521 may be a charging station provided in a commerce facility or a power source in a house. For example, with the use of a plug-in technique, the power storage device 8524 can be charged by being supplied with electric power from outside. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the power storage device can have improved cycle characteristics and reliability. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the driving distance. Furthermore, the power storage device included in the vehicle can be used as a power source for supplying electric power to products other than the vehicle. In such a case, the use of a commercial power source can be avoided at peak time of electric power demand. Moreover, according to one embodiment of the present invention, reduced capacity of the power storage device can be restored, and thus durable years of the power storage device can be increased.

At least part of this embodiment can be implemented in combination with any of the other embodiments and an example described in this specification as appropriate.

Embodiment 5

In this embodiment, structure examples of power storage devices and examples of electronic devices using the power storage devices will be described with reference to FIG. 16, FIG. 17, FIGS. 18A and 18B, FIG. 19, FIGS. 20A to 20C, FIGS. 21A and 21B, FIGS. 22A and 22B, FIGS. 23A to 23C, FIGS. 24A to 24D, FIGS. 25A to 25G, FIGS. 26A to 26C, and FIG. 27. Note that the power storage device of one embodiment of the present invention can be obtained in such a manner that an opening is provided in an exterior body of a power storage device described in this embodiment and a carrier ion permeable film is provided so as to cover the opening without any space.

<Thin Power Storage Device>

An example of a thin power storage device will be described below with reference to FIG. 16, FIG. 17, FIGS. 18A and 18B, FIG. 19, FIGS. 20A to 20C, FIGS. 21A and 21B, and FIGS. 22A and 22B. When a flexible thin power storage device is used in an electronic device at least part of which is flexible, the power storage device can be bent as the electronic device is bent.

Figure 16:
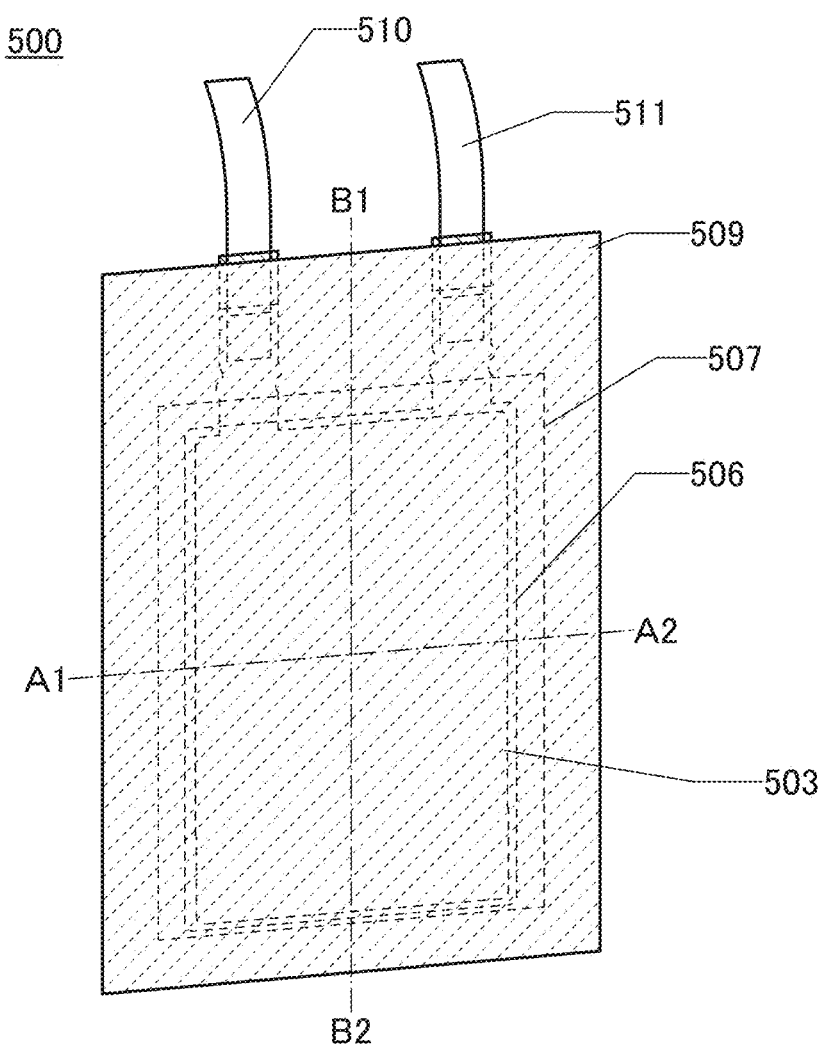
FIG. 16 illustrates a thin power storage device.
Figure 18A:
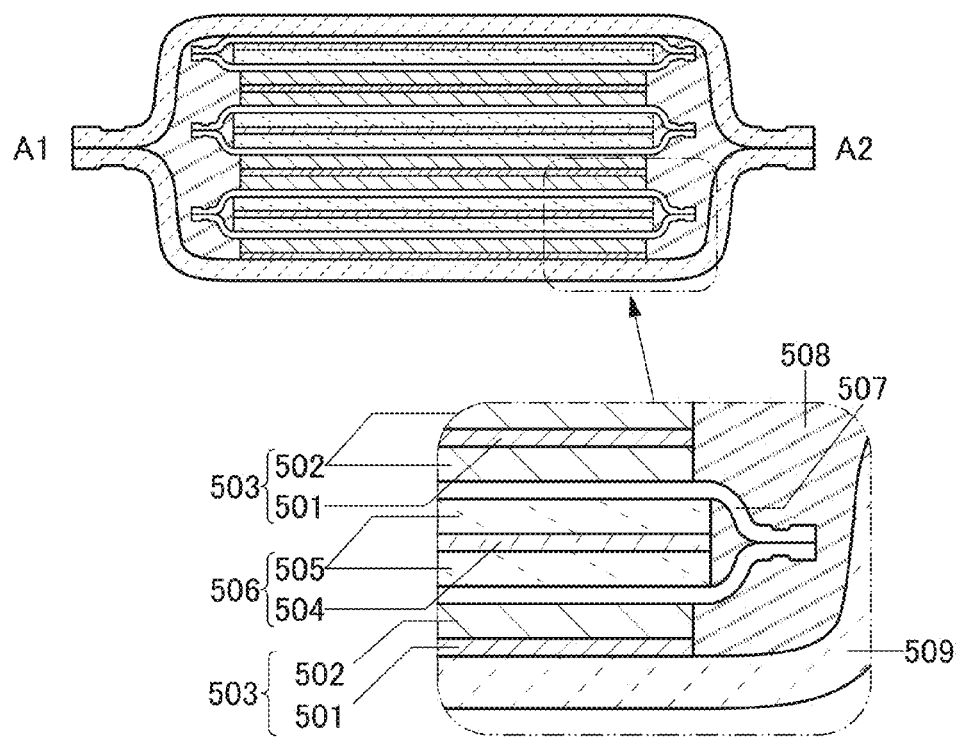
FIGS. 18A and 18B illustrate a thin power storage device.
Figure 18B:
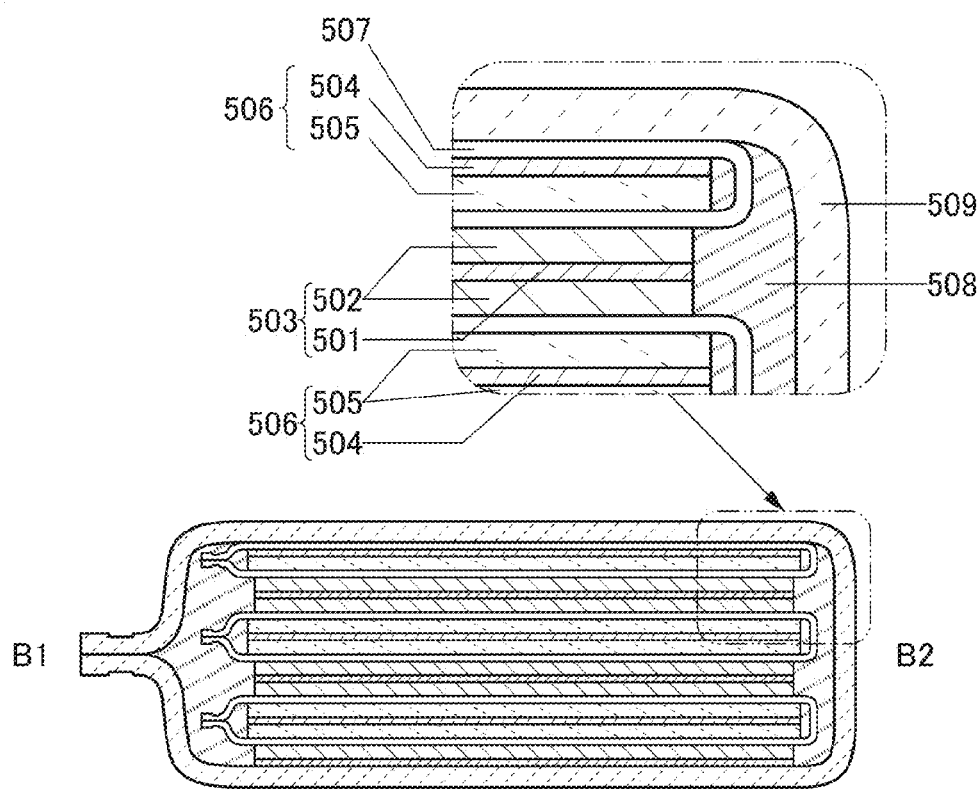

FIG. 16 is an external view of a thin power storage device 500. FIG. 18A is a cross-sectional view along dashed-dotted line A1-A2 in FIG. 16, and FIG. 18B is a cross-sectional view along dashed-dotted line B1-B2 in FIG. 16. The thin power storage device 500 includes a positive electrode 503 including a positive electrode current collector 501 and a positive electrode active material layer 502, a negative electrode 506 including a negative electrode current collector 504 and a negative electrode active material layer 505, a separator 507, an electrolyte solution 508, and an exterior body 509. The separator 507 is provided between the positive electrode 503 and the negative electrode 506 in the exterior body 509. The electrolyte solution 508 is included in the exterior body 509.

The materials described in Embodiment 4 can be used for the positive electrode 503, the negative electrode 506, the separator 507, and the electrolyte solution 508.

Figure 21A:
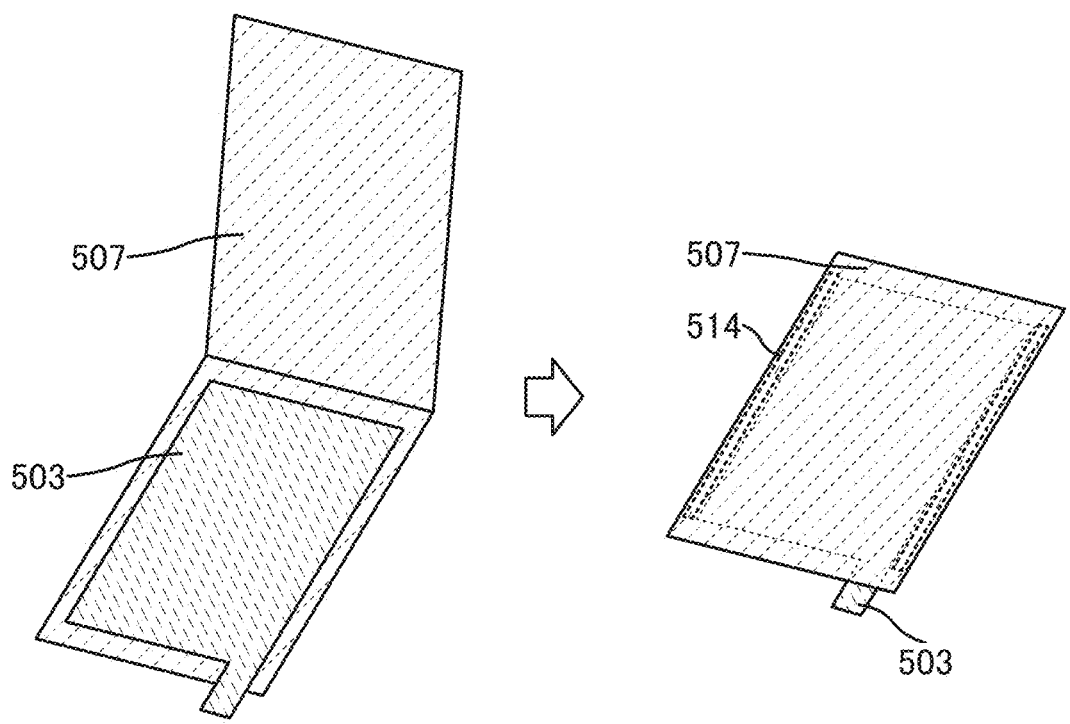
FIGS. 21A and 21B illustrate a thin power storage device.
Figure 21B:
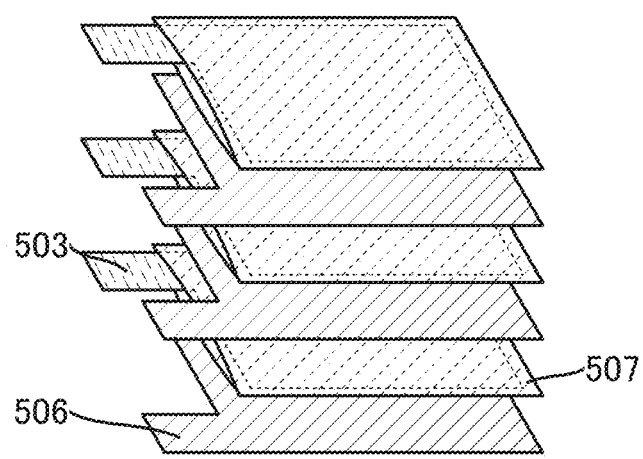

The separator 507 is preferably formed to have a bag-like shape to surround one of the positive electrode 503 and the negative electrode 506. For example, as illustrated in FIG. 21A, the separator 507 is folded in two so that the positive electrode 503 is sandwiched, and sealed with a sealing portion 514 in a region outside the region overlapping with the positive electrode 503; thus, the positive electrode 503 can be reliably supported inside the separator 507. Then, as illustrated in FIG. 21B, the positive electrodes 503 surrounded by the separators 507 and the negative electrodes 506 are alternately stacked and provided in the exterior body 509, whereby the thin power storage device 500 can be formed.

Figure 19:
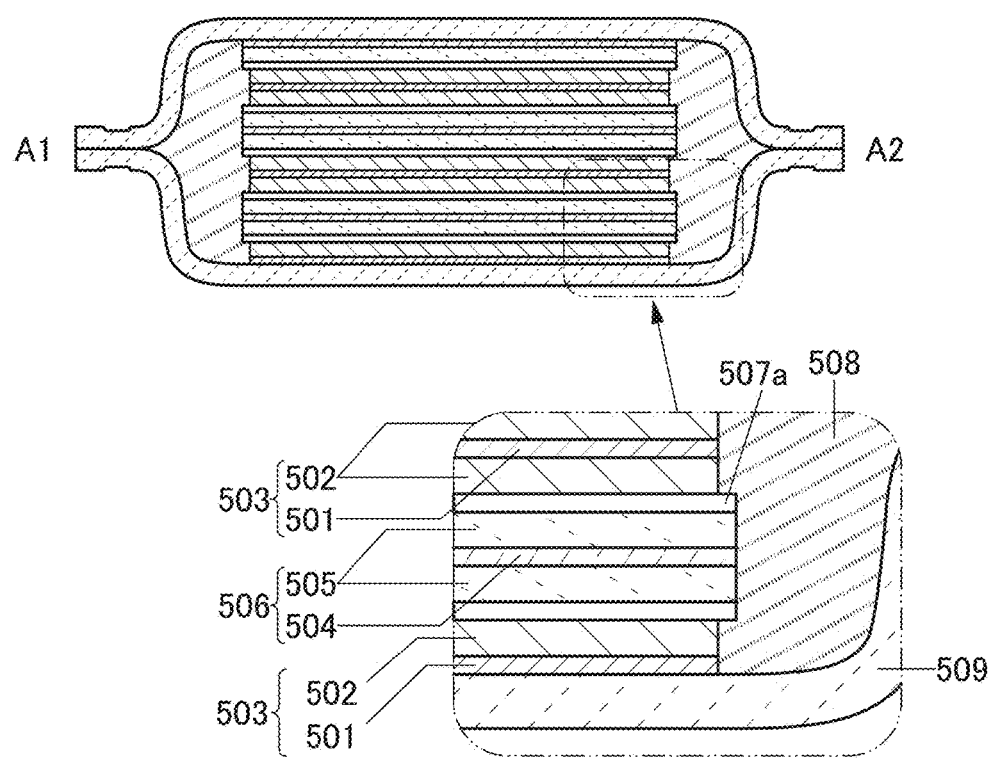
FIG. 19 illustrates a thin power storage device.

Note that the shape of the separator 507 is not limited to the bag-like shape. For example, as illustrated in FIG. 19, a separator 507a that does not have the bag-like shape may be interposed between the positive electrode 503 and the negative electrode 506. In that case, the external shape of the separator 507a may be the same as or larger than that of the negative electrode 506. When the end of the separator 507a is located on an outer side than the end of the negative electrode 506, a short-circuit between the positive electrode 503 and the negative electrode 506 can be suppressed.

Figure 20A:
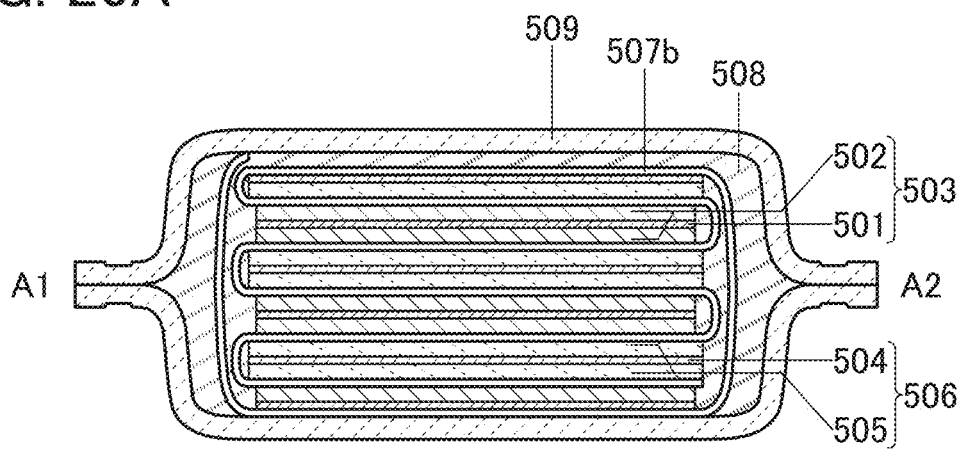
FIGS. 20A to 20C each illustrate a thin power storage device.

Alternatively, as illustrated in FIG. 20A, a separator 507b may be bent plural times so as to be interposed between the positive electrode 503 and the adjacent negative electrode 506.

Figure 20B:
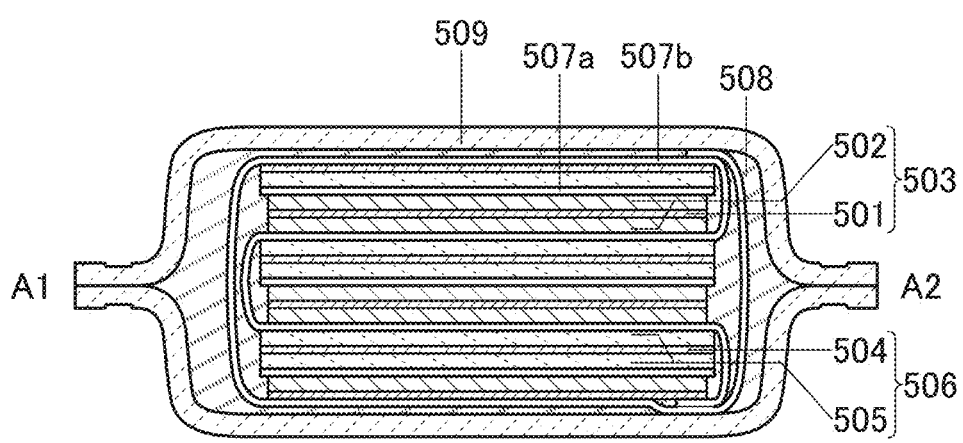

Further alternatively, as illustrated in FIG. 20B, the separator 507b may be bent plural times so as to be interposed between a pair of positive and negative electrodes 503 and 506 and an adjacent pair of positive and negative electrodes 503 and 506, and the separator 507a may be interposed between the positive electrode 503 and the negative electrode 506 in each of the pairs. In that case, the external shape of the separator 507a may be the same as or larger than that of the negative electrode 506. Note that the separator 507b may be wound spirally so as to be interposed between a pair of positive and negative electrodes 503 and 506 and an adjacent pair of positive and negative electrodes 503 and 506 as illustrated in FIG. 20C.

Figure 20C:
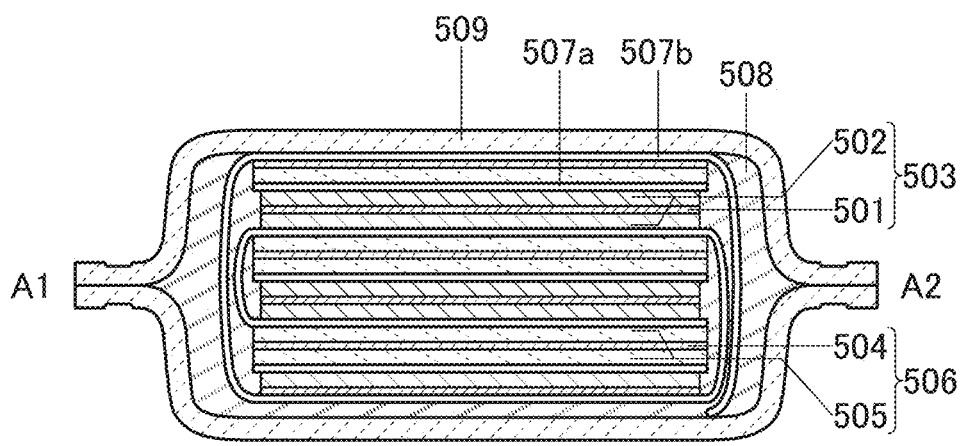

Note that in FIGS. 20A to 20C, the outer edge of the stack of the positive and negative electrodes 503 and 506 (here, three stacks of electrode layers) is preferably covered with the separator 507b. Such a structure allows the stacks to be held surely and suppresses a change in the positional relationship between the facing positive and negative electrodes 503 and 506.

Figure 22A:
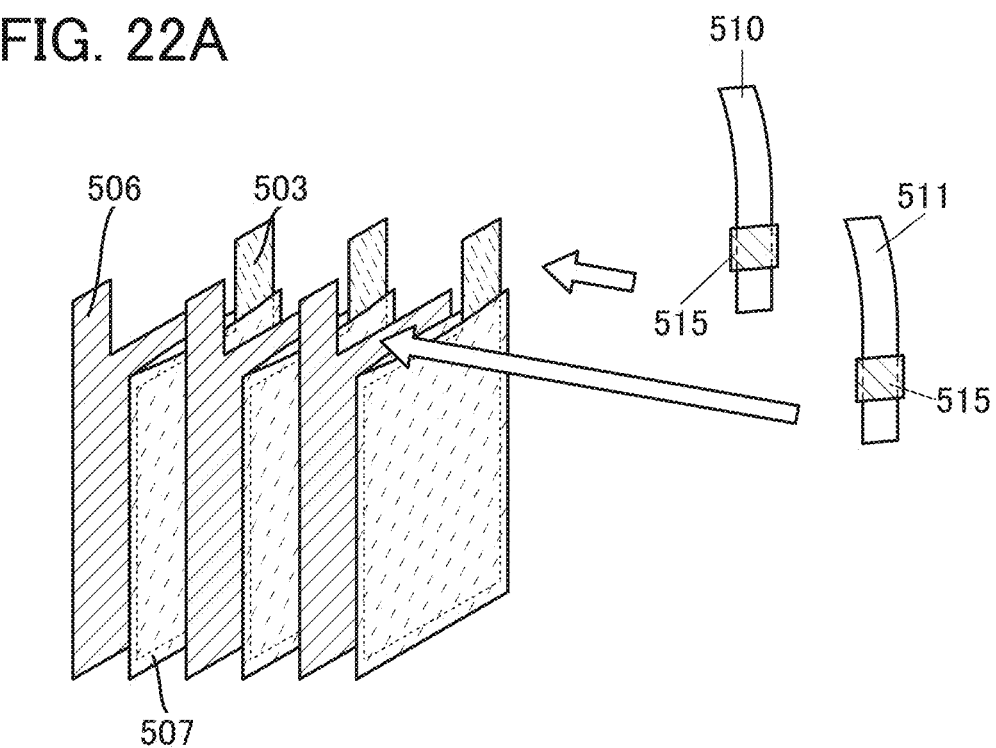
FIGS. 22A and 22B illustrate a thin power storage device.
Figure 22B:
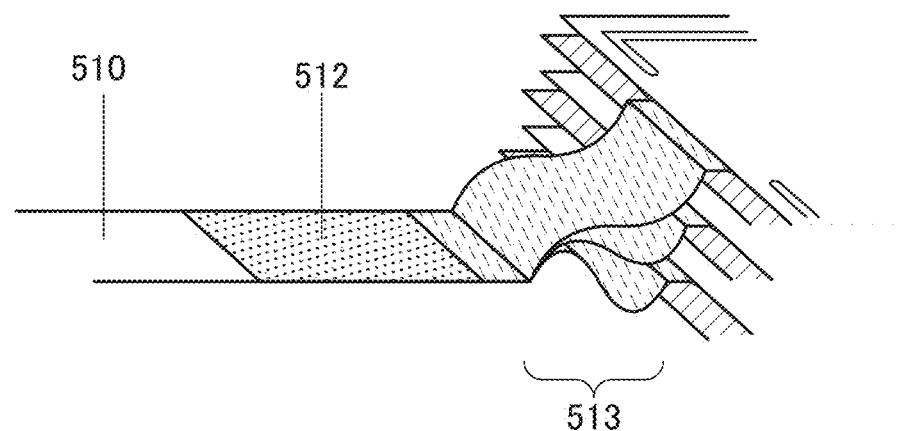

FIGS. 22A and 22B show an example in which a lead electrode is welded to the positive electrode 503 and the negative electrode 506. FIG. 22B shows an example in which a positive electrode lead electrode 510 is welted to the positive electrode current collector 501. The positive electrode current collector 501 is welded to the positive electrode lead electrode 510 in a welding region 512 by ultrasonic welding or the like. When the positive electrode current collector 501 includes a bent portion 513 illustrated in FIG. 22B, stress due to external force applied after the formation of the power storage device 500 can be relieved, improving the reliability of the power storage device 500. A negative electrode lead electrode 511 is also welded to the negative electrode current collector 504. Note that the positive electrode lead electrode 510 and the negative electrode lead electrode 511 each may include a sealant 515 at a position that overlaps with a sealing portion of the exterior body 509 when the stack of the positive electrode 503, the negative electrode 506, and the separator 507 is sealed in the exterior body 509.

Figure 17:
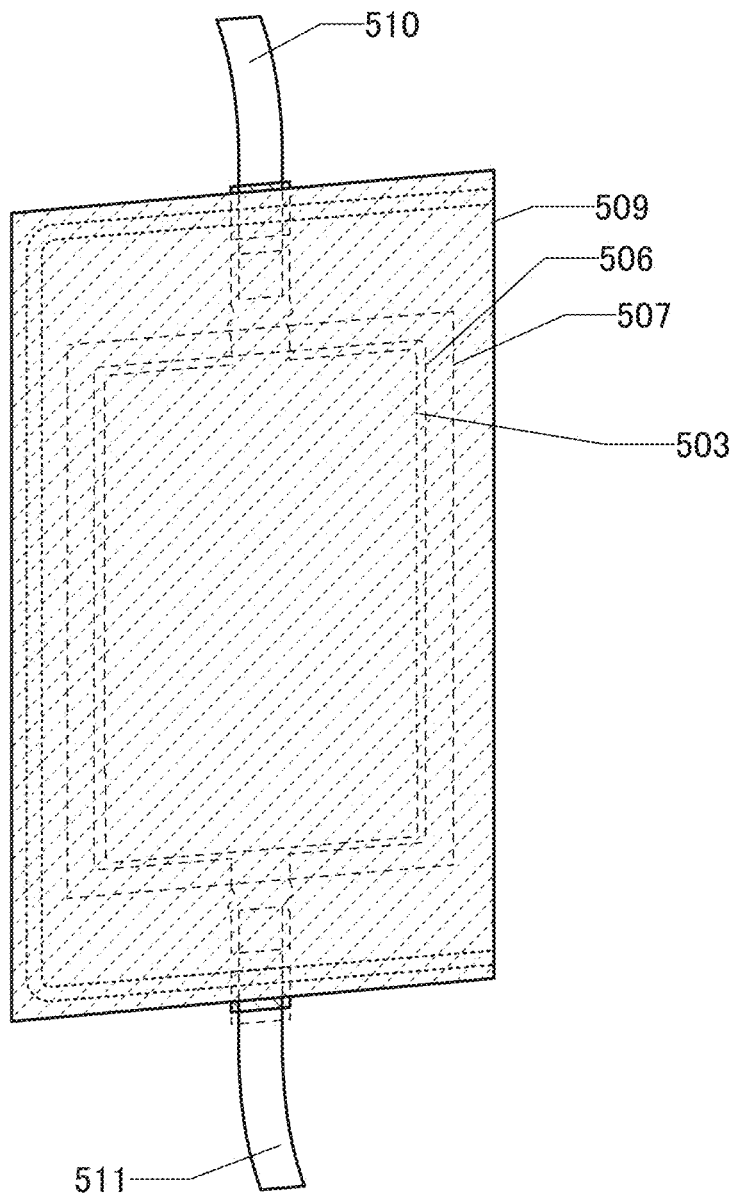
FIG. 17 illustrates a thin power storage device.

In the thin power storage device 500 illustrated in FIG. 16 and FIG. 17, the positive electrode lead electrode 510 and the negative electrode lead electrode 511 are welded to the positive electrode current collector 501 in the positive electrode 503 and the negative electrode current collector 504 in the negative electrode 506, respectively, by ultrasonic welding. The positive electrode current collector 501 and the negative electrode current collector 504 can double as terminals for electrical contact with the outside. In that case, the positive electrode current collector 501 and the negative electrode current collector 504 may be arranged so as to be partly exposed to the outside of the exterior body 509 without using lead electrodes.

Although the positive electrode lead electrode 510 and the negative electrode lead electrode 511 are provided on the same side in FIG. 16, they may be provided on different sides as illustrated in FIG. 17. The lead electrodes of the power storage device of one embodiment of the present invention can be freely located as described above; therefore, the degree of freedom in design is high. Accordingly, a product including the power storage device of one embodiment of the present invention can have a high degree of freedom in design. Furthermore, the yield of products including the power storage device of one embodiment of the present invention can be increased.

As the exterior body 509 in the thin power storage device 500, for example, a film having the following three-layer structure can be used: a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film.

FIGS. 18A and 18B, FIG. 19, and FIGS. 20A to 20C show an example including 3 electrode layers. It is needless to say that the number of electrode layers is not limited to 3, and may be more than 3 or less than 3. In the case of using a large number of electrode layers, the power storage device can have high capacity. In contrast, in the case of using a small number of electrode layers, the power storage device can have a small thickness and high flexibility.

In the above structure, the exterior body 509 of the power storage device can change its form with a radius of greater than or equal to 30 mm, preferably greater than or equal to 10 mm. One or two films are used as the exterior body of the power storage device. In the case where the power storage device has a layered structure, the power storage device has a cross section sandwiched by two curved surfaces of the films when it is bent.

Figure 23A:
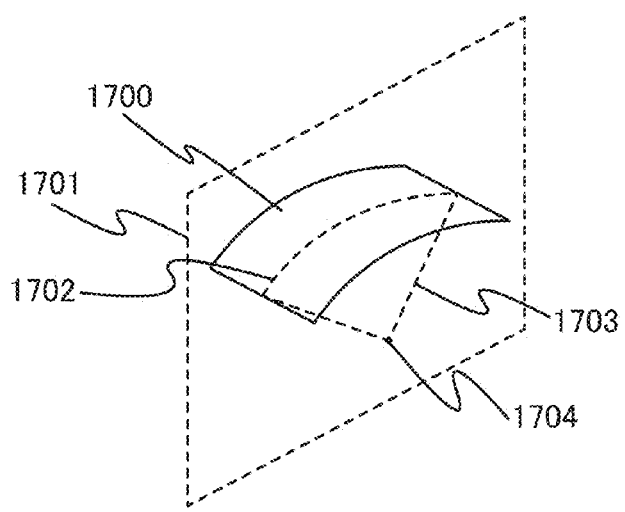
FIGS. 23A to 23C illustrate the radius of curvature of a surface.
Figure 23B:
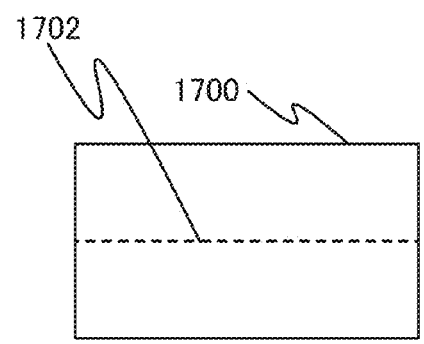
Figure 23C:
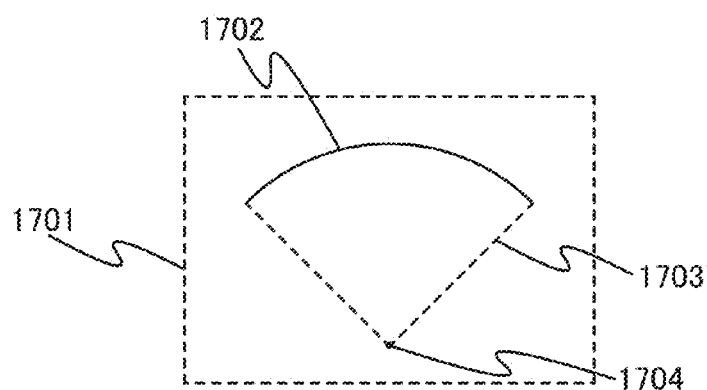

Description is given of the radius of curvature of a surface with reference to FIGS. 23A to 23C. In FIG. 23A, on a plane 1701 along which a curved surface 1700 is cut, part of a curve 1702 of the curved surface 1700 is approximate to an arc of a circle, and the radius of the circle is referred to as a radius of curvature 1703 and the center of the circle is referred to as a center 1704 of curvature. FIG. 23B is a top view of the curved surface 1700. FIG. 23C is a cross-sectional view of the curved surface 1700 taken along the plane 1701. When a curved surface is cut by a plane, the radius of curvature of a curve in a cross section differs depending on the angle between the curved surface and the plane or on the cut position, and the smallest radius of curvature is defined as the radius of curvature of a surface in this specification and the like.

Figure 24A:
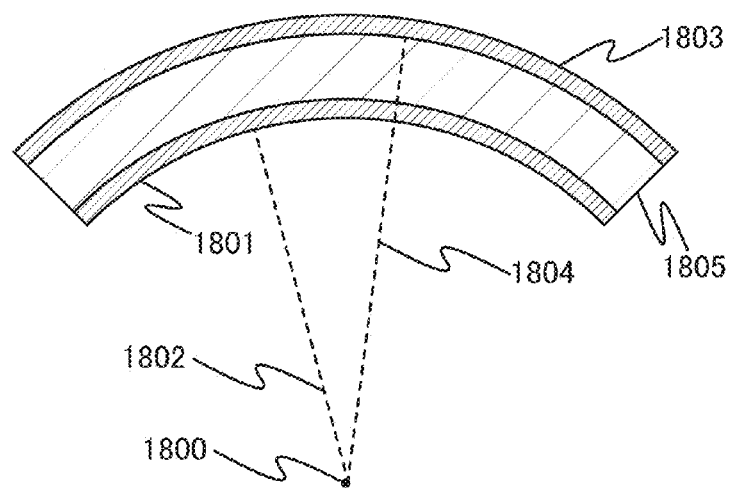
FIGS. 24A to 24D illustrate the radius of curvature of a film.
Figure 24B:
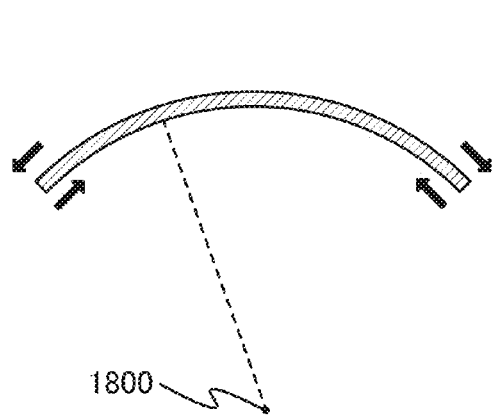

In the case of bending a power storage device in which a battery material 1805 including electrodes, an electrolyte solution, and the like is sandwiched between two films as exterior bodies, a radius of curvature 1802 of a film 1801 close to a center of curvature 1800 of the power storage device is smaller than a radius of curvature 1804 of a film 1803 far from the center of curvature 1800 (FIG. 24A). When the power storage device is curved and has an arc-shaped cross section, compressive stress is applied to a surface of the film on the side closer to the center of curvature 1800 and tensile stress is applied to a surface of the film on the side farther from the center of curvature 1800 (FIG. 24B). However, by forming a pattern including convex portions or concave portions on surfaces of the exterior bodies, the influence of a strain can be reduced to be acceptable even when compressive stress and tensile stress are applied. For this reason, the power storage device can change its form such that the exterior body on the side closer to the center of curvature has a curvature radius greater than or equal to 30 mm, preferably greater than or equal to 10 mm.

Figure 24C:
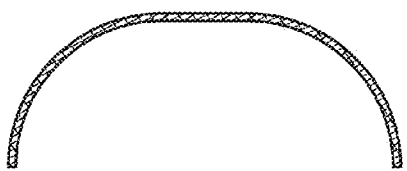
Figure 24D:
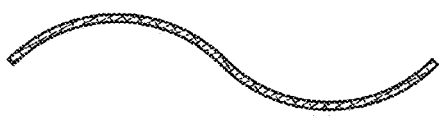

Note that the cross-sectional shape of the power storage device is not limited to a simple arc shape, and the cross section can be partly arc-shaped; for example, a shape illustrated in FIG. 24C, a wavy shape illustrated in FIG. 24D, or an S shape can be used. When the curved surface of the power storage device has a shape with a plurality of centers of curvature, the power storage device can change its form such that a curved surface with the smallest radius of curvature among radii of curvature with respect to the plurality of centers of curvature, which is a surface of the exterior body on the side closer to the center of curvature, has a curvature radius greater than or equal to 30 mm, preferably greater than or equal to 10 mm.

<Electronic Device>

FIGS. 25A to 25G illustrate examples of electronic devices including the power storage device described in this embodiment. Examples of electronic devices each including a flexible power storage device include television devices (also referred to as televisions or television receivers), monitors of computers or the like, cameras such as digital cameras and digital video cameras, digital photo frames, mobile phone sets (also referred to as mobile phones or mobile phone devices), portable game machines, portable information terminals, audio reproducing devices, and large game machines such as pachinko machines.

In addition, a flexible power storage device can be incorporated along a curved inside/outside wall surface of a house or a building or a curved interior/exterior surface of a car.

Figure 25A:
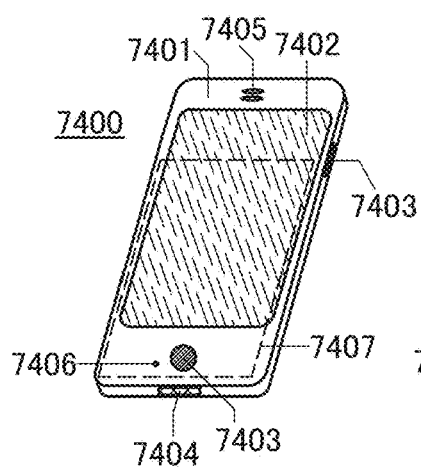
FIGS. 25A to 25G illustrate examples of an electronic device.

FIG. 25A illustrates an example of a mobile phone. A mobile phone 7400 includes a display portion 7402 incorporated in a housing 7401. The mobile phone 7400 further includes operation buttons 7403, an external connection port 7404, a speaker 7405, a microphone 7406, and the like. The mobile phone 7400 includes a power storage device 7407.

Figure 25B:
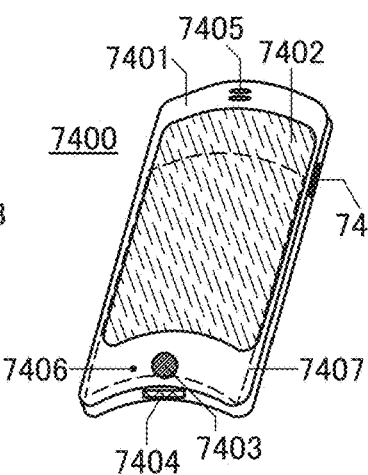
Figure 25C:
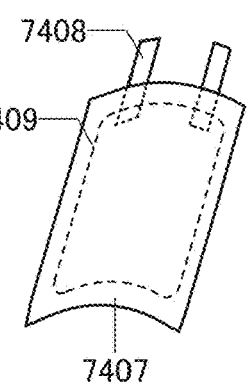

FIG. 25B illustrates the mobile phone 7400 that is bent. When the whole mobile phone 7400 is bent by the external force, the power storage device 7407 included in the mobile phone 7400 is also bent. FIG. 25C illustrates the bent power storage device 7407. The power storage device 7407 is a thin power storage device. The power storage device 7407 is fixed in a state of being bent. Note that the power storage device 7407 includes a lead electrode 7408 electrically connected to a current collector 7409. The current collector 7409 is, for example, copper foil, and is partly alloyed with gallium to improve the adhesion between the current collector 7409 and an active material layer in contact with the current collector 7409; as a result, the power storage device 7407 have high reliability even in a state of being bent.

Figure 25D:
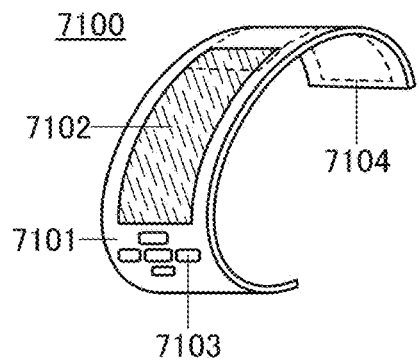
Figure 25E:
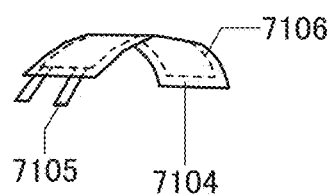

FIG. 25D illustrates an example of a bangle-type display device. A portable display device 7100 includes a housing 7101, a display portion 7102, an operation button 7103, and a power storage device 7104. FIG. 25E illustrates the power storage device 7104 which is bent. When a user wears the power storage device 7104 in a state of being bent on the wrist, a housing of the power storage device 7104 is deformed and the curvature thereof is partly or entirely changed. Note that the radius of curvature of a curve at a point refers to the radius of the circular arc that best approximates the curve at that point. The reciprocal of the radius of curvature is curvature. Specifically, part or the whole of the housing or the main surface of the power storage device 7104 is changed in the range of radius of curvature from 40 mm to 150 mm. When the radius of curvature at the main surface of the power storage device 7104 is greater than or equal to 40 mm and less than or equal to 150 mm, the reliability can be kept high. Note that the power storage device 7104 includes a lead electrode 7105 electrically connected to a current collector 7106. The current collector 7106 is, for example, a copper foil, and partly alloyed with gallium; thus, adhesion between the current collector 7106 and an active material layer in contact with the current collector 7106 is improved and the power storage device 7104 can have high reliability even when the power storage device 7104 is bent and its curvature is changed many times.

Figure 25F:
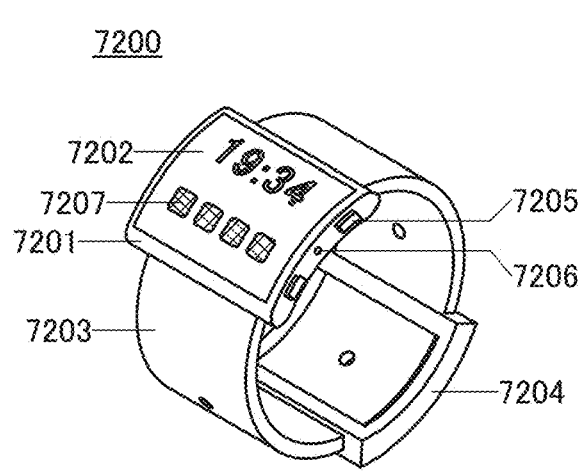
Figure 25G:
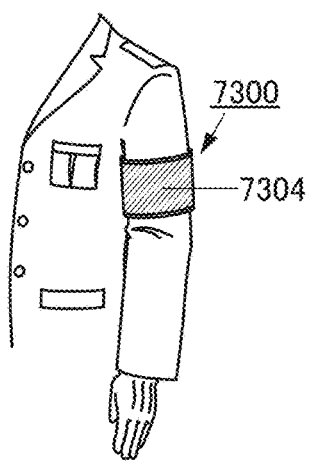

FIG. 25F illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, on/off of the power, on/off of wireless communication, setting and cancellation of a silent mode, and setting and cancellation of a power saving mode can be performed. For example, the functions of the operation button 7205 can be set freely by setting the operating system incorporated in the portable information terminal 7200.

The portable information terminal 7200 can employ near field communication that is a communication method based on an existing communication standard. In that case, for example, mutual communication between the portable information terminal 7200 and a headset capable of wireless communication can be performed, and thus hands-free calling is possible.

Moreover, the portable information terminal 7200 includes the input output terminal 7206, and data can be directly transmitted to and received from another information terminal via a connector. In addition, charging via the input output terminal 7206 is possible. Note that the charging may be performed by wireless power feeding without using the input output terminal 7206.

The display portion 7202 of the portable information terminal 7200 is provided with the power storage device of one embodiment of the present invention. For example, the power storage device 7104 illustrated in FIG. 25E that is in the state of being curved can be provided in the housing 7201. Alternatively, the power storage device 7104 illustrated in FIG. 25E can be provided in the band 7203 such that it can be curved.

FIG. 25F illustrates an example of an armband display device. A display device 7300 includes a display portion 7304 and the power storage device of one embodiment of the present invention. The display device 7300 can include a touch sensor in the display portion 7304 and can serve as a portable information terminal.

The display surface of the display portion 7304 is bent, and images can be displayed on the bent display surface. A display state of the display device 7300 can be changed by, for example, near field communication, which is a communication method based on an existing communication standard.

The display device 7300 includes an input output terminal, and data can be directly transmitted to and received from another information terminal via a connector. In addition, charging via the input output terminal is possible. Note that the charging may be performed by wireless power feeding without using the input output terminal.

Figure 26A:
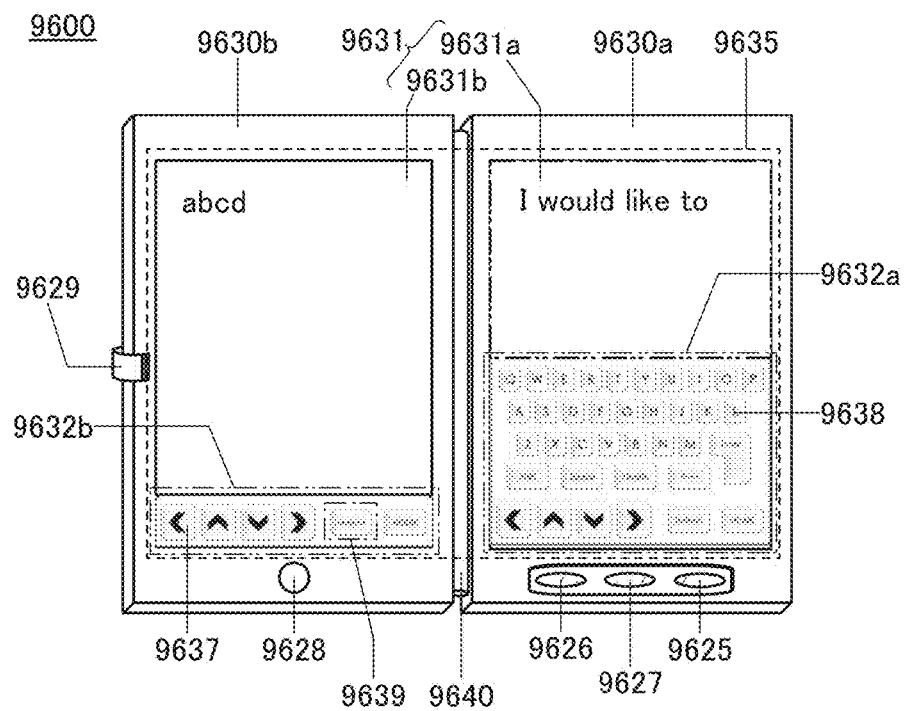
FIGS. 26A to 26C illustrate an example of an electronic device.
Figure 26B:
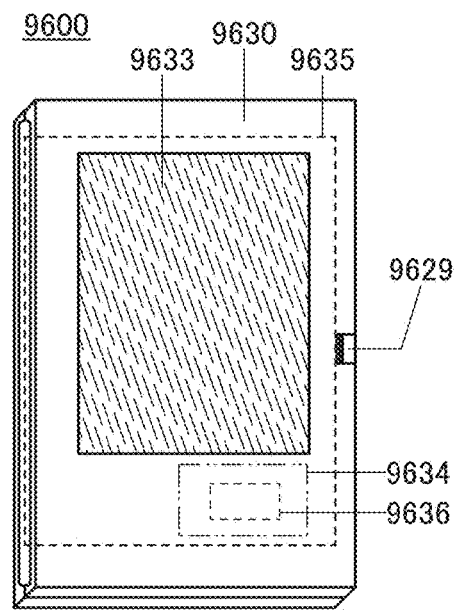

FIGS. 26A and 26B illustrate an example of a tablet terminal that can be folded in half. A tablet terminal 9600 illustrated in FIGS. 26A and 26B includes a housing 9630a, a housing 9630b, a movable portion 9640 connecting the housings 9630a and 9630b, a display portion 9631 including a display portion 9631a and a display portion 9631b, a display mode changing switch 9626, a power switch 9627, a power saving mode changing switch 9625, a fastener 9629, and an operation switch 9628. FIG. 26A illustrates the tablet terminal 9600 that is opened, and FIG. 26B illustrates the tablet terminal 9600 that is closed.

The tablet terminal 9600 includes a power storage unit 9635 inside the housings 9630a and 9630b. The power storage unit 9635 is provided across the housings 9630*a* and 9630*b*, passing through the movable portion 9640.

Part of the display portion 9631*a* can be a touch panel region 9632*a*, and data can be input by touching operation keys 9638 that are displayed. Note that the figure shows, as an example, that half of the area of the display portion 9631*a* has only a display function and the other half of the area has a touch panel function. However, the structure of the display portion 9631*a* is not limited to this, and all the area of the display portion 9631*a* may have a touch panel function. For example, all the area of the display portion 9631*a* can display a keyboard and serve as a touch panel while the display portion 9631*b* can be used as a display screen.

As in the display portion 9631*a*, part of the display portion 9631*b* can be a touch panel region 9632*b*. When a keyboard display switching button 9639 displayed on the touch panel is touched with a finger, a stylus, or the like, a keyboard can be displayed on the display portion 9631*b*.

Touch input can be performed in the touch panel region 9632*a* and the touch panel region 9632*b* at the same time.

The display mode changing switch 9626 allows switching between a landscape mode and a portrait mode, color display and black-and-white display, and the like. The power saving mode changing switch 9625 can control display luminance in accordance with the amount of external light in use of the tablet terminal 9600, which is measured with an optical sensor incorporated in the tablet terminal 9600. In addition to the optical sensor, other detecting devices such as sensors for determining inclination, such as a gyroscope or an acceleration sensor, may be incorporated in the tablet terminal.

Although the display portion 9631*a* and the display portion 9631*b* have the same area in FIG. 26A, one embodiment of the present invention is not limited to this example. The display portion 9631*a* and the display portion 9631*b* may have different areas or different display quality. For example, one of the display portions 9631*a* and 9631*b* may display higher definition images than the other.

The tablet terminal is closed in FIG. 26B. The tablet terminal includes the housing 9630, a solar cell 9633, and a charge and discharge control circuit 9634 including a DC-DC converter 9636. The power storage device of one embodiment of the present invention can be used as the power storage unit 9635.

The tablet terminal 9600 can be folded such that the housings 9630*a* and 9630*b* overlap with each other when not in use. Thus, the display portions 9631*a* and 9631*b* can be protected, which increases the durability of the tablet terminal 9600. In addition, the power storage unit 9635, which is the power storage device of one embodiment of the present invention, has flexibility and can be repeatedly bent without a significant decrease in charge and discharge capacity. Thus, a highly reliable tablet terminal can be provided.

The tablet terminal illustrated in FIGS. 26A and 26B can also have a function of displaying various kinds of data (e.g., a still image, a moving image, and a text image), a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processing portion, and the like. Note that the solar cell 9633 can be provided on one or both surfaces of the housing 9630 and the power storage unit 9635 can be charged efficiently. The use of a lithium-ion battery as the power storage unit 9635 brings an advantage such as a reduction in size.

Figure 26C:
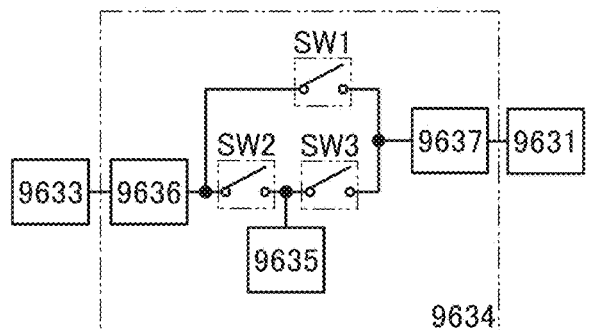

The structure and operation of the charge and discharge control circuit 9634 illustrated in FIG. 26B will be described with reference to a block diagram in FIG. 26C. The solar cell 9633, the power storage unit 9635, the DC-DC converter 9636, a converter 9637, switches SW1 to SW3, and the display portion 9631 are illustrated in FIG. 26C, and the power storage unit 9635, the DC-DC converter 9636, the converter 9637, and the switches SW1 to SW3 correspond to the charge and discharge control circuit 9634 in FIG. 26B.

First, an example of operation when electric power is generated by the solar cell 9633 using external light will be described. The voltage of electric power generated by the solar cell is raised or lowered by the DC-DC converter 9636 to a voltage for charging the power storage unit 9635. When the display portion 9631 operates with the electric power from the solar cell 9633, the switch SW1 is turned on and the voltage of the electric power is raised or lowered by the converter 9637 to a voltage needed for operating the display portion 9631. When display on the display portion 9631 is not performed, the switch SW1 is turned off and the switch SW2 is turned on, so that the power storage unit 9635 can be charged.

Note that the solar cell 9633 is described as an example of a power generation means; however, one embodiment of the present invention is not limited to this example. The power storage unit 9635 may be charged using another power generation means such as a piezoelectric element or a thermoelectric conversion element (Peltier element). For example, the power storage unit 9635 may be charged with a non-contact power transmission module capable of performing charging by transmitting and receiving electric power wirelessly (without contact), or any of the other charge means used in combination.

Figure 27:
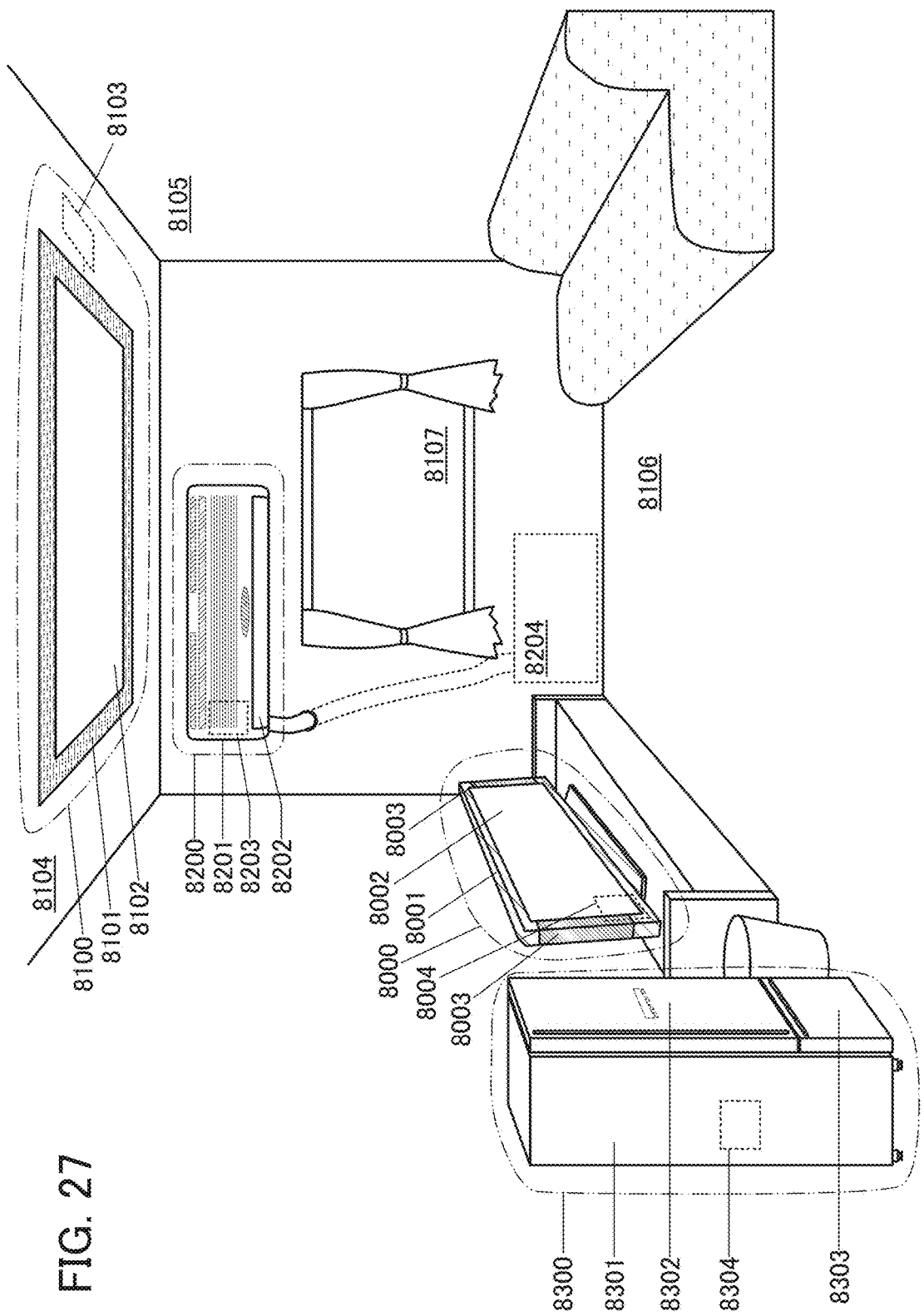
FIG. 27 illustrates examples of electronic devices.

FIG. 27 illustrates other examples of electronic devices. In FIG. 27, a display device 8000 is an example of an electronic device including a power storage device 8004 of one embodiment of the present invention. Specifically, the display device 8000 corresponds to a display device for TV broadcast reception and includes a housing 8001, a display portion 8002, speaker portions 8003, and the power storage device 8004. The power storage device 8004 of one embodiment of the present invention is provided in the housing 8001. The display device 8000 can receive electric power from a commercial power supply. Alternatively, the display device 8000 can use electric power stored in the power storage device 8004. Thus, the display device 8000 can operate with the use of the power storage device 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoretic display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 27, an installation lighting device 8100 is an example of an electronic device including a power storage device 8103 of one embodiment of the present invention. Specifically, the lighting device 8100 includes a housing 8101, a light source 8102, the power storage device 8103, and the like. Although FIG. 27 illustrates the case where the power storage device 8103 is provided in a ceiling 8104 on which the housing 8101 and the light source 8102 are installed, the power storage device 8103 may be provided in the housing 8101. The lighting device 8100 can receive electric power from a commercial power supply. Alternatively, the lighting device 8100 can use electric power stored in the power storage device 8103. Thus, the lighting device 8100 can operate with the use of the power storage device 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 27 as an example, the power storage device of one embodiment of the present invention can be used in an installation lighting device provided in, for example, a wall 8105, a floor 8106, or a window 8107 other than the ceiling 8104. Alternatively, the power storage device of one embodiment of the present invention can be used in a tabletop lighting device or the like.

As the light source 8102, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 27, an air conditioner including an indoor unit 8200 and an outdoor unit 8204 is an example of an electronic device including a power storage device 8203 of one embodiment of the present invention. Specifically, the indoor unit 8200 includes a housing 8201, an air outlet 8202, the power storage device 8203, and the like. Although FIG. 27 illustrates the case where the power storage device 8203 is provided in the indoor unit 8200, the power storage device 8203 may be provided in the outdoor unit 8204. Alternatively, the power storage devices 8203 may be provided in both the indoor unit 8200 and the outdoor unit 8204. The air conditioner can receive electric power from a commercial power supply. Alternatively, the air conditioner can use electric power stored in the power storage device 8203. Particularly in the case where the power storage devices 8203 are provided in both the indoor unit 8200 and the outdoor unit 8204, the air conditioner can operate with the use of the power storage device 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 27 as an example, the power storage device of one embodiment of the present invention can be used in an air conditioner in which the functions of an indoor unit and an outdoor unit are integrated in one housing.

In FIG. 27, an electric refrigerator-freezer 8300 is an example of an electronic device including a power storage device 8304 of one embodiment of the present invention. Specifically, the electric refrigerator-freezer 8300 includes a housing 8301, a refrigerator door 8302, a freezer door 8303, the power storage device 8304, and the like. The power storage device 8304 is provided in the housing 8301 in FIG. 27. The electric refrigerator-freezer 8300 can receive electric power from a commercial power supply. Alternatively, the electric refrigerator-freezer 8300 can use electric power stored in the power storage device 8304. Thus, the electric refrigerator-freezer 8300 can operate with the use of the power storage device 8304 of one embodiment of the present invention as an uninterruptible power supply even when electric power cannot be supplied from a commercial power supply due to power failure or the like.

Note that among the electronic devices described above, an electronic device such as an air conditioner requires high power in a short time in some cases. The tripping of a breaker of a commercial power supply in use of an electronic device can be prevented by using the power storage device of one embodiment of the present invention as an auxiliary power supply for supplying electric power which cannot be supplied enough by a commercial power supply.

In addition, in a time period when electronic devices are not used, particularly when the proportion of the amount of electric power which is actually used to the total amount of electric power which can be supplied from a commercial power supply source (such a proportion referred to as a usage rate of electric power) is low, electric power can be stored in the power storage device, whereby the usage rate of electric power can be reduced in a time period when the electronic devices are used. For example, in the case of the electric refrigerator-freezer 8300, electric power can be stored in the power storage device 8304 in nighttime when the temperature is low and the refrigerator door 8302 and the freezer door 8303 are not often opened or closed. On the other hand, in daytime when the temperature is high and the refrigerator door 8302 and the freezer door 8303 are frequently opened and closed, the power storage device 8304 is used as an auxiliary power supply; thus, the usage rate of electric power in daytime can be reduced.

This embodiment can be implemented in appropriate combination with any of the other embodiments and an example.

Example

In this example, an experiment was conducted to confirm the effect of the capacity restoration treatment performed by the power storage system described in Embodiment 1.

<Structure of Power Storage System>

Figure 28:
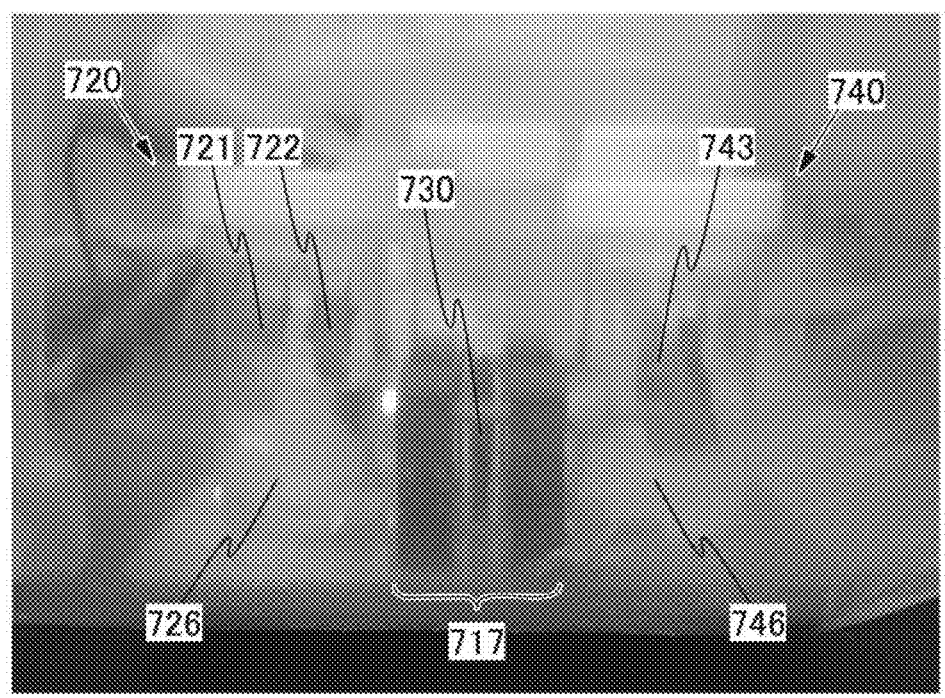
FIG. 28 is a photograph showing the appearance of a power storage system of Example.

FIG. 28 is a photograph showing the appearance of a power storage system fabricated in this example.

A power storage system 710 includes a power storage device 720 and a capacity restoration device 740. The power storage device 720 includes a first electrode 721, a second electrode 722, and an electrolyte solution 726. The capacity restoration device 740 includes a third electrode 743 and an electrolyte solution 746. The power storage device 720 and the capacity restoration device 740 include openings in respective exterior bodies. The openings are connected to each other with a carrier ion permeable film 730 interposed therebetween to form an ion inlet 717. The first electrode 721 and the second electrode 722 are in contact with the electrolyte solution 726, the third electrode 743 is in contact with the electrolyte solution 746, and the carrier ion permeable film 730 is in contact with the electrolyte solution 726 and the electrolyte solution 746.

Specifically, lithium iron phosphate and graphite were used as an active material of the first electrode 721 and an active material of the second electrode 722, respectively. Copper was used as the third electrode 743. In the electrolyte solution 726, ethylene carbonate was used as a solvent, LiTFSA (lithium bis(trifluoromethanesulfonyl)amide) was used as an electrolyte, and the concentration of the electrolyte in the electrolyte solution was set to 1.0 mol/L. In the electrolyte solution 746, water was used as a solvent, lithium chloride was used as an electrolyte, and the concentration of the electrolyte in the electrolyte solution was set to 1.0 mol/L. Lithium ion conductive glass ceramics (LICGC) produced by Ohara Inc. was used as the carrier ion permeable film 730.

Note that a current collector of the first electrode 721 is a 20-μm-thick aluminum foil having a carbon-coated surface and an electrode area of 1 cm$^2$, and a current collector of the second electrode 722 is a 18-μm-thick copper foil having an electrode area of 1 cm$^2$. The amounts of the active materials supported over the current collector of the first electrode 721 and the current collector of the second electrode 722 are 9.70 mg/cm$^2$ and 7.38 mg/cm$^2$, respectively.

An H-type cell made of glass was used as the exterior bodies of the power storage device 720 and the capacity restoration device 740. The electrodes are inserted from a top cover of the cell, and the cell is not sealed hermetically.

In the power storage system 710 having the above structure, first, cycle characteristics of the power storage device 720 were measured, then, the capacity restoration treatment of the power storage device 720 was performed by the capacity restoration device 740, and lastly, charge and discharge characteristics of the power storage device 720 were measured. The power storage system 710 was provided in a glove bag in which the air was replaced with nitrogen to perform a series of experiments. Note that the photograph showing the appearance in FIG. 28 was not clear because it was taken with the power storage system 710 wrapped in the glove bag.

<Cycle Characteristics>

Measurement results of cycle characteristics of the power storage device 720 will be shown below.

The measurement conditions of the cycle characteristics will be described. In charging and discharging, the first electrode 721 was used as a positive electrode and the second electrode 722 was used as a negative electrode. Constant current-constant voltage charging was performed at a current value of 0.32 mA/cm$^2$ and constant current-constant voltage discharging was performed similarly at a current value of 0.32 mA/cm$^2$, as the charge and discharge method. The upper limit voltage was 4.0 V, and the lower limit voltage was 2.0 V. The measurement temperature was 25° C.

Figure 29A:
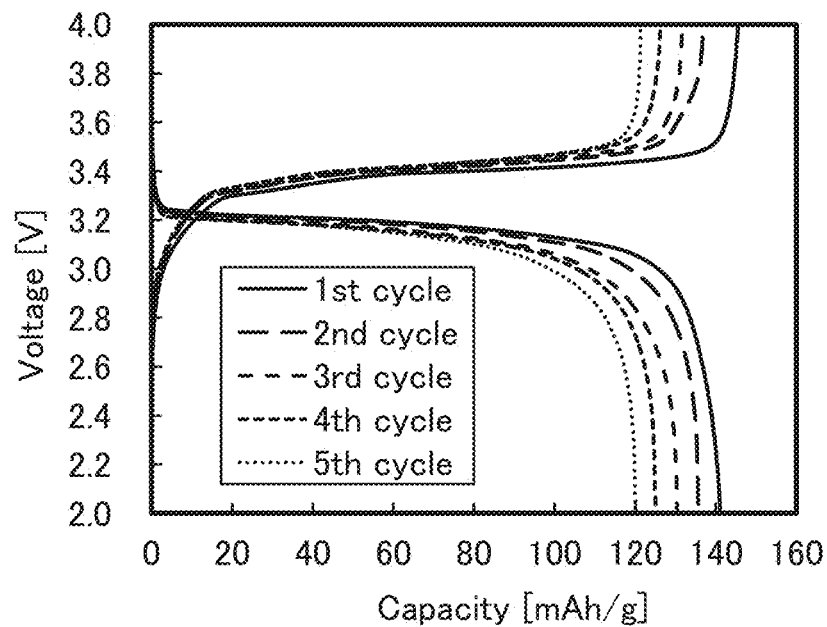
FIGS. 29A and 29B show cycle characteristics and a charge curve of a power storage device of Example.

FIG. 29A shows the measurement results of the cycle characteristics of the power storage device 720, specifically measurement results of first to fifth charge and discharge characteristics after fabrication of the power storage device 720. The first charge and discharge characteristics are represented by solid lines, the second to fourth charge and discharge characteristics are represented by different dashed lines, and the fifth charge and discharge characteristics are represented by dotted lines. The first discharge capacity which was 141.2 mAh/g decreased gradually owing to repeated charging and discharging, and the fifth discharge capacity was 120.1 mAh/g. It is thought that a decrease in capacity is large because the hermeticity of the power storage device 720 is low.

<Capacity Restoration Treatment>

Next, the capacity restoration treatment was performed on the power storage device 720 which was subjected to the above cycle tests.

Conditions of the capacity restoration treatment will be described. The third electrode 743 was used as a positive electrode and the first electrode 721 was used as a negative electrode. Constant current-constant voltage charging was performed at a current value of 0.32 mA/cm$^2$ as the charge method. A termination voltage of charging was set to 0.5 V, the charging was continued even after the applied voltage reached the termination voltage, and the charging was terminated when the applied current was 0.02 mA/cm$^2$.

Figure 29B:
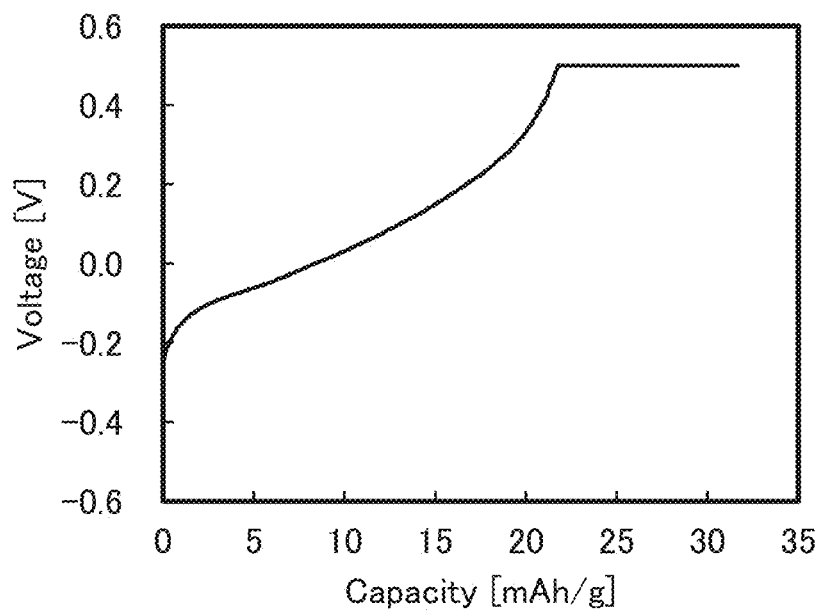

FIG. 29B shows a charge curve when the capacity of the power storage device 720 is restored. The horizontal axis represents charge capacity of the power storage device 720, and the vertical axis represents applied voltage in charging. According to FIG. 29B, a charge capacity of 31.7 mAh/g was obtained by the capacity restoration treatment.

<Charge and Discharge Characteristics after Capacity Restoration Treatment>

Lastly, charge and discharge characteristics of the power storage device 720 were measured after the capacity restoration treatment was performed. The measurement conditions were similar to those of the cycle characteristics.

Figure 30A:
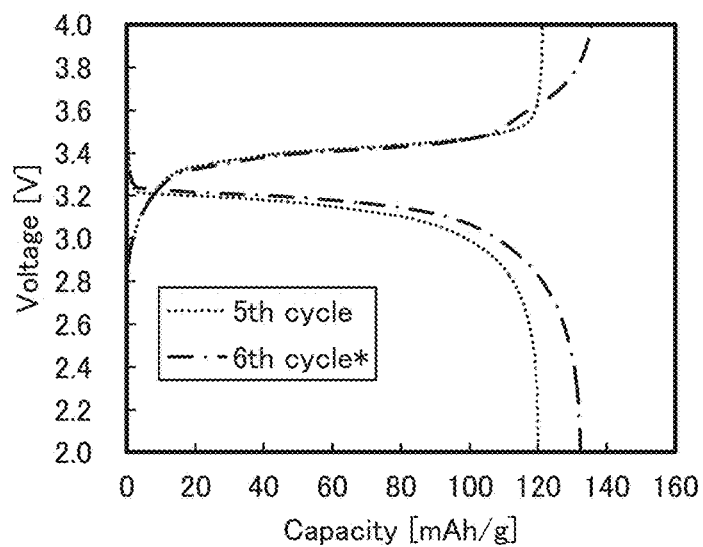
FIGS. 30A and 30B show charge and discharge characteristics and changes in capacity of a power storage device of Example.
Figure 30B:
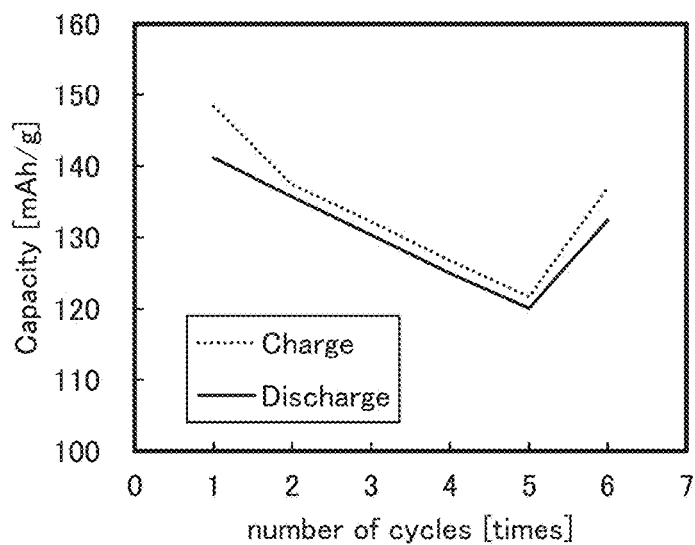

FIG. 30A shows the measurement results of the charge and discharge characteristics of the power storage device 720. Sixth charge and discharge characteristics after the capacity restoration treatment when counted from the first are represented by dashed-dotted lines, and fifth charge and discharge characteristics before the capacity restoration treatment are represented by dotted lines. FIG. 30B shows changes in capacity in the first to sixth cycle tests. Charge capacity is represented by a dotted line, and discharge capacity is represented by a solid line. According to FIGS. 30A and 30B, the capacity obtained by the capacity restoration treatment was higher than the capacity before the treatment by 10 mAh/g or more. The increase in capacity is smaller than the charge capacity of 31.7 mAh/g obtained by the capacity restoration treatment which is shown in FIG. 29B. This is probably because the capacity is gradually reduced even during the capacity restoration treatment owing to low hermeticity of the power storage device 720.

<Capacity Restoration Treatment Performed Between Measurements of Cycle Characteristics>

A power storage system similar to the power storage system 710 described in this example was fabricated and results of cycle tests performed on a power storage device having the power storage system will be described below. In the cycle tests, charge and discharge characteristics were measured 15 times, and the fifth charge and discharge characteristics and the tenth charge and discharge characteristics were each subjected to capacity restoration treatment five times after being measured. The measurement conditions were similar to those of the cycle characteristics. As conditions of the capacity restore treatment, the electrolyte solution 746 was stirred in addition to the above conditions.

Figure 31:
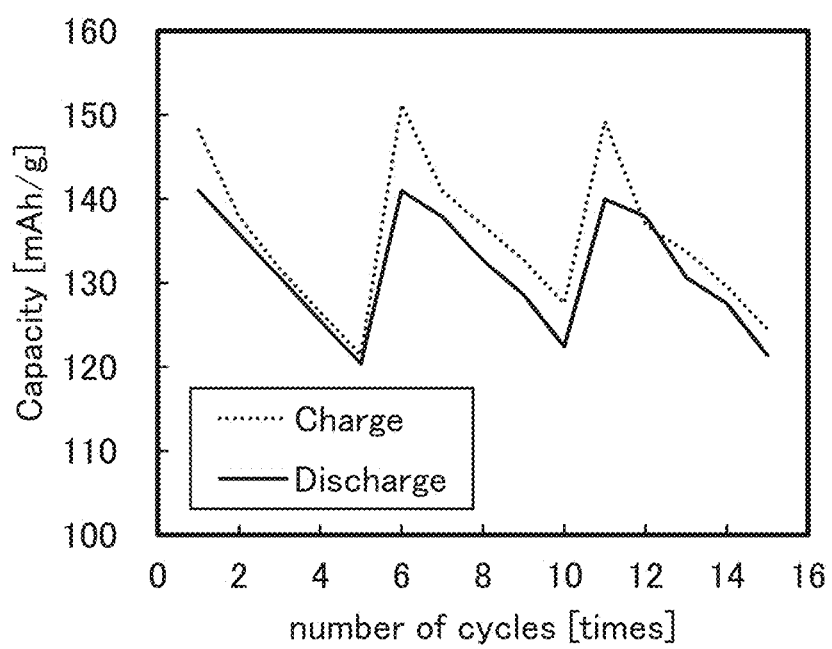
FIG. 31 shows changes in capacity of a power storage device of Example.

FIG. 31 shows changes in capacity of the power storage device in the first to fifteenth cycle tests. Charge capacity is represented by a dotted line, and discharge capacity is represented by a solid line. According to FIG. 31, the capacity is increased close to the amount of capacity at the first charge and discharge characteristics by the capacity restoration treatment. In these cycle tests, there was no considerable change in the charge and discharge curves.

The above results suggest the possibility that the power storage device can be used for a long time while maintaining the capacity by performing the capacity restoration treatment in the power storage system of one embodiment of the present invention at the right time.

This application is based on Japanese Patent Application serial no. 2016-030336 filed with Japan Patent Office on Feb. 19, 2016, the entire contents of which are hereby incorporated by reference.

What is claimed is:

1. A power storage device comprising:
   a first electrode and a second electrode;
   a first electrode terminal and a second electrode terminal;
   a first electrolyte solution including carrier ions;
   a carrier ion permeable film; and
   a first exterior body with a shape having a first opening sealed with the carrier ion permeable film,
   wherein:
   the first electrode terminal is electrically connected to the first electrode,
   the second electrode terminal is electrically connected to the second electrode,
   a first part of the first electrode terminal, a first part of the second electrode terminal, the first electrode, the second electrode and the first electrolyte solution are covered with the first exterior body,
   a second part of the first electrode terminal and a second part of the second electrode terminal are exposed from the first exterior body,
   the first electrode and the second electrode are in contact with the first electrolyte solution, and
   the carrier ion permeable film is in contact with the first electrolyte solution.

2. The power storage device according to claim 1, wherein the carrier ions contain a lithium ion.

3. A power storage system comprising:
   the power storage device according to claim 1; and
   a capacity restoration device comprising:
      a third electrode;
      a third electrode terminal electrically connected to the third electrode;
      a second electrolyte solution including the carrier ions; and
      a second exterior body having a second opening,
   wherein:
   a first part of the third electrode terminal and the third electrode are covered with the second exterior body,
   a second part of the third electrode terminal is exposed from the second exterior body,
   the second opening is connected to the first opening, and
   the second electrolyte solution is in contact with the carrier ion permeable film and the third electrode.

4. The power storage system according to claim 3, wherein a solvent of the second electrolyte solution is water.

5. The power storage system according to claim 3, wherein the second electrolyte solution is covered with the second exterior body.

6. The power storage system according to claim 3, further comprising:
   an ion conducting portion having flexibility;
   a charger; and
   a cable,
   wherein:
   the power storage device is connected to the capacity restoration device via the ion conducting portion, and
   the charger is electrically connected to the first electrode and the third electrode through the cable.

7. The power storage system according to claim 6, further comprising a pump connected to the ion conducting portion.

8. The power storage system according to claim 6, further comprising an air vent in the ion conducting portion.

9. The power storage device accordng to claim 1, wherein the carrier ion permeable film is configured to be impermeable to water and air but permeable to the carrier ions.

10. A power storage system comprising:
    a first power storage device and a second power storage device each comprising:
       a first electrode and a second electrode;
       a first electrolyte solution;
       a carrier ion permeable film; and
       a first exterior body with a shape having a first opening sealed with the carrier ion permeable film;
    a capacity restoration device comprising:
       a third electrode;
       a second electrolyte solution; and
       a second exterior body having a second opening;
    an ion conducting portion comprising:
       a pump connected to the ion conducting portion; and
       an air vent in the ion conducting portion;
    a charger; and
    a cable,
    wherein:
    the first power storage device and the second power storage device are each connected to the capacity restoration device via the ion conducting portion,
    the ion conducting portion is filled with the second electrolyte solution,
    each of the carrier ion permeable films of the first power storage device and the second power storage device is in contact with the second electrolyte solution, and
    the charger is electrically connected to the first electrode of the first power storage device, the first electrode of the second power storage device, and the third electrode through the cable.

11. A method for restoring capacity of a power storage device using a power storage system:
    the power storage system comprising:
       the power storage device comprising:
          a first electrode and a second electrode;
          a first electrolyte solution;
          a carrier ion permeable film; and
          a first exterior body having a first opening; and
       a capacity restoration device comprising:
          a third electrode; and
          a second exterior body having a second opening,
    the method comprising:
       connecting the capacity restoration device to the power storage device through the first opening and the second opening;
       injecting a second electrolyte solution including carrier ions into the capacity restoration device; and
       applying voltage between the first electrode and the third electrode,
    wherein:
    the second electrolyte solution is in contact with the carrier ion permeable film and the third electrode after injecting,
    the first opening is sealed with the carrier ion permeable film, and
    current flows from the first electrode to the third electrode in applying voltage.

12. A method for restoring capacity of a power storage device using a power storage system:
    the power storage system comprising:
       the power storage device comprising:
          a first electrode and a second electrode;
          a first electrolyte solution;
          a carrier ion permeable film; and
          a first exterior body having a first opening; and a capacity restoration device comprising:
  a third electrode;
  an electrolyte including carrier ions; and
  a second exterior body having a second opening, the method comprising:
connecting the capacity restoration device to the power storage device through the first opening and the second opening;
injecting a solvent into the capacity restoration device to form a second electrolyte solution; and
applying voltage between the first electrode and the third electrode,
wherein:
the second electrolyte solution is in contact with the carrier ion permeable film and the third electrode after injecting,
the first opening is sealed with the carrier ion permeable film, and
current flows from the first electrode to the third electrode in applying voltage.

* * * * *